US012570900B2

(12) United States Patent
Adlem et al.

(10) Patent No.: US 12,570,900 B2
(45) Date of Patent: Mar. 10, 2026

(54) POLYMERISABLE COMPOUND, POLYMERISABLE LC MATERIAL AND POLYMER FILM

(71) Applicant: MERCK PATENT GmbH, Darmstadt (DE)

(72) Inventors: Kevin Adlem, Feltham (GB); Martin Heeney, London (GB); James Allen, London (GB)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/698,640

(22) PCT Filed: Oct. 10, 2022

(86) PCT No.: PCT/EP2022/078029
§ 371 (c)(1),
(2) Date: Apr. 4, 2024

(87) PCT Pub. No.: WO2023/061903
PCT Pub. Date: Apr. 20, 2023

(65) Prior Publication Data
US 2024/0400900 A1 Dec. 5, 2024

(30) Foreign Application Priority Data
Oct. 11, 2021 (EP) .................................... 21201917

(51) Int. Cl.
*G02F 1/1333* (2006.01)
*C09K 19/34* (2006.01)
*C09K 19/38* (2006.01)
*C09K 19/04* (2006.01)

(52) U.S. Cl.
CPC .......... *C09K 19/3491* (2013.01); *C09K 19/38* (2013.01); *C09K 2019/0448* (2013.01)

(58) Field of Classification Search
CPC ................ C09K 19/38; C09K 19/3491; C09K 2019/0444; C09K 2019/0448; G02F 1/1333
See application file for complete search history.

(56) References Cited

U.S. PATENT DOCUMENTS

| | | | | |
|---|---|---|---|---|
| 6,913,710 B2 * | 7/2005 | Farrand | C09K 19/3833 549/83 |
| 7,060,200 B1 | 6/2006 | Farrand et al. | |
| 2006/0172090 A1 | 8/2006 | Syundo | |
| 2015/0027707 A1 | 1/2015 | Kumar et al. | |
| 2015/0175564 A1 | 6/2015 | Sakamoto et al. | |
| 2024/0400900 A1 * | 12/2024 | Adlem | C09K 19/3491 |

FOREIGN PATENT DOCUMENTS

| | | | | |
|---|---|---|---|---|
| EP | 0940707 B1 | 7/2006 | |
| EP | 0888565 B1 | 1/2009 | |
| GB | 2329393 A | 1/2001 | |
| KR | 2015037177 * | 4/2015 | C09K 19/38 |
| KR | 20150037177 A | 4/2015 | |
| WO | 2008119427 A1 | 10/2008 | |
| WO | 2009058396 A1 | 5/2009 | |
| WO | 2016020035 A1 | 2/2016 | |
| WO | 2016104317 A1 | 6/2016 | |
| WO | 2017079867 A1 | 5/2017 | |
| WO | 2016171041 A1 | 2/2018 | |

OTHER PUBLICATIONS

Machine Translation of KR2015037177 (Year: 2015).*
Allen et al., "The synthesis and application of novel benzodithiophene based reactive mesogens with negative wavelength dispersion birefringence", Dec. 28, 2021, Journal of Materials Chemistry, Issue 48, pp. 17169-17546. (Year: 2021).*
Allen et l., "The synthesis and application of novel benzodithiophene based reactive mesogens with negative wavelength dispersion birefringence", Journal of Materials Chemistry C, vol. 9, No. 48, Dec. 16, 2021, pp. 17419-17426.
International Search Report (PCT/ISA/210) and Written Opinion (PCT/ISA/237) mailed on Mar. 3, 2023, by the European Patent Office as the International Searching Authority for International Application No. PCT/EP2022/078029.
Merck Liquid Crystals, Physical Properties of Liquid Crystals, Status Nov. 1997, Merck KGaA, Germany.
Gauza et al., "High Birefringence Isothiocyanato Tolane Liquid Crystals", Japanese Journal of Applied Physics, (Jun. 2003), vol. 42, No. 6A, pp. 3463-3466.
Tschierske et al., "Definitions of basic terms related to low molecular weight and polymer liquid crystals", Applied Chemistry, (Nov. 19, 2004), vol. 116, Issue 45, pp. 6340-6368. (with English translation 115 pages total).

* cited by examiner

*Primary Examiner* — Geraldina Visconti
(74) *Attorney, Agent, or Firm* — Buchanan Ingersoll & Rooney PC

(57) ABSTRACT

A polymerisable liquid crystal (LC) compound, a corresponding polymerizable LC material, a polymer film with flat, negative, or positive optical dispersion obtainable from such a material, and the use of the polymerisable LC, polymerisable LC material and/or polymer film in optical, electro optical, electronic, semiconducting, or luminescent components or devices.

13 Claims, No Drawings

POLYMERISABLE COMPOUND, POLYMERISABLE LC MATERIAL AND POLYMER FILM

CROSS-REFERENCE TO RELATED APPLICATIONS

This application is a U.S. national stage application claiming priority under 35 U.S.C. §§ 120 and 365(c) of and to PCT International Application No. PCT/EP2022/078029, filed Oct. 10, 2022, which claims priority under 35 U.S.C. §§ 119(a) and 365(b) of and to European Application No. 21201917.8, filed Oct. 11, 2021, each of which are incorporated herein in their entirety and for all purposes.

FIELD OF THE INVENTION

The invention relates to a polymerisable (LC) compound, to a corresponding polymerizable LC material, a polymer film with flat, negative, or positive optical dispersion obtainable from such a material, and the use of the polymerisable LC, polymerisable LC material and/or polymer film in optical, electro optical, electronic, semiconducting, or luminescent components or devices.

Background and Prior Art

Polymerisable liquid crystal materials are known in prior art for the preparation of anisotropic polymer films. These films are usually prepared by coating a thin layer of a polymerisable liquid crystal mixture onto a substrate, aligning the mixture into a uniform orientation and finally fixing the orientation of the liquid crystal molecules by polymerizing the polymerizable liquid crystal material. The orientation of the liquid crystal molecules in the polymerized film can thereby be planar, i.e., where the liquid crystal molecules are oriented substantially parallel to the layer, homeotropic (rectangular or perpendicular to the layer) or tilted. Corresponding optical films are described, for example, in EP 0 940 707 B1, EP0888565 B1 and GB2329393 B1.

As commonly known by the expert, optical films based on polymerisable liquid crystal materials typically exhibit a wavelength dependent retardation. In this regard, three main kind of optical behaviour are known:

i) "Normal" or "Positive" optical dispersion, such as for example described in EP 0 940 707 B1 ii) "Reverse" or "Negative" optical dispersion, such as, for example described in WO 2016/020035 A1, and iii) "Flat" optical dispersion, such as for example described in WO 2009/058396 A1.

For example, flat or negative dispersion polymerisable liquid crystal materials can be produced by adding at least one component with an ordinary refractive index (no) higher than extraordinary refractive index (ne) in the formulation. Therefore, highly conjugated substituents are required in the orthogonal position with respect to the long-axis of the molecules. The latter materials absorb part of the UV dose when curing optical films which results in poor degree of cure and poor thermal durability of cured films. Besides the latter molecular blocks can easily oxidise under high temperatures in the presence of oxygen. Same applies to high birefringent formulations containing highly conjugated reactive mesogens which reduces the thermal durability of cured films and which are typically prone to yellowing.

For example, WO 2008/119427 A1 describes a birefringent polymer film with negative optical dispersion, which is obtainable from a polymerisable LC material comprising as negative dispersion component compounds having the structure shown below or derivatives thereof:

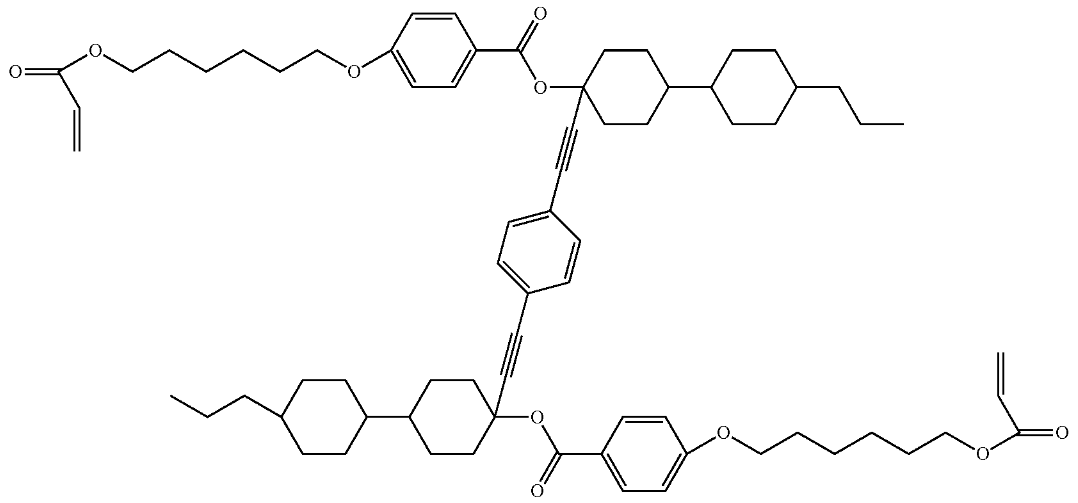 [SMILES: C=CC(=O)OCCCCCCOc1ccc(C(=O)OC2(C#Cc3ccc(C#CC4(OC(=O)c5ccc(OCCCCCCOC(=O)C=C)cc5)CCC(C5CCC(CCC)CC5)CC4)cc3)CCC(C3CCC(CCC)CC3)CC2)cc1]

The ratio of the negative dispersion component in the polymerisable LC material disclosed in WO 2008/119427 A1 is for example 50-60% of the total amount of solids (i.e. without solvents).

However, the bulky nature of the negative dispersion compounds according to the prior art are typically hard to align or give formulations with a narrow process window for annealing temperature, which is not convenient for mass production.

Furthermore, flat or negative dispersion films of the prior art are unfavourable thick (30-100 μm) due to the low birefringence of the utilized LC materials. Since the retardation of an optical retardation film is given by the product of its birefringence and film thickness, and thinner films are generally preferred in flat panel display applications, it is desired to increase the birefringence of the film so that the film thickness can be reduced while achieving the same retardation. In addition, the flat dispersion films of the prior art often require due to their unfavourable thickness unfavourable processing steps, which are not suitable for mass production processes.

Therefore, there is still the need for new and preferably improved, polymerisable liquid crystal materials or resulting polymer films, both not exhibiting the drawbacks of prior art materials or if so, only exhibiting them to a less extent.

The polymerisable LC media comprising them, which are used for film preparation, should exhibit good thermal properties, in particular a modest melting point, a good solubility in the LC host and in organic solvents, and reasonable extrapolated clearing point, and should further exhibit excellent optical properties.

Advantageously, said polymerisable LC material, should preferably be applicable for the preparation of different, uniform aligned polymer films, and should, at the same time, show a favourable adhesion to a substrate, be highly transparent to VIS-light, exhibit a reduced yellow colouration overtime (yellowing), exhibit a high birefringence to reduce the film thickness, show a favourable high temperature stability or durability, and in addition, the uniform aligned polymer films should be produced by compatible, commonly known, methods for the mass production.

Other aims of the present invention are immediately evident to the person skilled in the art from the following detailed description.

Surprisingly, the inventors of the present invention have found that one or more, preferably all the above requirements can be fulfilled, preferably at the same time, by using a polymerisable LC material according to claim 1.

SUMMARY OF THE INVENTION

The invention relates to a compound of formula T, $$R^{T1}\text{-}(A^{T1}\text{-}Z^{T1})_{m1}\text{-}G^{T1}\text{-}(Z^{T2}\text{-}A^{T2})_{m2}\text{-}R^{T2} \qquad \text{T}$$

wherein $R^{T1}$ and $R^{T2}$ each and independently from another denotes H or hydrocarbon group having 1 to 20 carbon atoms, the group may have a substituent group, any carbon atom may be substituted with a heteroatom, and at least one of $R^{T1}$ and $R^{T2}$ denotes P-Sp-, P denotes a polymerizable group, Sp denotes a spacer group, $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L, L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms preferably 1 to 12 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp—

$Z^{T1}$ to $Z^{T3}$ each independently represent —O—, —S—, $—OCH_2—$, $—CH_2O—$, $—CH_2CH_2—$, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, $—SCH_2—$, $—CH_2S—$, $—CF_2O—$, $—OCF_2—$, $—CF_2S—$, $—SCF_2—$, —CH═CH—COO—, —CH═CH—OCO—, —COO—CH═CH—, —OCO—CH═CH—, $—COO—CH_2CH_2—$, $—OCO—CH_2CH_2—$, $—CH_2CH_2—COO—$, $—CH_2CH_2—OCO—$, $—COO—CH_2—$, $—OCO—CH_2—$, $—CH_2—COO—$, $—CH_2—OCO—$, —CH═CH—, —N═N—, —CH═N—, —N═CH—, —CH═N—N═CH—, —CF═CF—, —C≡C—, or a single bond, $G^{T1}$ denotes a group

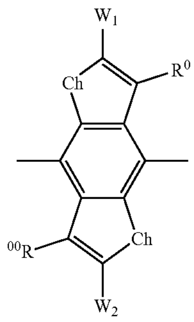

,

Ch denotes each and independently a chalcogen, such as O, S, Se or Te, preferably O and/or S, more preferably S, $R^0$ and $R^{00}$ each independently represent a hydrogen atom, F, Cl, Br, I, or a linear or branched alkyl group having 1 to 20 carbon atoms, preferably 1 to 12 carbon atoms, more preferably 1 to 5 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F or Cl, preferably H, $W_1$ and $W_2$ denotes independently a group selected from groups containing an aromatic group and/or non-aromatic group having 1 to 40 carbon atoms, preferably 1 to 20 carbon atoms, which may be substituted, the aromatic group may be a hydrocarbon ring or a heterocyclic ring, and the non-aromatic group may be a hydrocarbon group or a group in which any carbon atom in a hydrocarbon group is substituted with a heteroatom (provided that, oxygen atoms are not directly connected with each other), preferably a group $-(Z^{T3}\text{-}A^{T3})_{m3}\text{-}A^{T4}\text{-}Y$, whereby $Z^{T3}$ has one of the meaning as given for $Z^{T1}$ or $Z^{T2}$, $A^{T3}$ and $A^{T4}$ have one of the meanings as given above for $A^{T1}$ or $A^{T2}$ and m3 each and independently represents 0, 1, or 2, and Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F, or Y may represent a group represented by P-Sp— more preferably a group selected from

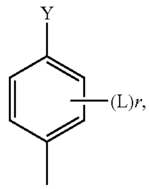
,
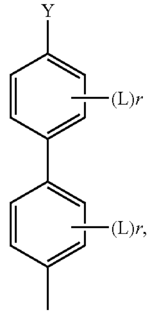
, or
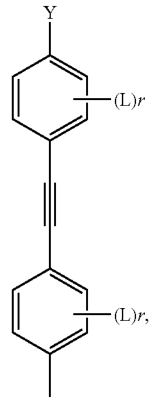
, even more preferably a group

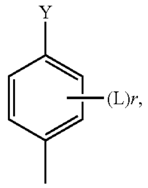
,

Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F, or Y may represent a group represented by P-Sp-, preferably each and independently H, F, $—OCH_3$, or CN, more preferably H or F, r each independently represent 0, 1, 2, 3, or 4, preferably each and independently 0, 1, or 2, m1 and m2 each independently represent an integer of 1 to 6. preferably each independently represent an integer of 1 to 4, more preferably each independently represent 1 or 2, m3 each independently represent 0, 1, or 2.

The invention relates to a polymerisable liquid crystalline (LC) medium comprising one or more compounds of formula T as described above and below.

The invention further relates to the use of a polymerisable LC medium or polymer film as described above and below in optical, electronic and electro optical components and devices, preferably in optical films, retarders or compensators having flat optical dispersion.

The invention further relates to a birefringent polymer film being obtainable or obtained by polymerising a polymerisable LC medium as described above and below, preferably in its LC phase in an oriented state in form of a thin film.

The invention especially relates to a polymer film as described above and below, which is an A plate or a C plate, preferably a positive A plate (+A plate) or positive C plate (+C plate).

The invention further relates to an optical, electronic or electro optical component or device, comprising a polymerisable LC medium or a polymer film as described above and below.

Said devices include, without limitation, electro optical displays, LCDs, non-linear optic (NLO) devices, optical information storage devices, electronic devices, electroluminescent displays, organic photovoltaic (OPV) devices, lighting devices, sensor devices, electro photographic recording devices, organic memory devices.

Said components include, without limitation optical films, retarders, compensators, polarisers, beam splitters, reflective films, alignment layers, colour filters, holographic elements, hot stamping foils, colored images, decorative or security markings, LC pigments, adhesives, organic semiconductors, organic field effect transistors (OFET), integrated circuits (IC), thin film transistors (TFT), Radio Frequency Identification (RFID) tags, organic light emitting diodes (OLED), organic light emitting transistors (OLET), organic solar cells (O—SC), organic laser diodes (O-laser), organic integrated circuits (O—IC), electrode materials, photoconductors, photodetectors, capacitors, charge injection layers, Schottky diodes, planarising layers, antistatic films, conducting substrates, conducting patterns, photoconductors, electro photographic applications, electro photographic recording, biosensors, biochips.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. Pelzl and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "polymerisable LC material" means a material, which comprises of more than 90% by weight, preferably more than 95% by weight, more preferably more than 98% by weight of polymerisable compounds, as described above and below.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkynyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ aryl-alkyloxy, $C_2$-$C_{40}$ heteroaryl, $C_4$-$C_{40}$ cycloalkyl, $C_4$-$C_{40}$ cycloalkenyl, etc. Preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Preference is given to mono-, bi-, or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxa-line, phenazine, naphthyridine, azacarbazole, benzocarboline, phen-anthridine, phenanthroline, thieno[2,3b]thiophene, thieno[3,2b]thiophene, dithienothiophene, isobenzothiophene, dibenzothiophene, benzothia-diazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydro-naphthalene or bicyclooctane). Preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_1$-$C_{12}$ alkyl, $C_6$-$C_{12}$ aryl, $C_1$-$C_{12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —$NO_2$, —NCO, —NCS, —OCN, —SCN, —C(═O)N($R^x$)$_2$, —C(═O)$Y^x$, —C(═O)$R^x$, —C(═O)O$R^x$, —N($R^x$)$_2$, in which $R^x$ has the above-mentioned meaning, and above $Y^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or C.

"Substituted silyl or aryl" preferably means substituted by halogen, —CN, $R^y$, —$OR^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

In the formula shown above and below, a substituted phenylene ring

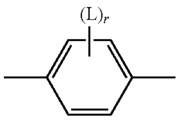

is preferably

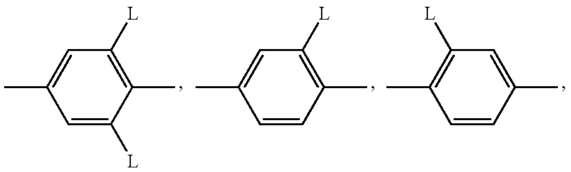

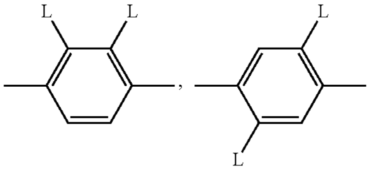

or

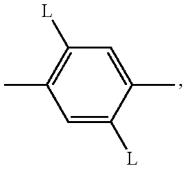

in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

"Polymerisable groups" (P) are preferably selected from groups containing a C═C double bond or C≡C triple bond, and groups which are suitable for polymerisation with ring opening, such as, for example, oxetane or epoxide groups.

Preferably, polymerisable groups (P) are selected from the group consisting of $CH_2$═$CW^1$—COO—, $CH_2$═$CW^1$—CO—,

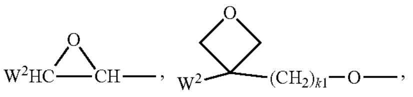

-continued

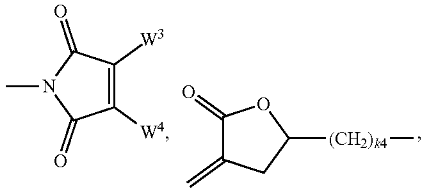

$CH_2$═$CW^2$—$O_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe—CH═CH—, in which $W^1$ denotes H, F, C, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl, or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2$═CH—COO—, $CH_2$═$C(CH_3)$—COO—, $CH_2$═CF—COO—, $CH_2$═CH—$CH_2$═CH—O—, $(CH_2$═$CH)_2$CH—OCO—, $(CH_2$═$CH)_2$CH—O—,

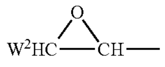

and

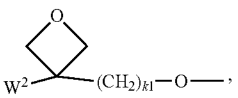

in which $W^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Preference is given to multireactive polymerisable radicals selected from the following formulae:

$-X\text{-alkyl-}CHP^x-CH_2-CH_2P^y$ I*a $-X\text{-alkyl-}C(CH_2P^x)(CH_2P^y)-CH_2P^z$ I*b $-X\text{-alkyl-}CHP^xCHP^y-CH_2P^z$ I*c $-X\text{-alkyl-}C(CH_2P^x)(CH_2P^y)-C_{aa}H_{2aa+1}$ I*d $-X\text{-alkyl-}CHP^x-CH_2P^y$ I*e $-X\text{-alkyl-}CHP^xP^y$ I*f $-X\text{-alkyl-}CP^xP^y-C_{aa}H_{2aa+1}$ I*g $-X\text{-alkyl-}C(CH_2P^v)(CH_2P^w)-CH_2OCH_2-C(CH_2P^x)(CH_2P^y)CH_2P^z$ I*h $-X\text{-alkyl-}CH((CH_2)_{aa}P^x)((CH_2)_{bb}P^y)$ I*i $-X\text{-alkyl-}CHP^xCHP^y-C_{aa}H_{2aa+1}$ I*k in which alkyl denotes a single bond or straight-chain or branched alkylene having 1 to 12 C atoms, in which one or more non-adjacent $CH_2$ groups may each be replaced, independently of one another, by $-C(R^x)=C(R^x)-$, $-C\equiv C-$, $-N(R^x)-$, $-O-$, $-S-$, $-CO-$, $-CO-O-$, $-O-CO-$, $-O-CO-O-$ in such a way that O and/or S atoms are not linked directly to one another, and in which, in addition, one or more H atoms may be replaced by F, Cl or CN, where $R^x$ has one the above-mentioned meaning, $_{aa}$ and $_{bb}$ each, independently of one another, denote 0, 1, 2, 3, 4, 5 or 6, X has one of the meanings indicated for X', and $P^v$ to $P^z$ each, independently of one another, have one of the meanings indicated above for P.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by $-O-$, $-S-$, $-NH-$, $-NR^{xx}-$, $-SiR^{xx}R^{yy}-$, $-CO-$, $-COO-$, $-OCO-$, $-OCO-O-$, $-S-CO-$, $-CO-S-$, $-NR^{xx}-CO-O-$, $-O-CO-NR^{0xx}-$, $-NR^{xx}-CO-NR^{yy}-$, $-CH=CH-$ or $-C\equiv C-$ in such a way that O and/or S atoms are not linked directly to one another, X' denotes $-O-$, $-S-$, $-CO-$, $-COO-$, $-OCO-$, $-O-COO-$, $-CO-NR^{xx}-$, $-NR^{xx}-CO-$, $-NR^{xx}-CO-NR^{yy}-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^{xx}-$, $-CY^{xx}=CY^{xx}-$, $-C\equiv C-$, $-CH=CH-COO-$, $-OCO-CH=CH-$ or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably $-O-$, $-S-$ $-CO-$, $-COO-$, $-OCO-$, $-O-COO-$, $-CO-NR^{xx}-$, $-NR^{xx}-CO-$, $-NR^{xx}-CO-NR^{yy}-$ or a single bond.

Typical spacer groups Sp' are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^{xx}R^{yy}-O)_{p1}-$, in which p1 is an integer from 1 to 12, q1 is an integer from 1 to 3, and $R^{xx}$ and $R^{yy}$ have the above-mentioned meanings.

Particularly preferred groups —X'-Sp'- are $-(CH_2)_{p1}-$, $-O-(CH_2)_{p1}-$, $-OCO-(CH_2)_{p1}-$, $-OCOO-(CH_2)_{p1}-$, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

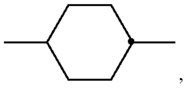
,
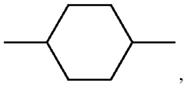
,
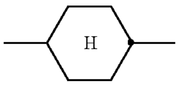
and
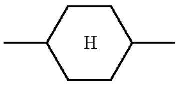

denote trans-1,4-cyclohexylene, and

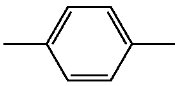
and
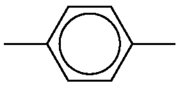

denote 1,4-phenylene.

For the present invention the groups $-COO-$ $-C(=O)O-$ or $-CO_2-$ denote an ester group of formula

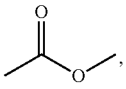
, and the groups $-OCO-$, $-OC(=O)-$, $-O_2C-$ or $-OOC-$ denote an ester group of formula

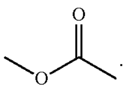
.

On the molecular level, the birefringence of a liquid crystal depends on the anisotropy of the polarizability ($\Delta\alpha=\alpha_{\parallel}-\alpha_{\perp}$). "Polarizability" means the ease with which the electron distribution in the atom or molecule can be distorted. The polarizability increases with greater number of electrons and a more diffuse electron cloud. The polarizability can be calculated using a method described in e.g. Jap. J. Appl. Phys. 42, (2003) p. 3463.

The "optical retardation" at a given wavelength R(λ) (in nm) of a layer of liquid crystalline or birefringent material is defined as the product of birefringence at that wavelength Δn(λ) and layer thickness d (in nm) according to the equation $$R(\lambda) = \Delta n(\lambda) \cdot d$$

The optical retardation R represents the difference in the optical path lengths in nanometres travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that exhibits reverse birefringence dispersion where the magnitude of the birefringence (Δn) increases with increasing wavelength (λ). i.e., $|\Delta n(450)| < |\Delta n(550)|$, or $\Delta n(450)/\Delta n(550) < 1$, where Δn(450) and Δn(550) are the birefringence of the material measured at wavelengths of 450 nm and 550 nm respectively. In contrast, positive (optical) dispersion" means a material or layer having $|\Delta n(450)| > |\Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003). "Flat (optical) dispersion" means a material or layer having $|\Delta n(450)| > |\Delta n(550)|$ or $\Delta n(450)/\Delta n(550) = 1$.

Since the optical retardation at a given wavelength is defined as the product of birefringence and layer thickness as described above [$R(\lambda) = \Delta n(\lambda) \cdot d$], the optical dispersion can be expressed either as the "birefringence dispersion" by the ratio Δn(450)/Δn(550), or as "retardation dispersion" by the ratio R(450)/R(550), wherein R(450) and R(550) are the retardation of the material measured at wavelengths of 450 nm and 550 nm respectively. Since the layer thickness d does not change with the wavelength, R(450)/R(550) is equal to Δn(450)/Δn(550). Thus, a material or layer with negative or reverse dispersion has $R(450)/R(550) < 1$ or $|R(450)| < |R(550)|$, a material or layer with positive or normal dispersion has $R(450)/R(550) > 1$ or $|R(450)| > |R(550)|$, and a material or layer with flat dispersion has $R(450)/R(550) = 1$ or $|R(450)| \approx |R(550)|$.

In the present invention, unless stated otherwise "optical dispersion" means the retardation dispersion i.e., the ratio R(450)/R(550).

The term "high dispersion" means that the absolute value of the dispersion shows a large deviation from 1, whereas the term "low dispersion" means that the absolute value of the dispersion shows a small deviation from 1. Thus, for example, "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co. This instrument can measure the optical retardance in nanometres of a birefringent sample e.g., Quartz over a range of wavelengths typically, 370 nm to 2000 nm. From this data it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, NE, USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer. In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate". An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n = n_e - n_o$$

wherein $n_e$ is the extraordinary refractive index and $n_o$ is the ordinary refractive index, and the effective average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. Δn can then be calculated from the above equations.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius, and all temperature differences are quoted in differential degrees.

DETAILED DESCRIPTION OF THE INVENTION

Preferably the compounds of formula T are selected from the group of compounds wherein at least one of $R^{T1}$ and $R^{T2}$ denotes P-Sp- and the other $R^{T1}$ or $R^{T2}$ denotes preferably a hydrogen atom, F, Cl, Br, I, a pentafluorosulfuranyl group, a cyano group, a nitro group, an isocyano group, a thioisocyano group, or a linear or branched alkyl group having 1 to 20 carbon atoms, in which any hydrogen atom in the group may be substituted with F and one $—CH_2—$ or two or more non-adjacent $—CH_2—$ may be each independently substituted with —O—, —S—, $—OCH_2—$, $—CH_2O—$, —CO—, —COO—, —OCO—, —CO—S—, —S—CO—, —O—CO—O—, —CO—NH—, —NH—CO—, $—SCH_2—$, $—CH_2S—$, $—CF_2O—$, $—OCF_2—$, $—CF_2S—$, $—SCF_2—$, —CH=CH—COO—, —CH=CH—OCO—, —COO—CH=CH—, —OCO—CH=CH—, $—COO—CH_2CH_2—$, $—OCO—CH_2CH_2—$, $—CH_2CH_2—COO—$, $—CH_2CH_2—OCO—$, $—COO—CH_2—$, $—OCO—CH_2—$, $—CH_2—COO—$, $—CH_2—OCO—$, —CH=CH—, —N=N—, —CH=N—N=CH—, —CF=CF—, or —C≡C—, more preferably a hydrogen atom, F, Cl, or a linear or branched alkyl group having 1 to 12 carbon atoms, in which one $—CH_2—$ or two or more non-adjacent $—CH_2—$ may be each independently substituted with —O—, —COO—, —OCO—, or —O—CO—O—, even more preferably a hydrogen atom, F, Cl, or a linear alkyl group or linear alkoxy group having 1 to 8 carbon atoms, and particularly preferably a linear alkyl group or linear alkoxy group having 1 to 8 carbon atoms.

In another preferred embodiment, both $R^{T1}$ and $R^{T2}$ denote P-Sp-.

In a further preferred embodiment $A^{T1}$ and $A^{T2}$ in formula T each independently in each occurrence denotes preferably a 1, 4-phenylene group, a 1,4-cyclohexylene group, or a naphthalene-2, 6-diyl group, which may be unsubstituted or may be substituted each and independently in each occurrence with one or more of the substituent groups L:

A-I

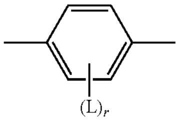

A-II

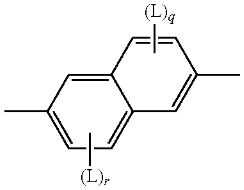

A-III

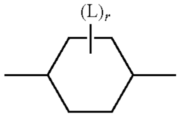

wherein r denotes an integer between 0 and 4, p and q denotes each and independently an integer between 0 and 3.

In a further preferred embodiment $A^{T1}$ and $A^{T2}$ in formula T each independently and in each occurrence denote a group selected from formulae A-1 to A-11 below,

A-1

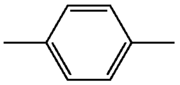

-continued

A-2

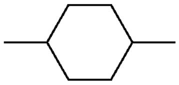

A-3

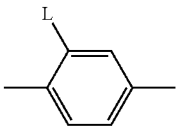

A-4

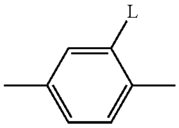

A-5

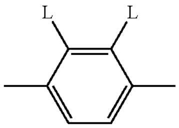

A-6

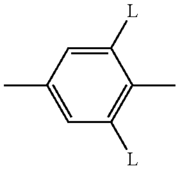

A-7

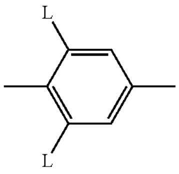

A-8

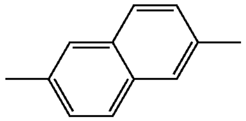

A-9

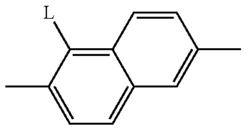

A-10

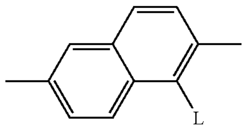

A-11

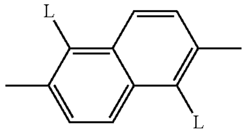

further preferred a group selected from formulae (A-1) to (A-8), and particularly preferred a group selected from formulae (A-1) to (A-4), more preferably a group selected from formulae (A-1) and/or (A-2).

In a preferred embodiment, in formula T the group $A^{T1}$ connected to the group $Z^{T1}$ adjacent to the group $G^{T1}$, and the group represented by $A^{T2}$ connected to the group $Z^{T2}$ adjacent to the group $G^{T1}$, each independently denote preferably a 1, 4-cyclohexylene group, which may be unsubstituted or may be substituted with one or more of the substituent groups L (A-III), and more preferably a group represented by formula A-2.

In another preferred embodiment and when a plurality of the groups $A^{T1}$ and $A^{T2}$ exist, the group represented by $A^{T1}$ and $A^{T2}$ is selected independently from $A^{T1}$ and $A^{T2}$ adjacent to $G^{T1}$, groups $A^{T1}$ and $A^{T2}$ non-adjacent or adjacent to $G^{T1}$ may be identical of different and each independently represent preferably a 1, 4-phenylene group or a naphthalene-2, 6-diyl group which may be unsubstituted or may be substituted with one or more of the substituent groups L, more preferably a group selected from formulae (A-1) and (A-3) to (A-11), further preferably a group selected from formulae (A-1) and (A-3) to (A-8), and particularly preferably a group selected from formulae (A-1), (A-3), and (A-4).

If a plurality of $Z^{T1}$ exist, they may be different from each other or identical to each other, if a plurality of $Z^{T2}$ exist, they may be different from each other or identical to each other.

Further, when a plurality of $Z^{T1}$ and $Z^{T2}$ exist, each of the group each independently represent preferably —$OCH_2$—, —$CH_2O$—, —COO—, —OCO—, —$CF_2O$—, —$OCF_2$—, —$CH_2CH_2$—, —$CF_2CF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —CH═CH—, —CF═CF—, —C≡C—, or a single bond, more preferably —$OCH_2$—, —$CH_2O$—, —COO—, —OCO—, —$CF_2O$—, —$OCF_2$—, —$CH_2CH_2$—, —COO—$CH_2CH_2$—, —OCO—$CH_2CH_2$—, —$CH_2CH_2$—COO—, —$CH_2CH_2$—OCO—, —CH═CH—, —C≡C—, or a single bond, further preferably —$OCH_2$—, —$CH_2O$—, —COO—, —OCO—, —$CF_2O$—, —$OCF_2$—, or a single bond, more preferably —$OCH_2$—, —$CH_2O$—, —COO—, —OCO—, or a single bond, and particularly preferably —$OCH_2$—, —$CH_2O$—, —COO—, or —OCO—.

In formula T, m1 and m2 each independently represent an integer of 1 to 6, preferably m1+m2 denotes an integer of 1 to 6.

More preferably m1 and m2 each independently represent an integer of 1 to 3, and particularly preferably an integer of 1 or 2. Preferably, m1 and m2 are identical to each other, however it is likewise preferred that m1 and m2 are different.

Preferred compounds of represented by formula T are preferably selected from the group of compounds of formula (Ta) to (Tf):

$R^{T1}$-$A^{T11}$-$Z^{T11}$-$G^{T1}$-$Z^{T21}$-$A^{T21}$-$R^{T2}$ Ta $R^{T1}$-$A^{T11}$-$Z^{T11}$-$G^{T1}$-$Z^{T21}$-$A^{T21}$-$Z^{T22}$-$A^{T22}$-$R^{T2}$ Tb $R^{T1}$-$A^{T11}$-$Z^{T11}$-$G^{T1}$-$Z^{T21}$-$A^{T21}$-$Z^{T22}$-$A^{T22}$-$Z^{T23}$-$A^{T23}$-$R^{T2}$ Tc $R^{T1}$-$A^{T11}$-$Z^{T11}$-$A^{T12}$-$Z^{T12}$-$G^{T1}$-$Z^{T21}$-$A^{T21}$-$Z^{T22}$-$A^{T22}$-$R^{T2}$ Td $R^{T1}$-$A^{T11}$-$Z^{T11}$-$A^{T12}$-$Z^{T12}$-$G^{T1}$-$Z^{T21}$-$A^{T21}$-$Z^{T22}$-$A^{T22}$-$Z^{T23}$—$R^{T2}$ Te $R^{T1}$-$A^{T11}$-$Z^{T11}$-$A^{T12}$-$Z^{T12}$-$A^{T13}$-$Z^{T13}$-$G^{T1}$-$Z^{T21}$-$A^{T21}$-$Z^{T22}$-$A^{T22}$-$Z^{T23}$-$A^{T23}$-$R^{T2}$ Tf wherein, $R^{T1}$, $R^{T2}$, and $G^{T1}$ have the same meanings as those in formula T, $A^{T11}$ to $A^{T23}$ have the same meanings as $A^{T1}$ and $A^{T2}$ in formula T, $Z^{T11}$ to $Z^{T23}$ have the same meanings as $Z^{T1}$ and $Z^{T2}$ in formula T.

Preferable forms of each of the groups $R^{T1}$, $R^{T2}$, $G^{T1}$, $A^{T11}$ to $A^{T22}$ and $Z^{T11}$ to $Z^{T22}$ in formulae (Ta) to (Tf) are the same as those for formula T.

Further preferred compounds of represented by formula T are preferably selected from the group of compounds of formula (Td).

Preferred compounds of represented by formula T are preferably selected from the group of compounds of formula (Td-1) or (Td-2):

P-Sp-$A^{T11}$-$Z^{T11}$-$A^{T12}$-$Z^{T12}$-$G^{T1}$-$Z^{T21}$-$A^{T21}$-$Z^{T22}$-$A^{T22}$-$R^{T21}$ Td-1

P-Sp-$A^{T11}$-$Z^{T11}$-$A^{T12}$-$Z^{T12}$-$G^{T1}$-$Z^{T21}$-$A^{T21}$-$Z^{T22}$-$A^{T22}$-Sp-P Td-2 wherein,

P, Sp and $G^{T1}$ have the same meanings as those in formula T, $A^{T11}$ to $A^{T22}$ have the same meanings as $A^{T1}$ and $A^{T2}$ in formula T, $Z^{T11}$ to $Z^{T22}$ have the same meanings as $Z^{T1}$ and $Z^{T2}$ in formula T.

Further preferred compounds of represented by formula T are preferably selected from the group of compounds of formula (Td-2) and preferably selected from the group of compounds of formula (Td-2-1) to (Td-2-3):

P-Sp-$A^{T11}$-$Z^{T11}$-$A^{T12}$-$Z^{T12}$-$G^{T1}$-$Z^{T21}$-$A^{T21}$-$Z^{T22}$-$A^{T22}$-Sp-P Td-2-1

P-Sp-$A^{T11}$-$A^{T12}$-$Z^{T12}$-$G^{T1}$-$Z^{T21}$-$A^{T21}$-$Z^{T22}$-$A^{T22}$-Sp-P Td-2-2

P-Sp-$A^{T11}$-$A^{T12}$-$Z^{T12}$-$G^{T1}$-$Z^{T21}$-$A^{T21}$-$A^{T22}$-Sp-P Td-2-3 wherein,

P, Sp and $G^{T1}$ have the same meanings as those in formula T, $A^{T11}$ to $A^{T22}$ have the same meanings as $A^{T1}$ and $A^{T2}$ in formula T, $Z^{T11}$ to $Z^{T22}$ have the same meanings as $Z^{T1}$ and $Z^{T2}$ in formula T.

Further preferred compounds of represented by formula T are preferably selected from the group of compounds of formula (Td-2-1) and/or (Td-2-3) and are preferably selected from the group of compounds of the following formula:

P-Sp-$X^{11}$-$A^{T11}$-$Z^{T11}$-$A^{T12}$—COO-$G^{T1}$—OOC-$A^{T21}$-$Z^{T22}$-$A^{T22}$-$X^{21}$-Sp-P Td-2-1a

P-Sp-$X^{11}$-$A^{T11}$-$Z^{T11}$-$A^{T12}$—$CH_2O$-$G^{T1}$—$OCH_2$-$A^{T21}$-$Z^{T22}$-$A^{T22}$-$X^{21}$-Sp-P Td-2-1 b

P-Sp-$X^{11}$-$A^{T11}$-$A^{T12}$—COO-$G^{T1}$—OOC-$A^{T21}$-$A^{T22}$-$X^{21}$-Sp-P Td-2-3a

P-Sp-$X^{11}$-$A^{T11}$-$A^{T12}$—$CH_2O$-$G^{T1}$—$OCH_2$-$A^{T21}$-$A^{T22}$-$X^{21}$-Sp-P Td-2-3b wherein, P, Sp and $G^{T1}$ have the same meanings as those in formula T, $A^{T11}$ to $A^{T22}$ have the same meanings as $A^{T1}$ and $A^{T2}$ in formula T, $Z^{T11}$ to $Z^{T22}$ have the same meanings as $Z^{T1}$ and $Z^{T2}$ in formula T and $X^{11}$ and $X^{21}$ has one of the meanings as given for X' as given above.

Further preferred compounds of formula T are preferably selected from the group of compounds of formula (Td-2-1) and/or (Td-2-3) that are preferably selected from the group of compounds of the following formulae:

P-Sp-$X^{11}$-PheL-OOC—CYC—COO-$G^{T1}$—OOC—CYC—COO-PheL-$X^{21}$-Sp-P Td-2-1a-1

P-Sp-$X^{11}$-PheL—COO—CYC—COO-$G^{T1}$—OOC—CYC—OOC-PheL-$X^{21}$-Sp-P Td-2-1a-2

P-Sp-$X^{11}$—CYC—OOC—CYC—COO-$G^{T1}$—OOC—CYC—COO—CYC—$X^{21}$-Sp-P Td-2-1a-4

P-Sp-$X^{11}$—CYC—COO—CYC—COO-$G^{T1}$—OOC—CYC—OOC—CYC—$X^{21}$-Sp-P Td-2-1a-4

P-Sp-$X^{11}$—CYC—CYC—COO-$G^{T1}$—OOC—CYC—CYC—$X^{21}$-Sp-P Td-2-3a-1

P-Sp-$X^{11}$-PheL-CYC—COO-$G^{T1}$—OOC—CYC-PheL-$X^{21}$-Sp-P Td-2-3a-2

P-Sp-$X^{11}$-PheL-PheL—COO-$G^{T1}$—OOC-PheL-PheL-$X^{21}$-Sp-P Td-2-3a-3

P-Sp-$X^{11}$—CYC—CYC—$CH_2O$-$G^{T1}$—$OCH_2$—CYC—CYC—$X^{21}$-Sp-P Td-2-3b-1

P-Sp-$X^{11}$-PheL-CYC—$CH_2O$-$G^{T1}$—$OCH_2$—CYC-PheL-$X^{21}$-Sp-P Td-2-3b-2

P-Sp-$X^{11}$-PheL-PheL—$CH_2O$-$G^{T1}$—$OCH_2$-PheL-PheL-$X^{21}$-Sp-P Td-2-3b-3 wherein

P, Sp and $G^{T1}$ have the same meanings as those in formula T, and $X^{11}$ and $X^{21}$ have one of the meanings as given for X' as given above, CYC denotes 1,4-cyclohexylene, PheL denotes 1,4-phenylene wherein one or more H atoms can be substituted by L, which have on each occurrence one of the same meanings as those in formula T.

Preferably in the group of compounds of formulae (Td-2-1a-1) to (Td-2-3b-3) and subformulae thereof, P denotes preferably each and independently an acrylate or methacrylate group, and/or Sp denotes preferably each and independently —$(CH_2)_{p1}$—, in which p1 is an integer from 1 to 12, preferably 3 to 6, and/or $X^{11}$ and $X^{21}$ denotes preferably each and independently —O—, —S— —CO—, —COO—, —OCO—, —O—COO—, preferably —O—, and/or $G^{T1}$ denotes preferably

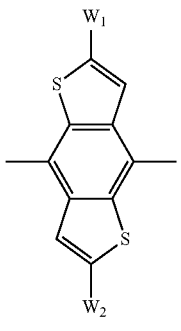
or
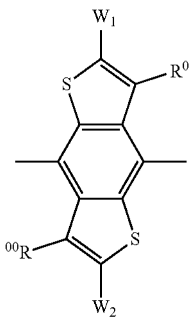

$R^0$ and $R^{00}$ denotes branched or straight chain alkyl having 1 to 5 C-atoms, $W^1$ and $W^2$ denotes each and independently

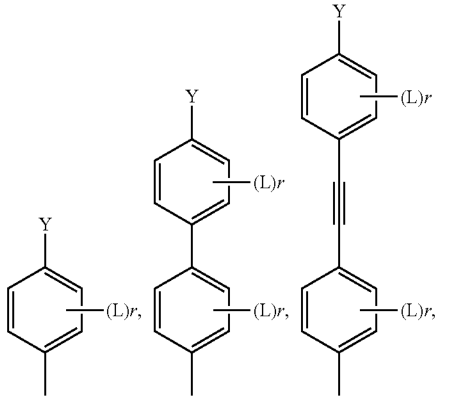

preferably

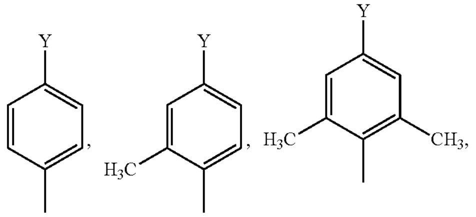

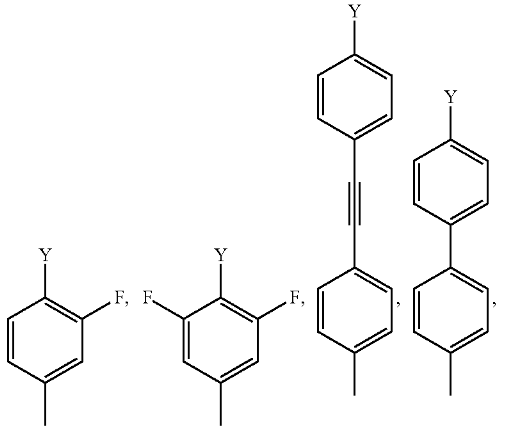

wherein Y has one of the meanings as given under formula T, and preferably denotes F or H, and/or CYC denotes 1,4-cyclohexylene, and/or PheL denotes 1,4-Phenylene.

The compounds of the formulae (T), (TA-1) to (TA-3) and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The compounds of formula T can beneficially utilized in polymerizable LC media.

Preferably, such a polymerisable LC medium comprises one, two or more compounds of formula T, more preferably one compound of formula T.

In a preferred embodiment, the compounds of formula T can be utilized together with polymerizable T-shaped compounds as disclosed e.g., in US 2015175564, WO 17079867 A1, WO16104317 A, US 2015277007 A1, or WO 16171041 A1 and include compounds represented by formulae 1 to 5 of US 2015175564 A1 or H-shaped compounds as disclosed in WO 2008/119427 A1.

The proportion of compounds of formula T in a polymerisable liquid-crystalline material according to the present invention, is preferably in the range from 1 to 99.9% by weight, more preferably in the range from 2 to 80% by weight and even more preferably in the range from 3 to 60% by weight.

Preferably the compounds of formula T are utilized with other preferably mesogenic or liquid crystalline compounds. More preferably the LC material comprises one or more additional compounds selected from reactive mesogens (RMs), most preferably selected from mono- and direactive RMs.

Preferably, the polymerizable LC medium comprises one or more di- or multireactive mesogenic compound selected from the group of compounds of formula DRM $$P^1\text{-}Sp^1\text{-}MG\text{-}Sp^2\text{-}P^2 \qquad \text{DRM}$$

wherein

- $P^1$ and $P^2$ independently of each other denote a polymerisable group (P),
- $Sp^1$ and $Sp^2$ independently of each other are a spacer group (Sp) or a single bond, and
- MG is a rod-shaped mesogenic group, which is preferably selected of formula MG $$\text{-}(A^{1D}\text{-}Z^{1D})_n\text{-}A^{2D}\text{-} \qquad \text{MG}$$

wherein

- $A^{1D}$ and $A^{2D}$ denote, in case of multiple occurrence independently of one another, an aromatic or alicyclic group, which optionally contains one or more heteroatoms selected from N, O and S, and is optionally mono- or polysubstituted by $L^1$,
- $L^1$ has each and independently one of the meanings as given above in formula T,
- $R^{00}$ and $R^{000}$ independently of each other denote H or alkyl with 1 to 12 C-atoms,
- $Z^{1D}$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{000}$, —$NR^{00}$—CO—O—, —O—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH═N—, —N═CH—, —N═N—, —CH═$CR^{00}$—, —$CY^1$═$CY^2$—, —C≡C—, —CH═CH—COO—, —OCO—CH═CH— or a single bond,
- $Y^1$ and $Y^2$ independently of each other denote H, F, Cl or CN,
- n is 1, 2, 3 or 4, preferably 1 or 2, most preferably 2,
- n1 is an integer from 1 to 10, preferably 1, 2, 3 or 4,
- whereby the compounds of formula T are excluded.

Preferred groups $A^{1D}$ and $A^{2D}$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Preferred groups $A^{1D}$ and $A^{2D}$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L as defined above.

Preferred groups $Z^{1D}$ are in each occurrence independently from another preferably selected from —COO—, —OCO—, —$CH_2CH_2$—, —$CF_2O$—, —$OCF_2$—, —C═C—, —CH═CH—, —OCO—CH═CH—, —CH═CH—COO—, or a single bond, Very preferred multi or direactive mesogenic compounds of formula DRM are selected from the following formulae:

DRMa1

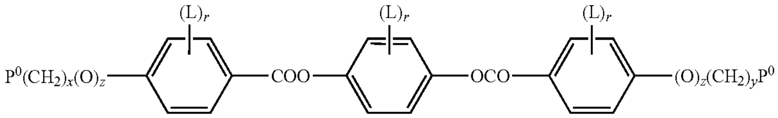

DRMa2

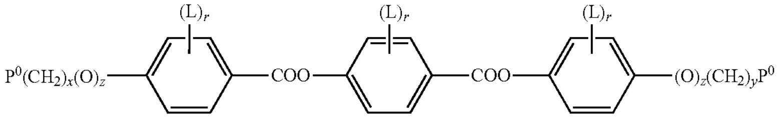

DRMa3

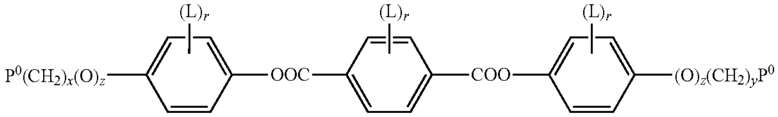

DRMa4

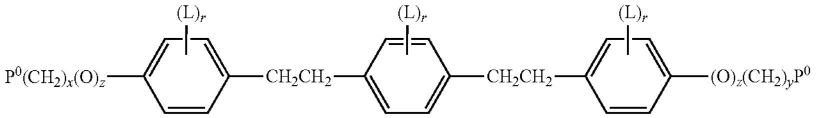

-continued

DRMa5

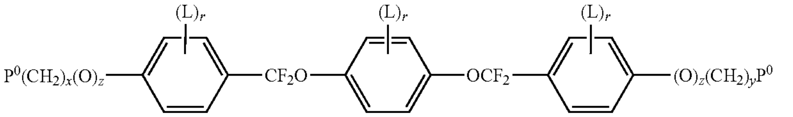

DRMa6

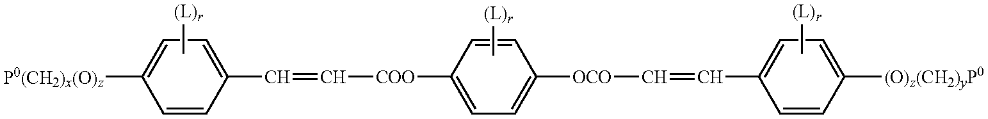

DRMa7

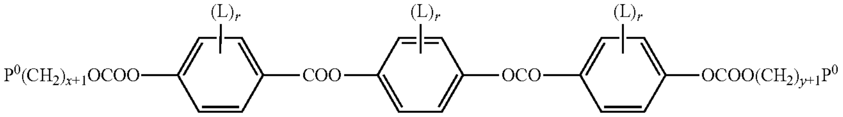

DRMb

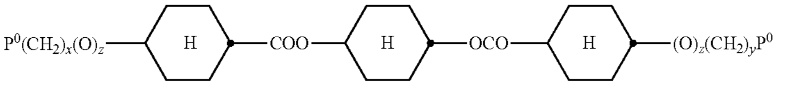

DRMc

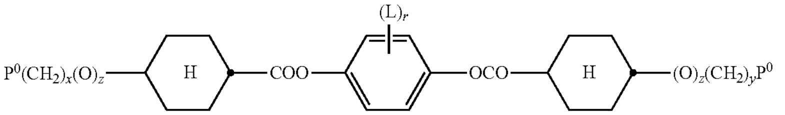

DRMd

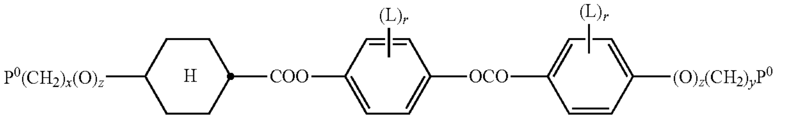

DRMe

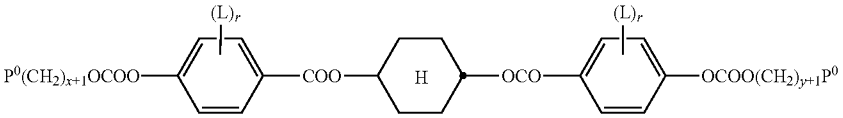

DRMf

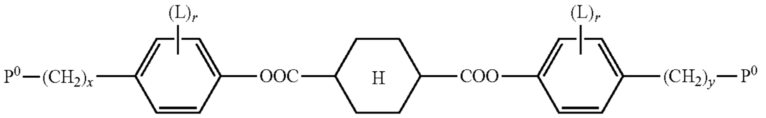

wherein $P^0$ is, in case of multiple occurrence independently of one another, a polymerisable group (P), preferably an acryl, methacryl, oxetane, epoxy, vinyl, heptadiene, vinyloxy, propenyl ether or styrene group, L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, z is each and independently, 0 or 1, with z being 0 if the adjacent x or y is 0.

Especially preferred are compounds of formula DRMa1, DRMa2, DRMa3, DRMa7, and DRMf in particular those of formula DRMa1, DRMa7, and DRMf.

Preferably, the polymerisable LC material additionally comprises at least one monoreactive mesogenic compound, which is preferably selected from formula MRM, $P^1$—$Sp^1$-MG-R MRM wherein $P^1$, $Sp^1$ and MG have one of the meanings given above in formula DRM, R F, Cl, Br, I, —CN, —$NO_2$, —NCO, —NCS, —OCN, —SCN, —C(═O)$NR^xR^y$, —C(═O)X, —C(═O)$OR^x$, —C(═O)$R^y$, —$NR^xR^y$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or C, and $R^x$ and $R^y$ are independently of each other H or alkyl with 1 to 12 C-atoms.

Preferably, the monoreactive mesogenic compounds of formula MRM are selected from the following formulae.

MRM1
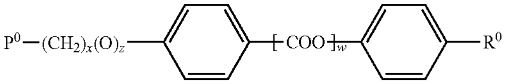
MRM2
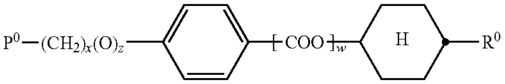
MRM3
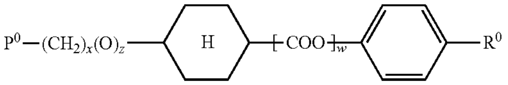
MRM4
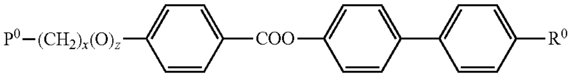
MRM5
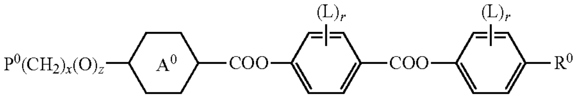
MRM6
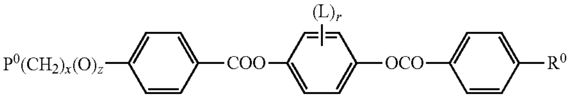
MRM7
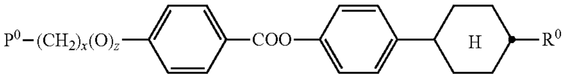
MRM8
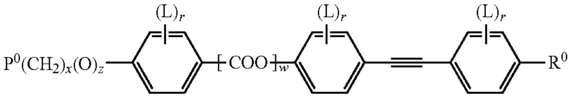
MRM9
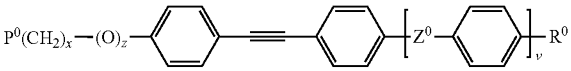
MRM10
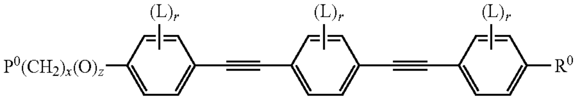
MRM11
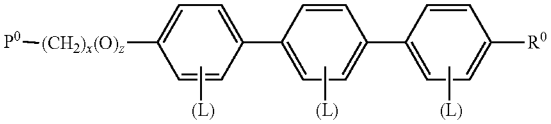
MRM12
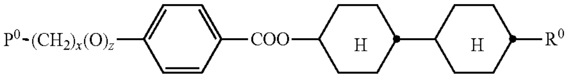
MRM13
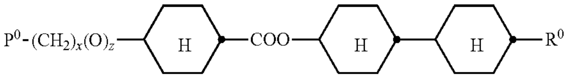
MRM14
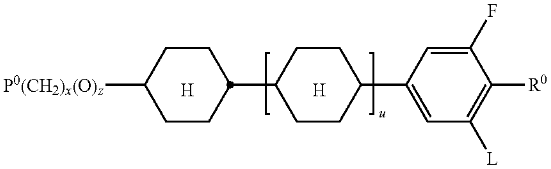
MRM15
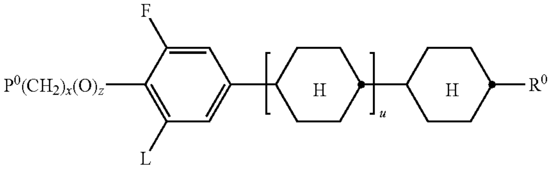
MRM16
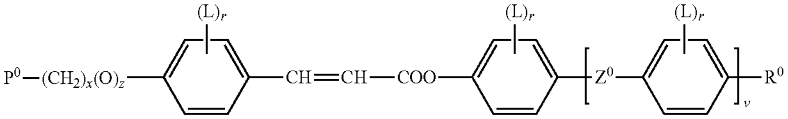
MRM17
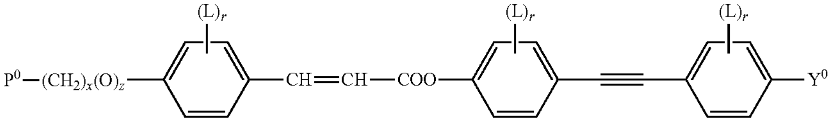
MRM18
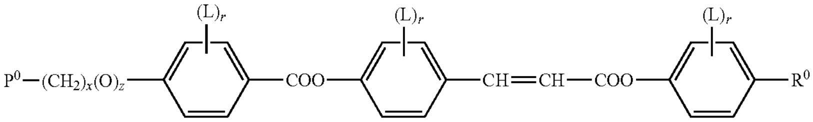

-continued

MRM19

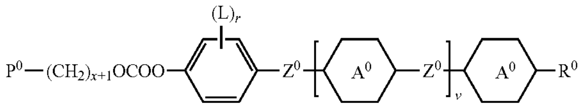

MRM20

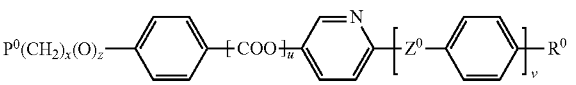

MRM21

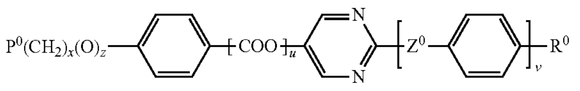

MRM22

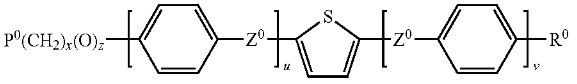

MRM23

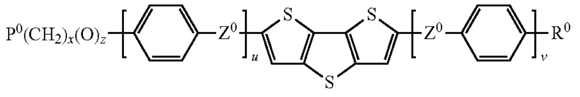

MRM24

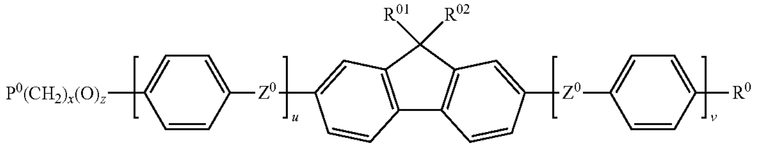

MRM25

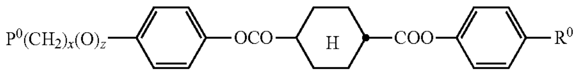

MRM26

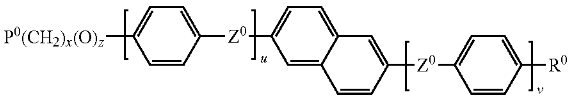

MRM27

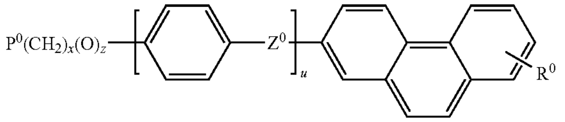

wherein $P^0$, L, r, x, y and z are as defined in formula DRMa-1 to formula DRMe, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes $Y^0$, $Y^0$ is F, Cl, CN, $NO_2$, $OCH_3$, OCN, SCN, $SF_5$, or mono-oligo- or polyfluorinated alkyl or alkoxy with 1 to 4 C atoms, $Z^0$ is —COO—, —OCO—, —$CH_2CH_2$—, —$CF_2O$—, —$OCF_2$—, —CH═CH—, —OCO—CH═CH—, —CH═CH—COO—, or a single bond, $A^0$ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, w is 0 or 1, and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, especially those of formula MRM1, MRM4, MRM6, and MRM7, and in particular those of formulae MRM1 and MRM7.

The compounds of the formulae DRM, MRM, and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The proportion of said mono-, di- or multireactive liquid-crystalline compounds in a polymerisable liquid-crystalline material according to the present invention, is preferably in the range from 30 to 99% by weight, more preferably in the range from 40 to 99% by weight and even more preferably in the range from 50 to 99% by weight.

In a preferred embodiment, the proportion of the di- or multireactive polymerisable mesogenic compounds in a polymerisable liquid-crystalline material according to the present invention, is preferably in the range from 5 to 99% by weight, more preferably in the range from 10 to 97% by weight and even more preferably in the range from 15 to 95% by weight.

In another preferred embodiment, the proportion of the monoreactive polymerisable mesogenic compounds in a polymerisable liquid-crystalline material according to the present invention, is, if present, preferably in the range from 5 to 80% by weight, more preferably in the range from 10 to 75% by weight and even more preferably in the range from 15 to 70% by weight.

In another preferred embodiment, the proportion of the multireactive polymerizable mesogenic compounds in a polymerisable liquid-crystalline material according to the present invention is, if present, preferably in the range from 1 to 30% by weight, more preferably in the range from 2 to 20% by weight.

In another preferred embodiment the polymerisable LC material does not contain polymerizable mesogenic compounds having more than two polymerisable groups.

In another preferred embodiment the polymerisable LC material does not contain polymerizable mesogenic compounds having less than two polymerisable groups.

In another preferred embodiment the polymerisable LC material is an achiral material, i.e. it does not contain any chiral polymerizable mesogenic compounds or other chiral compounds.

In a further preferred embodiment, the polymerisable LC material comprises at least one monoreactive mesogenic compound, preferably selected from formulae MRM-1, at least one direactive mesogenic compound, preferably selected from formula DRMa-1, and at least one compound of formula T, respectively.

In a further preferred embodiment, the polymerisable LC material comprises at least one monoreactive mesogenic compound, preferably selected from formula MRM-7, at least one direactive mesogenic compound, preferably selected from formula DRMa-7 and/or DRMf, and at least one compound of formula T, respectively.

In a further preferred embodiment, the polymerisable LC material comprises at least two monoreactive mesogenic compound, preferably selected from compounds of formulae MRM-1 and/or MRM-7, at least one direactive mesogenic compound, preferably selected from formula DRMa-7 and/DRMf, and at least one compound of formula T, respectively.

In a further preferred embodiment, the polymerisable LC material comprises at least two monoreactive mesogenic compounds, preferably selected from compounds of formulae MRM-1 and/or MRM-7, at least two direactive mesogenic compounds, preferably selected from compounds of formula DRMa-7 and/or DRMf, and at least one compound of formula T, respectively.

In a further preferred embodiment, the polymerisable LC material comprises at least two direactive mesogenic compounds, preferably selected from compounds of formula DRMa-7 and/or DRMf, and at least one compound of formula T, respectively.

In a further preferred embodiment the polymerisable LC material optionally comprises one or more additives or auxiliaries selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, BYK® 354, Byk®361, Byk®361N, BYK®388.

Such-auxiliaries are also available, for example, from 3M as FC4430@.

Such-auxiliaries are also available, for example, from Cytonix as FluorN®561 or FluorN®562.

Such-auxiliaries are also available, for example, from Merck KGaA as Tivida® FL 2300 and Tivida® FL 2500

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Examples of thermally curing auxiliaries, which can be used, are the products BYK®-370, BYK®-373 and BYK®-375 available from BYK.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and BYK®-348.

The wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®—P 104 S, BYK®—P 105, Lactimon®, Lactimon®-WS and Bykumen®.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

Adhesion promoters in the broader sense which may be mentioned are also the substrate wetting auxiliaries already listed, but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

The auxiliaries for improving the scratch resistance include, for example, the abovementioned products TEGO® Rad 2100, TEGO® Rad 2200, TEGO® Rad 2500, TEGO® Rad 2600 and TEGO® Rad 2700, which are available from Tego.

Examples that may be mentioned of light, heat and/or oxidation-stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate (“tocofersolate”), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(a-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(a-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl) butane, 2,2-bis(3,5-di-tert-butyl-4-hydroxyphenyl) propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl) pentane, O—, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)- p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-β-methoxycinnamate, butyl-α-cyano-β-methyl-β-methoxycinnamate and methyl-α-methoxycarbonyl-β-methoxycinnamate, sterically hindered amines, such as bis(2,2,6,6-tetramethylpiperidin-4-yl) sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3, 5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl) sebacate, bis(1-octyloxy-2,2,6,6-tetramethylpiperidin-4-yl)succinate, the condensation product of N,N'-bis(2,2,6,6-tetramethylpiperidin-4-yl) hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino) ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerisable LC material comprises one or more specific antioxidant additives, preferably selected from the Irganox® series, e.g. the commercially available antioxidants Irganox®1076 and Irganox®1010, from Ciba, Switzerland.

In another preferred embodiment, the polymerisable LC material comprises one or more, more preferably of two or more photoinitiators. Typically, radical photoinitiators which can be utilized, are, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, Darcure TPO. Further suitable photoinitiators are preferably selected from commercially available oxime ester photoinitiators such as Oxe02 (Ciba), N-1919 T (Adeka) or SPI-02 to SPI-04 (Samyang).

The concentration of the polymerisation initiator(s) as a whole in the polymerisable LC material is preferably from 0.1 to 10%, very preferably from 0.5 to 8%, more preferably 2 to 6%.

Preferably, the polymerisable LC material comprises besides one or more compounds of formula T, a) one or more di- or multireactive polymerisable mesogenic compounds,
b) one or more photoinitiator,
c) optionally one or more monoreactive polymerisable mesogenic compounds,
d) optionally one or more antioxidative additives,
e) optionally one or more adhesion promotors,
f) optionally one or more surfactants,
g) optionally one or more stabilizers,
h) optionally one or more mono-, di- or multireactive polymerisable non-mesogenic compounds,
i) optionally one or more dyes showing an absorption maximum at the wavelength used to initiate photo polymerisation,
j) optionally one or more chain transfer agents,
k) optionally one or more stabilizers,
l) optionally one or more lubricants and flow auxiliaries, and
m) optionally one or more diluents.

More preferably, the polymerisable LC material comprises, a) one or more compounds of formula T,
b) one or more photoinitiators
c) one or more, preferably two or more, direactive polymerisable mesogenic compounds, preferably in an amount, if present at all, of 10 to 90% by weight, very preferably 15 to 75% by weight, preferably selected from the compounds of formula DRMa-1 and/or DRMa-7, and/or DRMf, or commercially available LC242 from BASF,
d) optionally one or more, preferably two or more, monoreactive polymerisable mesogenic compounds, preferably in an amount of 10 to 95% by weight, very preferably 25 to 85%, preferably selected from compounds of formulae MRM-1 and/or MRM-7,
e) optionally one or more antioxidative additives, preferably selected from esters of unsubstituted and substituted benzoic acids, in particular Irganox®1076 and or Irgacure, and if present, preferably in an amount of 0.01 to 2% by weight, very preferably 0.05 to 1% by weight, f) optionally one or more lubricants and flow auxiliaries, preferably selected from BYK®388, FC 4430, Fluor N 561 and/or Fluor N 562, and if present, preferably in an amount of 0.1 to 5% by weight, very preferably 0.2 to 3% by weight.

The invention further relates to a process for the preparation of the polymerisable LC material as described above and below comprising the step of one or more compounds of formula T with one or more of formula MRM and/or DRM.

The invention further relates to a method of preparing a polymer film by providing a layer of a polymerisable LC material as described above and below onto a substrate, polymerising the polymerisable LC material by photopolymerisation, and optionally removing the polymerised LC material from the substrate and/or optionally providing it onto another substrate.

In a preferred embodiment, the layer of a polymerisable LC material is provided on to a substrate by firstly dissolving the polymerisable LC material in one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), y-butyrolactone. It is also possible to use binary, ternary or higher mixtures of the above solvents.

In case the polymerisable LC material is dissolved in one or more solvents, the total concentration of all solids, including the RMs, in the solvent(s) is preferably from 10 to 60%.

This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

The polymerisable LC material preferably exhibits a uniform alignment throughout the whole layer. Preferably the polymerisable LC material exhibits a uniform planar or homeotropic alignment.

A suitable method used to support homeotropic alignment is to apply corona discharge treatment to plastic substrates, generating alcohol or ketone functional groups on the substrate surface. These polar groups can interact with the polar groups present in RMs or surfactants to promote homeotropic alignment.

For the production of the polymer films according to the invention, the polymerisable compounds in the polymerisable LC material are polymerised or crosslinked (if one compound contains two or more polymerisable groups) by in-situ photopolymerisation.

The photopolymerisation can be carried out in one step. It is also possible to photopolymerise or crosslink the compounds in a second step, which have not reacted in the first step ("end curing").

Photopolymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power, the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp.

Typically, the curing time is preferably 5 minutes, very preferably 3 minutes, most preferably 1 minute. For mass production, short curing times of <30 seconds are preferred.

A suitable UV radiation power is preferably in the range from 5 to 200 mWcm-2, more preferably in the range from 50 to 175 $mWcm^{-2}$ and most preferably in the range from 100 to 150 $mWcm^{-2}$.

In connection with the applied UV radiation and as a function of time, a suitable UV dose is preferably in the range from 25 to 7200 $mJcm^{-2}$ more preferably in the range from 500 to 7200 $mJcm^{-2}$ and most preferably in the range from 3000 to 7200 $mJcm^{-2}$.

Photopolymerisation is preferably performed under an inert gas atmosphere, preferably in a heated nitrogen atmosphere, but also polymerisation in air is possible.

Photopolymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product.

For example, if the polymerised LC film does not mainly act as an optical layer, but e.g., as adhesive, aligning or protection layer, its thickness is preferably not greater than 1 μm, in particular not greater than 0.5 μm, very preferably not greater than 0.2 μm.

For example, uniformly homeotropic or planar aligned polymer films of the present invention can be used as retardation or compensation films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 μm, very preferably from 0.5 to 5 μm, in particular from 0.5 to 3 μm.

The optical retardation (δ(λ)) of a polymer film as a function of the wavelength of the incident beam (λ) is given by the following equation (7):

$$\delta(\lambda) = (2\pi\Delta n \cdot d)/\lambda \quad (7)$$

wherein (Δn) is the birefringence of the film, (d) is the thickness of the film and λ is the wavelength of the incident beam.

According to Snellius law, the birefringence as a function of the direction of the incident beam is defined as $$\Delta n = \sin\Theta/\sin\Psi \quad (8)$$

wherein sin Θ is the incidence angle or the tilt angle of the optical axis in the film and sin Ψ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

Depending on the utilized amounts of the compounds of formulae T and I, the polymer film according to the present invention exhibits negative or reverse dispersion with $R(450)/R(550)<1$ or $|R(450)|<|R(550)|$. In another preferred embodiment and depending on the utilized amounts of the compounds of formulae T and I, the polymer film according to the present invention exhibits positive or normal dispersion has $R(450)/R(550)>1$ or $|R(450)|>|R(550)|$. However, it is likewise preferred that the polymer film according to the present invention exhibits flat dispersion with $R(450)/R(550)=1$ or $|R(450)|\approx|R(550)|$. It is a matter of routine for the skilled person to determine the correct amount of formulae T and I utilized in a polymerizable LC material in accordance with the present invention in order to obtain polymer films exhibiting flat, positive, or negative dispersion.

Preferred optical films of the present invention exhibit a birefringence higher than 0.07, more preferably in the range of 0.08-0.150.

The optical retardation as a function of the thickness of the polymer film according to the present invention is less than 200 nm, preferable less than 180 nm, and even more preferable less than 150 nm.

Especially with regard to the in-cell application, the polymer films according to the present invention exhibit a high temperature stability. Thus, the polymer films exhibit temperature stability up to 300° C., preferably up to 250° C., more preferably up to 230° C.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R—OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it and preferred combinations of the parameters are illustrated.

EXAMPLES
Compound Examples
The material M-1 is prepared in accordance with the following reaction scheme:
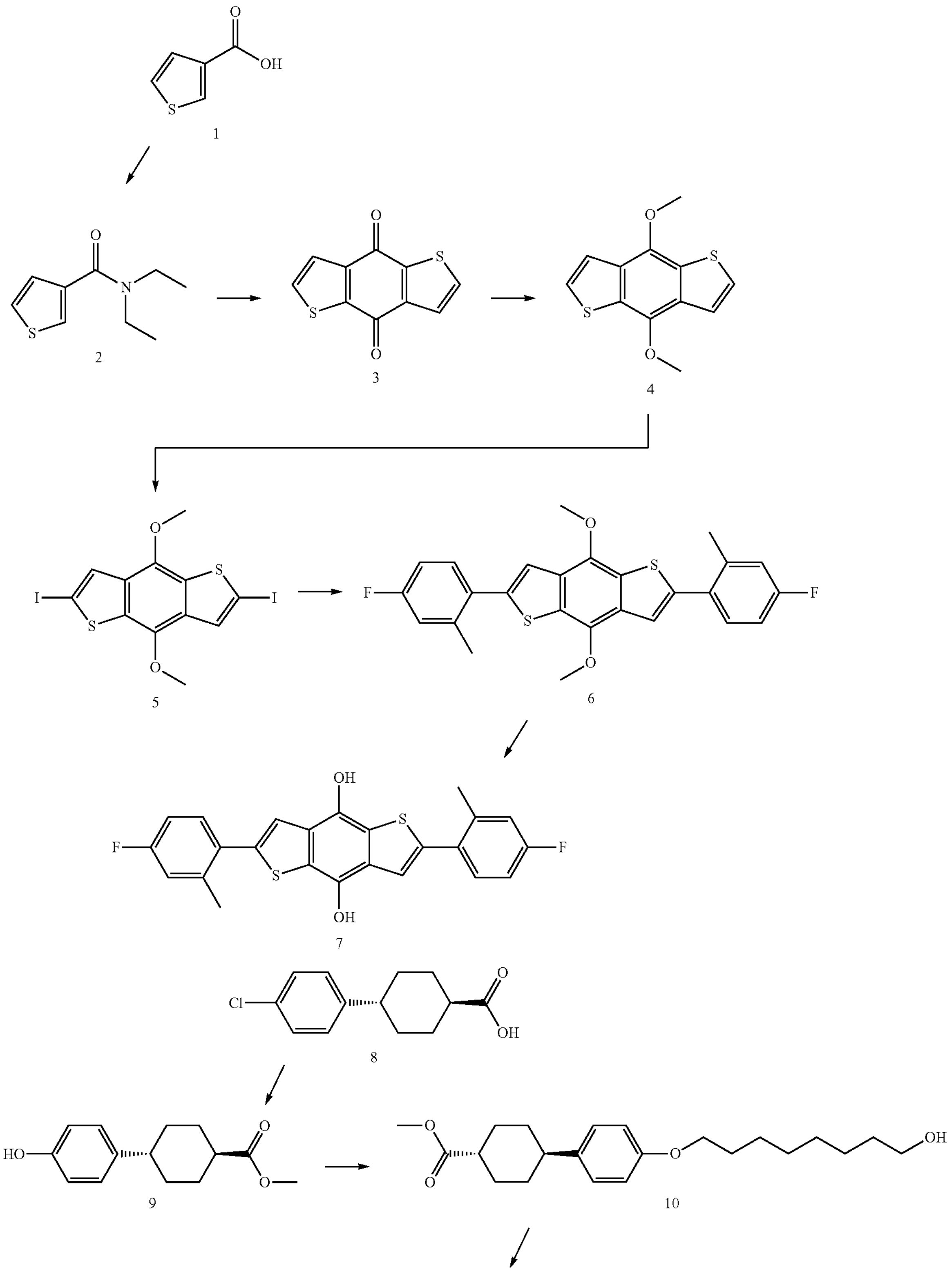
1
2 3 4
5 6
7
8
9 10

-continued

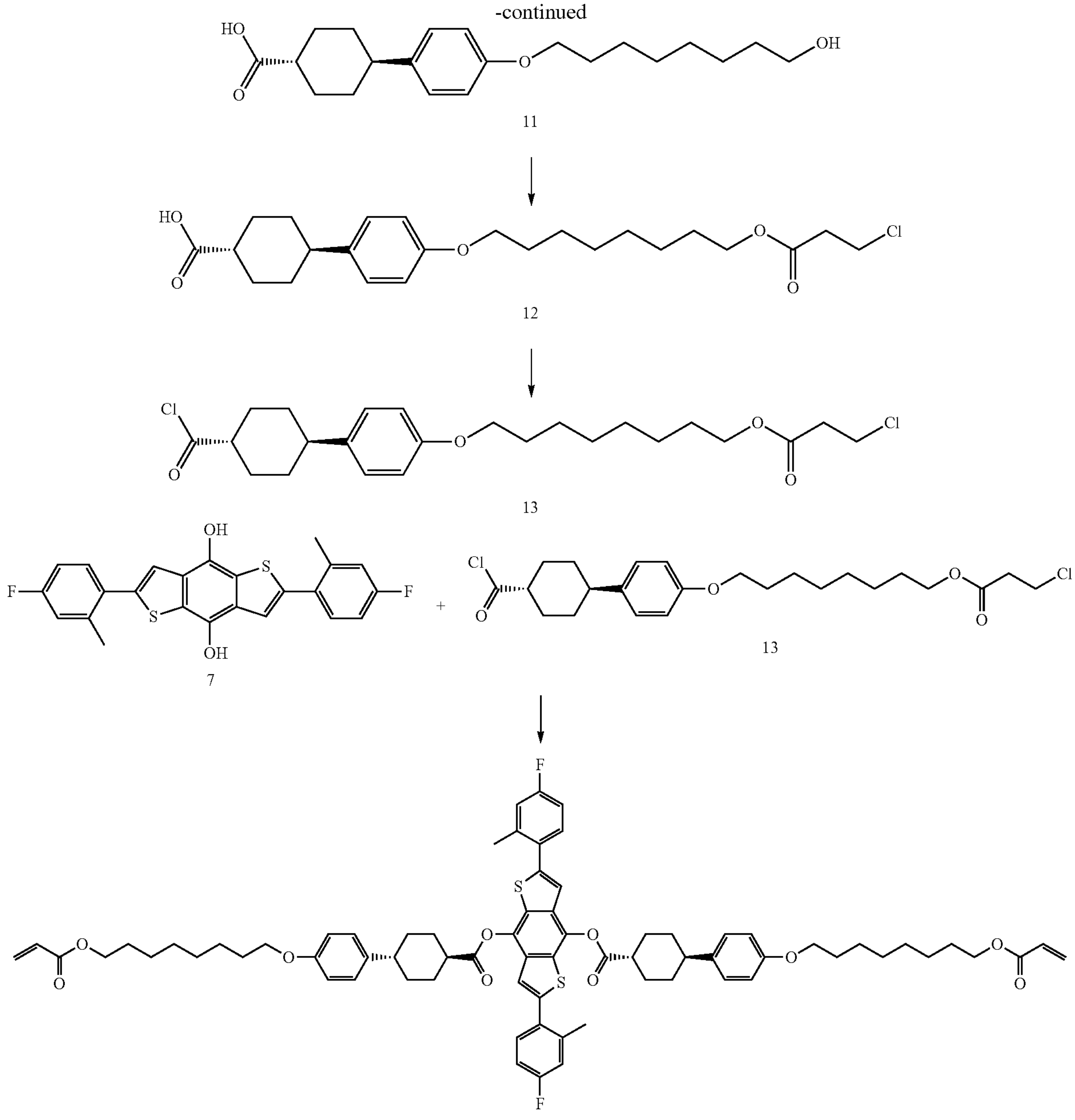

11

12

13

7

13

14

N,N-Diethylthiophene-3-carboxamide (2)

Thiophene-3-carboxylic acid (1) (125.00 g; 965.67 mmol; 1.00 eq.) was mixed with thionyl chloride (178.54 ml; 2423.20 mmol; 2.51 eq.) and the suspension is stirred at room temperature for 3 hours till a clear yellow solution is obtained. The solution is heated to 80° C. for 1.5 h until gas evolution stopped. The mixture is then allowed to cool and excess thionyl chloride removed by distillation under reduced pressure to afford a brown crystalline solid. The solid is dissolved in dry diethyl ether (500 ml) and the solution is added drop wise into a vigorously stirred solution of diethylamine (249.60 ml; 2423.08 mmol; 2.51 eq.) in diethyl ether (1.5 L) at 0° C., over 30 min, to yield a thick white suspension. The reaction is allowed to warm to room temperature and proceed for one hour. The reaction mixture is vacuum filtered, and the white filter cake (diethylammonium chloride) is washed with well with diethyl ether. The filtrate is reduced in vacuo to yield an orange oil (170.32 g). The oil is vacuum distilled at 99.5° C. at $1.4\times10^{-1}$ mBar to yield an off colourless oil (163.75 g).

$^1$H NMR (400 MHz, Chloroform-d) δ 7.48 (dd, J=3.0, 1.2 Hz, 1H), 7.32 (dd, J=5.0, 2.9 Hz, 1H), 7.19 (dd, J=5.0, 1.2 Hz, 1H), 3.44 (m, 4H), 1.21 (t, J=7.8 Hz, 6H).

Benzo[1,2-b:4,5-b']dithiophene-2,8-dione (3)

A solution of N,N-Diethylthiophene-3-carboxamide (163.75 g; 893.48 mmol; 1.00 eq.) in THF, dry (1.00 I) is cooled to −78° C. n-BuLi (564.01 ml; 902.42 mmol; 1.01 eq.) is then added slowly via a dropping funnel over 1 hour. The cooling is removed, and the reaction allowed to warm to room temperature and stirred for 20 hours. The suspension is then poured into 2.5 L of ice/water and mixed until melted. The resulting suspension is filtered, and the filter cake is then washed with water, methanol, water, and methanol again, then air-dried then placed in a vac oven overnight to afford a yellow solid (86.39 g).

2,8-Dimethoxy-benzo[1,2-b:4,5-b']dithiophene (4)

To a stirring solution of Benzo[1,2-b:4,5-b']dithiophene-2,8-dione (86.39 g; 392.20 mmol; 1.00 eq.) in Ethanol 99% denatured with methanol (1.25 I; 21435.70 mmol; 54.65 eq.) and water (1.25 I; 69386.62 mmol; 176.92 eq.) under nitrogen is added sodium borohydride (81.61 g; 2157.10 mmol; 5.50 eq.) portion wise over 60 mins and then allowed to stir for an additional 60 mins. Potassium hydroxide solution (10M, 156.88 ml; 1568.80 mmol; 4.00 eq.) is then added and the mixture left to stir for 30 minutes. The mixture is heated to reflux and dimethyl sulfate (350.00 ml; 3690.55 mmol; 9.41 eq.) added over 2 hours. Reflux is maintained for an additional 2 hours then allowed to cool overnight, GCMS indicated good product formation. Water is then added, and the solution naturalised with $NaHCO_3$ and the mixture is filtered to collect product, washed with water then IMS (×3) the collected solid is then dried in a vac oven overnight at 40° C. to give a sand coloured solid (94.89 g).

$^1$H NMR (400 MHz, Chloroform-d) δ 7.51 (d, J=5.5 Hz, 2H), 7.40 (d, J=5.5 Hz, 2H), 4.14 (s, 6H).

5,11-Diiodo-2,8-dimethoxy-benzodithiophene (5)

To a solution of Tetramethylethylenediamine (4.48 ml; 29.96 mmol; 7.50 eq.) in THF, anhydrous (20.00 ml; 20.00 V) at −78° C. under $N_2$ is added n-butyllithium (5.74 ml; 9.19 mmol; 2.30 eq.) and stirred for 10 minutes. After this time 2,8-dimethoxy-benzodithiophene (1.00 g; 3.99 mmol; 1.00 eq.) is added as a solution in anhydrous THE (10.00 ml; 10.00 V). The temperature is then allowed to rise to −40° C. to deprotonate then cooled back to −78° C. Iodine (2.89 g; 11.38 mmol; 2.85 eq.) is then added and the reaction left overnight without replenishing cooling bath allowing a slow return to room temperature. After this time water is carefully added the reaction mixture, sodium thiosulphate is then added to remove excess iodine. The resulting suspension is then further diluted with water and then filtered. The filter cake is washed with water (×2), methanol, very dilute HCl then methanol (×2) to afford crude product which is dried in a vac oven to give an off white solid (1.655 g) 97% by GCMS.

$^1$H NMR (400 MHz, Chloroform-d) δ 7.67 (s, 2H), 4.06 (s, 6H).

5,11-bis(4-fluoro-2-methylphenyl)-2,8-dimethoxy-benzodithiophene (6)

To a flask charged with 5,11-diiodo-2,8-dimethoxy-benzodithiophene (7.50 g; 14.94 mmol; 1.00 eq.), (4-fluoro-2-methylphenyl)boronic acid (4.85 g; 31.52 mmol; 2.11 eq.), XPhos Pd G3 (505.71 mg; 0.60 mmol; 0.04 eq.) and caesium carbonate (14.60 g; 44.81 mmol; 3.00 eq.) is added 1,4-dioxane (150.00 ml; 20.00 V) and the reaction mixture placed under $N_2$ and heated to 100° C. After 19 hours additional (4-fluoro-2-methylphenyl)boronic acid (1.15 g; 7.47 mmol; 0.50 eq.) and XPhos Pd G3 (100.00 mg; 0.12 mmol; 0.01 eq.) are added and heating continued for 12 hours then allowed to cool. After this time the reaction is allowed to cool, diluted with water and acidified with dilute HCl, the resulting suspension is filtered to afford a brown solid, which is washed well with water (×3) and MeOH (×4). This solid is then dissolved in ethyl acetate (1 L) and heated to ~60° C., dried over MgSO4 filtered and reduced to afford a yellow solid (6.34 g). The crude product is recrystalised from acetonitrile/dichloromethane with hot filtration. The mother liquors are adsorbed onto celite and columned 7-60% dichloromethane in petrol, cleanest fraction combined with recrystalised solid to give final product as an orange solid (3.18 g).

$^1$H NMR (400 MHz, Chloroform-d) b 7.51 (dd, J=8.5, 5.9 Hz, 2H), 7.41 (s, 2H), 7.05 (dd, J=9.6, 2.7 Hz, 2H), 7.00 (td, J=8.3, 2.8 Hz, 2H), 4.17 (s, 6H), 2.53 (s, 6H).

5,11-bis(4-fluoro-2-methylphenyl)-benzodithiophene-2,8-diol (7)

5,11-bis(4-fluoro-2-methylphenyl)-2,8-dimethoxy-benzodithiophene (0.29 g; 0.62 mmol; 1.00 eq.) is dissolved in dichloromethane (10.15 ml; 35.00 V), place under $N_2$ and cooled to −78° C. using a acetone/dry ice bath in oven dried glassware. Boron tribromide (1.55 ml; 1.55 mmol; 2.50 eq.) is then added slowly and stirred for 15 minutes. The cooling bath is then replaced with a water/ice bath the reaction is then left to slowly warm to room temperature overnight. After this time the reaction is quenched with the addition of water (10 ml). The flask is then washed out with dichloromethane and acetone, then reduced in vacuo to removed organic solvents and precipitate product. This is then collected by filtration, washed with water and methanol then dried in a vac oven to afford crude product (0.27 g).

$^1$H NMR (400 MHz, DMSO-$d_6$) δ 9.96 (br. s, 2H), 7.66 (s, 2H), 7.56 (dd, J=8.5, 6.0 Hz, 2H), 7.28 (d, J=10.0 Hz, 2H), 7.17 (t, J=8.2 Hz, 3H).

Methyl 4-(4-hydroxyphenyl)cyclohexane-1-carboxylate (9)

To a flask charged with 4-(4-chlorophenyl)cyclohexane-1-carboxylic acid (3.00 g; 12.57 mmol; 1.00 eq.), $Pd_2dba_3$ (230.17 mg; 0.25 mmol; 0.02 eq.), tBuXPhos (426.94 mg; 1.01 mmol; 0.08 eq.) and potassium hydroxide (2.82 g; 50.27 mmol; 4.00 eq.) is added 1,4-dioxane (30.00 ml; 10.00 V) and water (20.00 ml; 6.67 V). The resulting mixture is placed under $N_2$ and sonicated for 5 mins, then heated to 110° C. for 3.5 hours then allowed to cool. The reaction is diluted with water and extracted with ethyl acetate, the organics are washed with KOH (1M solution), the organics are discarded, and the combined aqueous layer is acidified with Dil. HCl inducing precipitation of free acid. The suspension is extracted with ethyl acetate and the organics, dried over $MgSO_4$, filtered, and reduced to afford a pale-yellow solid (3.47 g, wet), this is recrystalised from MeOH to give an off white solid (1.55 g). The mother liqueurs are reduced to afford a pale-yellow solid (1.52 g).

$^1$H NMR (400 MHz, Acetone-$d_6$) b 10.46 (s, 1H), 8.05 (s, 1H), 7.11-7.02 (m, 2H), 6.79-6.71 (m, 2H), 2.51-2.39 (m, 1H), 2.34 (tt, J=11.8, 3.7 Hz, 1H), 2.08 (d, J=9.9 Hz, 2H), 1.92-1.84 (m, 2H), 1.62-1.41 (m, 6H).

In separate flasks the solids are dissolved in MeOH (~35 ml) and $H_2SO_4$ (conc, 0.1 ml) is added and heated to 70° C. for 4 hours, after this time the reactions are allowed to cool, $NaHCO_3$ solution is added and water and the mixture extracted with ethyl acetate to give an off white solid (1.34 g, 95% GCMS), and a sandy coloured solid (1.51 g, 80% GCMS).

The less pure material is columned 15% then 30% isocratic ethyl acetate in petrol (40-60) to give an off white solid (1.07 g) 100% GCMS, combined with other product to give an off white solid (2.58 g)

$^1$H NMR (400 MHz, Chloroform-d) δ 7.09-7.01 (m, 2H), 6.81-6.72 (m, 2H), 5.41 (s, 1H), 3.70 (s, 3H), 2.45 (tt, J=12.0, 3.5 Hz, 1H), 2.35 (tt, J=12.2, 3.6 Hz, 1H), 2.14-2.03 (m, 2H), 2.00-1.89 (m, 2H), 1.58 (qd, J=12.9, 3.2 Hz, 2H), 1.42 (qd, J=13.0, 3.2 Hz, 2H).

Methyl 4-{4-[(8-hydroxyoctyl)oxy]phenyl}cyclohexane-1-carboxylate (10)

methyl 4-(4-hydroxyphenyl)cyclohexane-1-carboxylate (2.00 g; 8.54 mmol; 1.00 eq.), potassium iodide (0.14 g; 0.85 mmol; 0.10 eq.) and potassium carbonate (2.54 g; 18.36 mmol; 2.15 eq.) are dissolved in N,N-dimethylformamide (20.00 ml; 258.30 mmol; 30.26 eq.). 8-bromooctan-1-ol (1.68 ml; 9.82 mmol; 1.15 eq.) is added and the mixture stirred at room temperature until phenol is depleted by TLC. The reaction mixture is diluted with ethyl acetate, acidified with dilute HCl, washed with water the organics are dried over MgSO4, filtered, and reduced to afford a yellow oil (3.33 g).

$^1$H NMR (400 MHz, Chloroform-d) b 7.15-7.10 (m, 2H), 6.88-6.82 (m, 2H), 3.94 (t, J=6.5 Hz, 2H), 3.71 (s, 3H), 3.66 (t, J=6.6 Hz, 3H), 2.48 (tt, J=11.9, 3.5 Hz, 1H), 2.36 (tt, J=12.2, 3.6 Hz, 1H), 2.11 (dd, J=13.7, 3.6 Hz, 2H), 1.97 (dd, J=13.6, 3.5 Hz, 2H), 1.82-1.72 (m, 2H), 1.68-1.53 (m, 5H), 1.47 (td, J=12.6, 3.2 Hz, 5H), 1.42-1.31 (m, 8H).

4-{4-[(8-hydroxyoctyl)oxy]phenyl}cyclohexane-1-carboxylic acid (11)

To a solution of crude methyl 4-{4-[(8-hydroxyoctyl)oxy]phenyl}cyclohexane-1-carboxylate (3.30 g; 9.10 mmol; 1.00 eq.) in Tetrahydrofuran (35.00 ml; 431.52 mmol; 47.40 eq.) is added lithium hydroxide (0.65 g; 27.31 mmol; 3.00 eq.) in water (15.00 ml; 832.64 mmol; 91.46 eq.). The mixture is placed under N2 and heated to 50° C. over-night. After this time a sample is taken to check for loss of ester. Once complete the reaction is diluted with water, filtered, and acidified with dilute HCl to achieve a pH of 1-2. The resulting precipitate is collected by filtration and washed with water and a small amount of IPA to afford crude product as a white solid. This solid is dissolved in ethyl acetate/Acetone, dried over $MgSO_4$, and reduced in vacuo to afford product as a white solid (2.69 g). This is then recrystalised from acetonitrile with hot filtration to give a white solid (2.133 g).

$^1$H NMR (400 MHz, Chloroform-d) b 7.16-7.08 (m, 2H), 6.89-6.81 (m, 2H), 3.95 (t, J=6.5 Hz, 2H), 3.67 (t, J=6.6 Hz, 2H), 2.49 (tt, J=13.1, 4.1 Hz, 1H), 2.41 (tt, J=12.1, 3.6 Hz, 1H), 2.22-2.12 (m, 2H), 2.05-1.94 (m, 2H), 1.84-1.72 (m, 2H), 1.70-1.25 (m, 15H).

4-[4-({8-[(3-chloropropanoyl)oxy]octyl}oxy)phenyl]cyclohexane-1-carboxylic acid (12)

4-{4-[(8-hydroxyoctyl)oxy]phenyl}cyclohexane-1-carboxylic acid (2.13 g; 6.11 mmol; 1.00 eq.) is dissolved in Pyridine (1.48 ml; 18.34 mmol; 3.00 eq.) and Tetrahydrofuran (20.00 ml; 246.58 mmol; 9.39 V). 3-Chloro-propionyl chloride (1.17 ml; 12.22 mmol; 2.00 eq.) is then added dropwise at room temperature and then heated to 60° C., after two hours additional Pyridine (1.00 ml; 12.41 mmol; 2.03 eq.) is added. After two more hours reaction is left to cool. 3-Chloro-propionyl chloride (1.00 ml; 10.47 mmol; 1.71 eq.) and Pyridine (2.00 ml; 24.83 mmol; 4.06 eq.) are added and the reaction left overnight at 50° C., after this time extracted with ethyl acetate to give a pale yellow semi solid (2.21 g) NMR suggested ~90% product, used without further purification.

$^1$H NMR (400 MHz, Chloroform-d) b 7.13 (dd, J=8.7, 1.9 Hz, 2H), 6.89-6.82 (m, 2H), 4.15 (t, J=6.7 Hz, 2H), 3.95 (t, J=6.5 Hz, 2H), 3.78 (t, J=6.7 Hz, 2H), 2.81 (t, J=6.7 Hz, 2H), 2.56-2.35 (m, 2H), 2.29-2.13 (m, 2H), 2.06-1.95 (m, 2H), 1.84-1.72 (m, 2H), 1.74-1.56 (m, 5H), 1.60-1.41 (m, 4H), 1.38 (q, J=4.3, 3.9 Hz, 6H).

8-{4-[4-(carbonochloridoyl)cyclohexyl]phenoxy}octyl 3-chloropropanoate (13)

To a solution of 4-[4-({8-[(3-chloropropanoyl)oxy]octyl}-oxy)phenyl]cyclohexane-1-carboxylic acid (0.77 g; 1.75 mmol; 1.00 eq.) in Dichloromethane (11.52 ml; 15.00 V) under $N_2$ cooled in an ice bath is added thionyl chloride (0.15 ml; 2.01 mmol; 1.15 eq.) dropwise. N,N-dimethylformamide (one drop) is then added and the reaction allowed to warm to room temperature and left over-night. After this time the solvent is removed in vacuo to yield a light orange oil (0.70 g)

5,11-bis(4-fluoro-2-methylphenyl)-8-[4-(4-{[8-(prop-2-enoyloxy)octyl]oxy}phenyl)cyclohexanecarbonyloxy]-4,10-dithiatricyclo[7.3.0.0$^3$,7]dodeca-1,3(7),5,8,11-pentaen-2-yl 4-(4-{[8-(prop-2-enoyloxy)octyl]oxy}phenyl)cyclohexane-1-carboxylate (14)

A flask is charged with 5,11-bis(4-fluoro-2-methylphenyl)-4,10-benzodithiophene-2,8-diol (0.29 g; 0.66 mmol; 1.00 eq.), triethylamine (0.74 ml; 5.29 mmol; 8.00 eq.) and N,N-dimethylpyridin-4-amine (10.00 mg; 0.08 mmol; 0.12 eq.) in dichloromethane (10.00 ml; 156.60 mmol; 236.79 eq.) and placed under $N_2$. 8-{4-[4-(carbonochloridoyl)cyclohexyl]phenoxy}octyl 3-chloropropanoate (0.67 g; 1.45 mmol; 2.20 eq.) dissolved in dichloromethane (5.00 ml; 78.30 mmol; 118.39 eq.) is then added dropwise, after 2 hours extra acid chloride is added (100 mg) and the reaction left over night. After this time triethylamine (1 ml) and dichloromethane (7.5 ml) is added and warmed to 30° C. and left over a weekend. After this time both esterification and acrylate formation complete. The mixture is diluted with ethyl acetate and poured into water and acidified, extracted with ethyl acetate, gravity filtered, and organics washed with water and brine, dried over $MgSO_4$, filtered, and reduced to afford an orange solid (0.94 g). Purified by column chromatography eluting with 2-20% ethyl acetate in petrol gave product fractions as two peaks, cleanest fractions are reduced to afford a light orange waxy solid (0.25 g) which is dissolved in ethyl acetate, petrol is added until turbidity is observed. Syringe filtered and reduced to give an orange oil (0.24 g) which very slowly crystallised. 96.1% by HPLC.

$^1$H NMR (400 MHz, Chloroform-d) δ 7.16-7.11 (m, 4H), 7.09 (s, 4H), 6.89-6.80 (m, 4H), 6.40 (dd, J=17.4, 1.5 Hz, 2H), 6.12 (dd, J=17.3, 10.4 Hz, 2H), 5.81 (dd, J=10.4, 1.5 Hz, 2H), 4.15 (t, J=6.7 Hz, 4H), 3.93 (t, J=6.5 Hz, 4H), 2.56 (dtt, J=27.6, 12.0, 3.5 Hz, 4H), 2.30-2.21 (m, 4H), 2.07-1.97 (m, 4H), 1.82-1.61 (m, 12H), 1.52 (dd, J=12.6, 3.2 Hz, 3H), 1.49-1.41 (m, 5H), 1.41-1.35 (m, 12H).

$^{13}$C NMR (101 MHz, Chloroform-d) δ 174.36, 166.35, 157.48, 148.14, 138.71, 130.46, 130.45, 128.64, 127.54, 122.34, 114.39, 67.93, 64.67, 43.06, 42.65, 33.44, 29.71, 29.31, 29.26, 29.18, 28.60, 26.00, 25.87.

In analogy to the above-described procedure the following compounds M-2 to M-60 are synthesized:
M-2
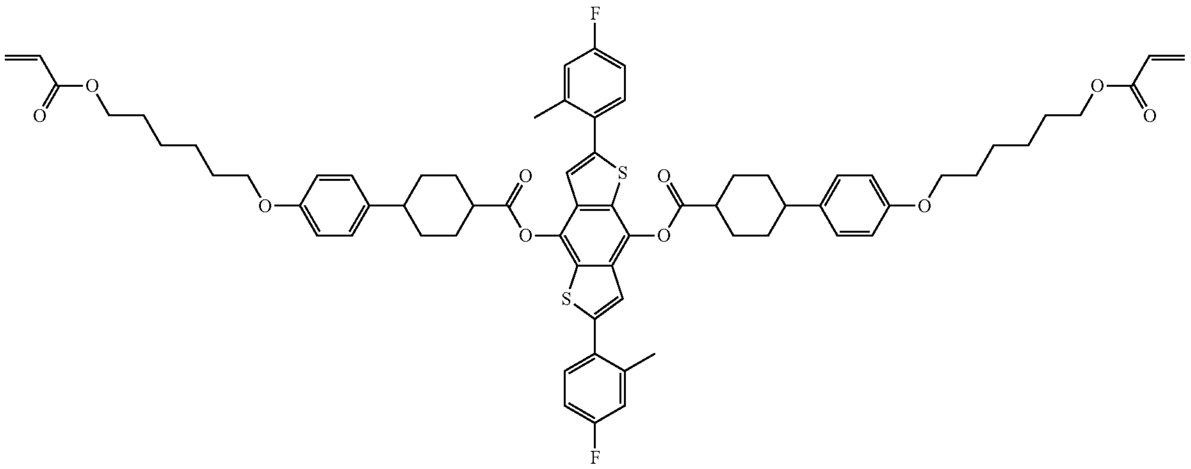
M-3
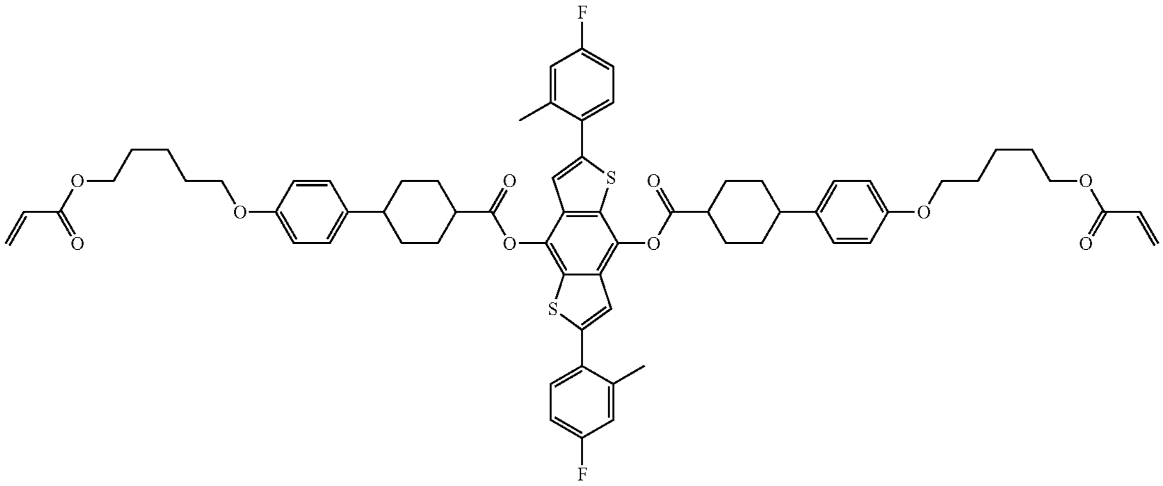
M-4
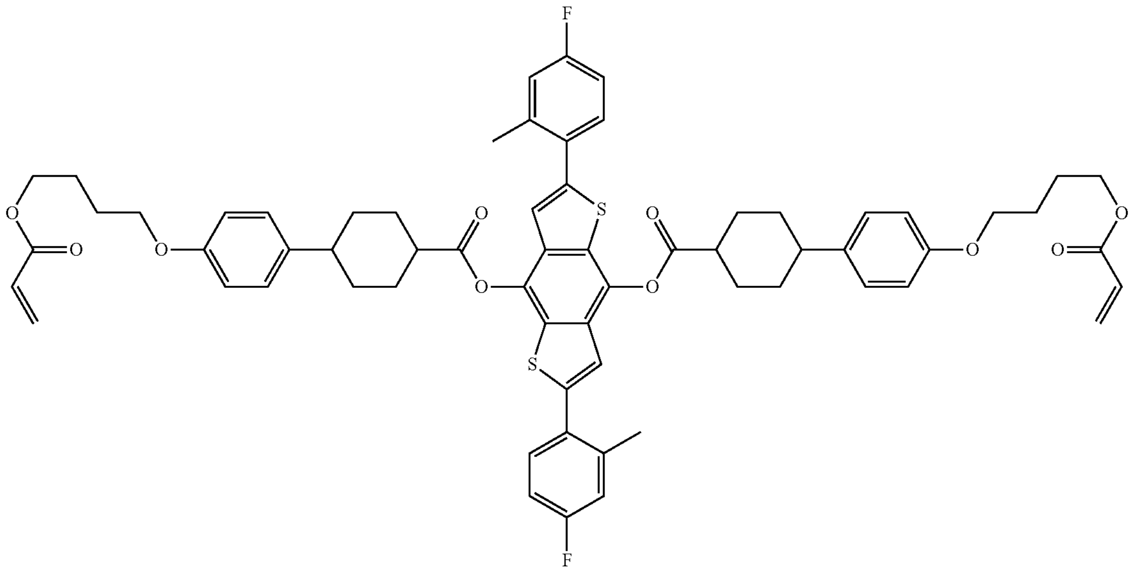

-continued
M-5
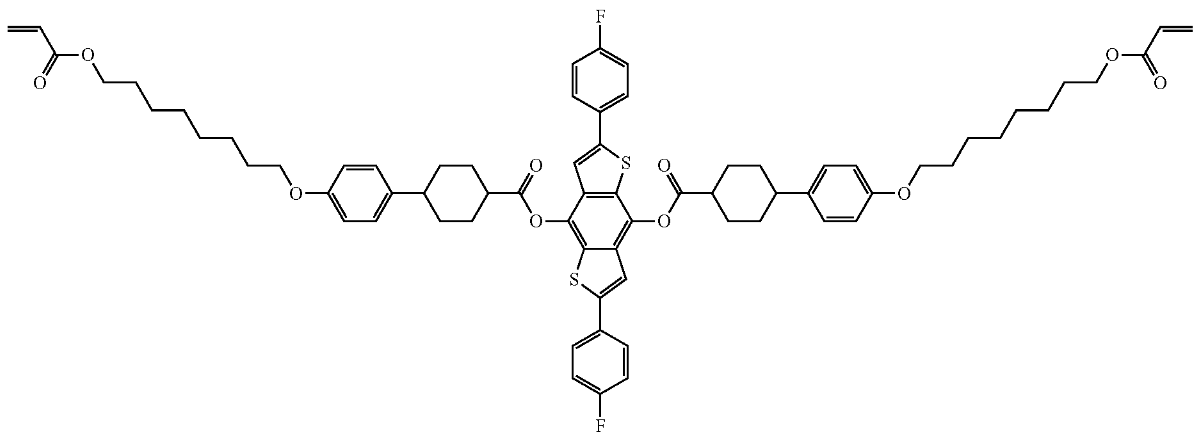
M-6
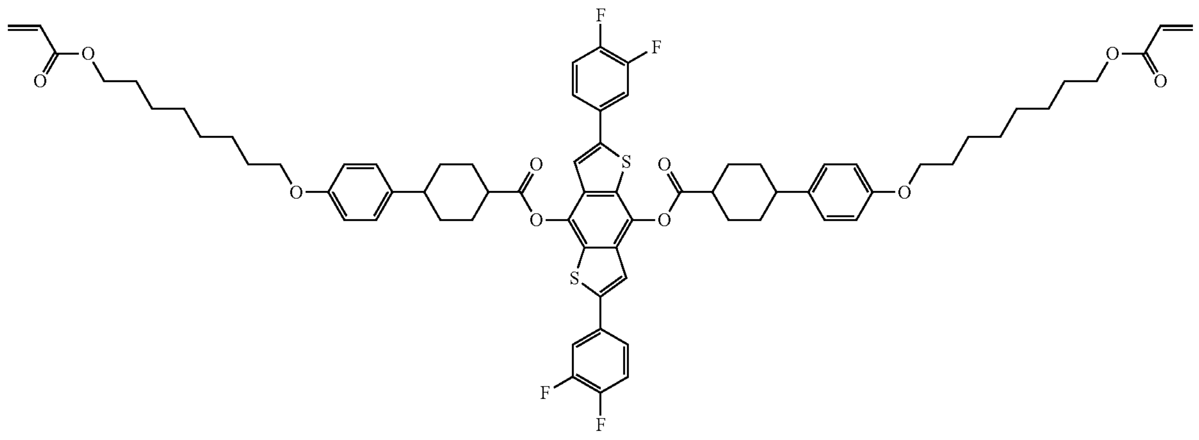
M-7
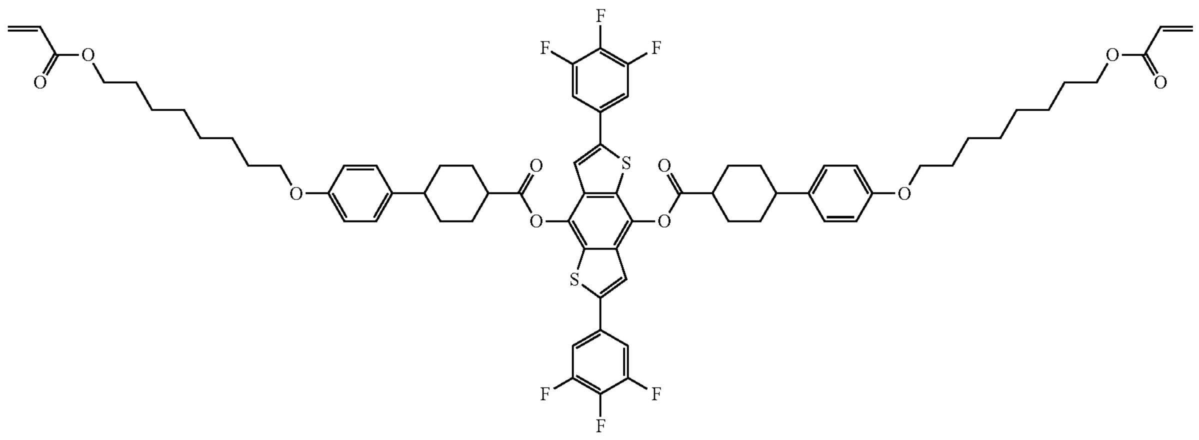

-continued
M-8
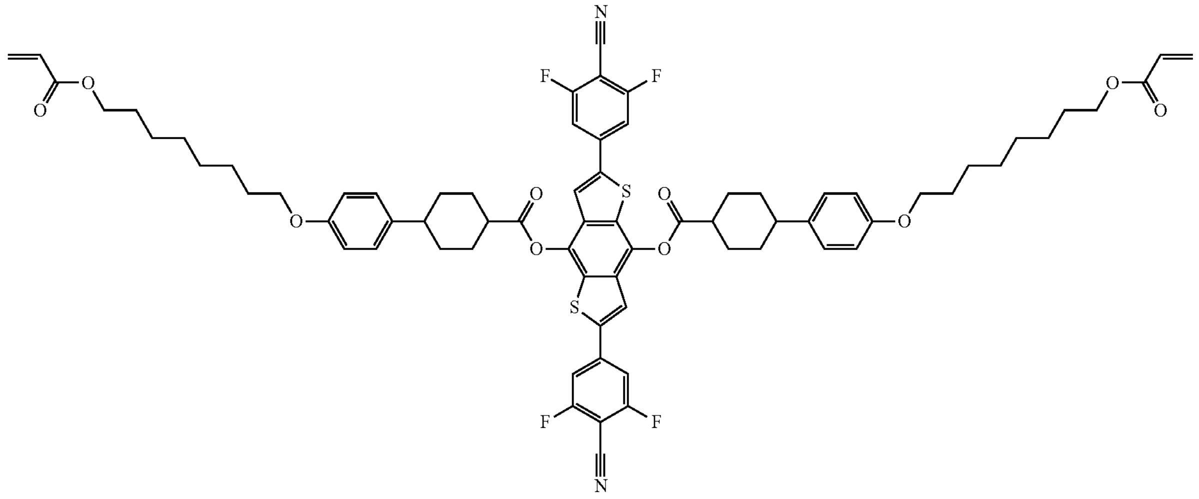
M-9
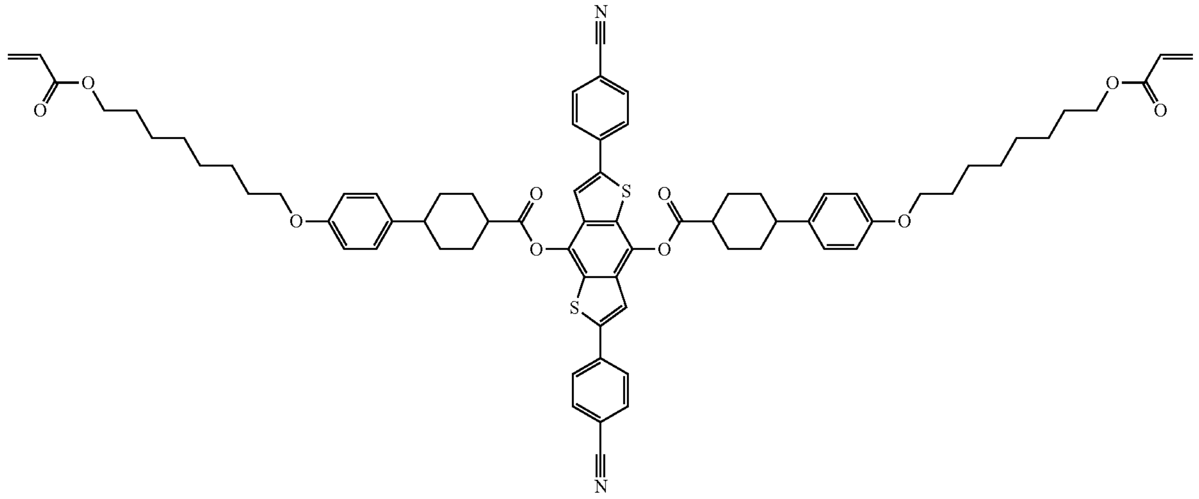
M-10
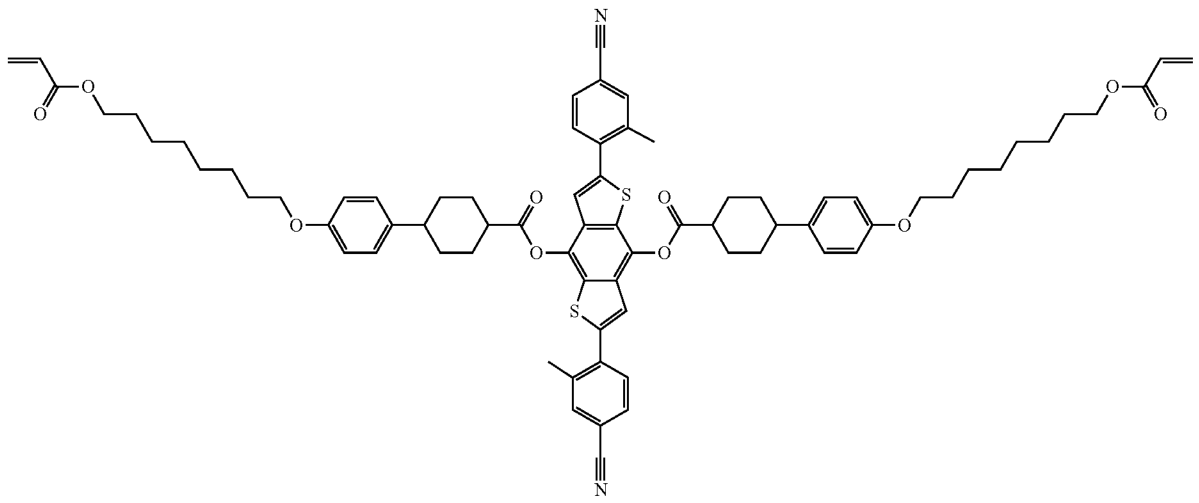

-continued
M-11
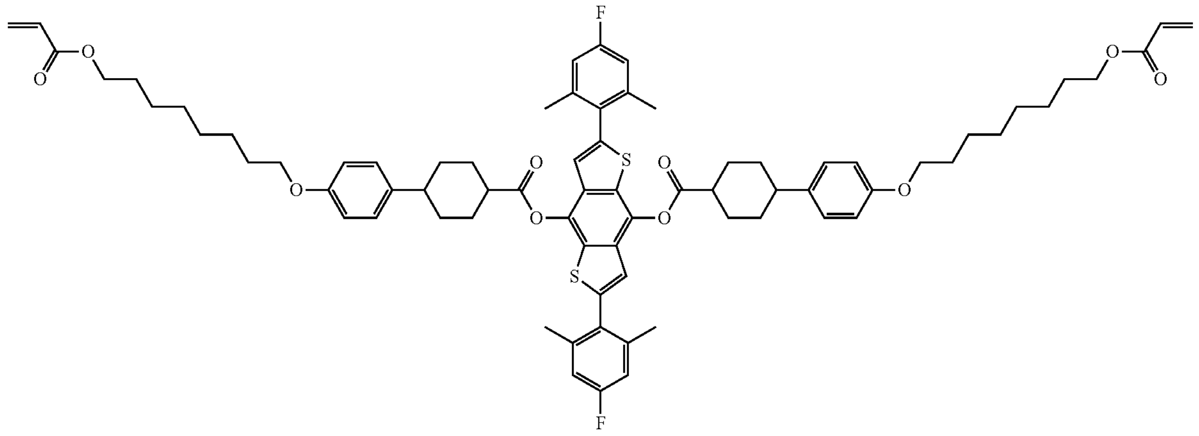
M-12
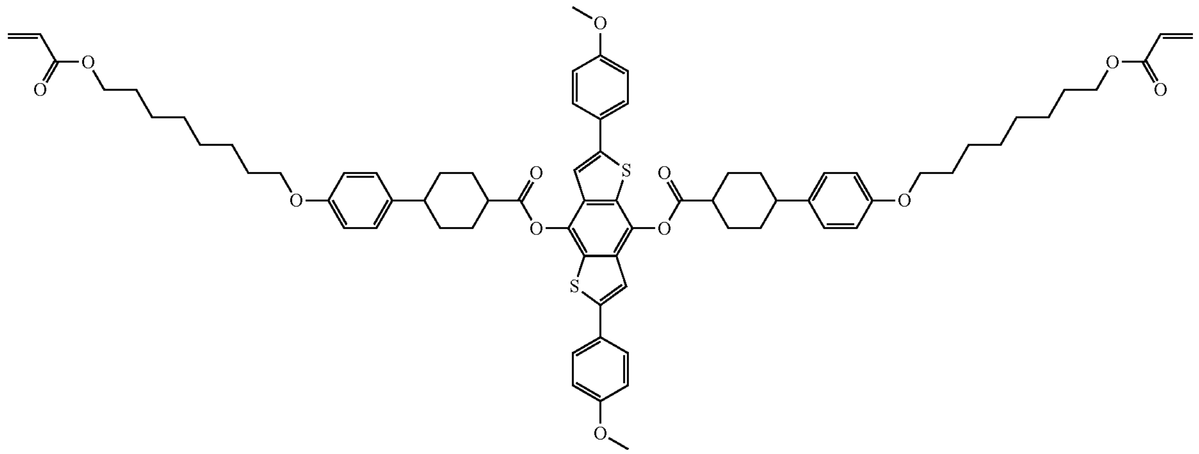
M-13
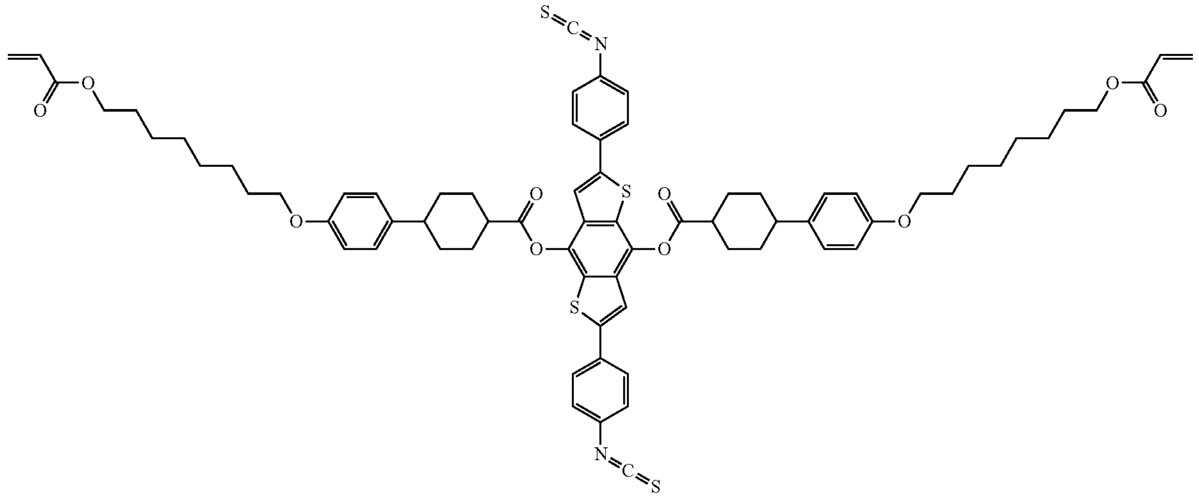

-continued
M-14
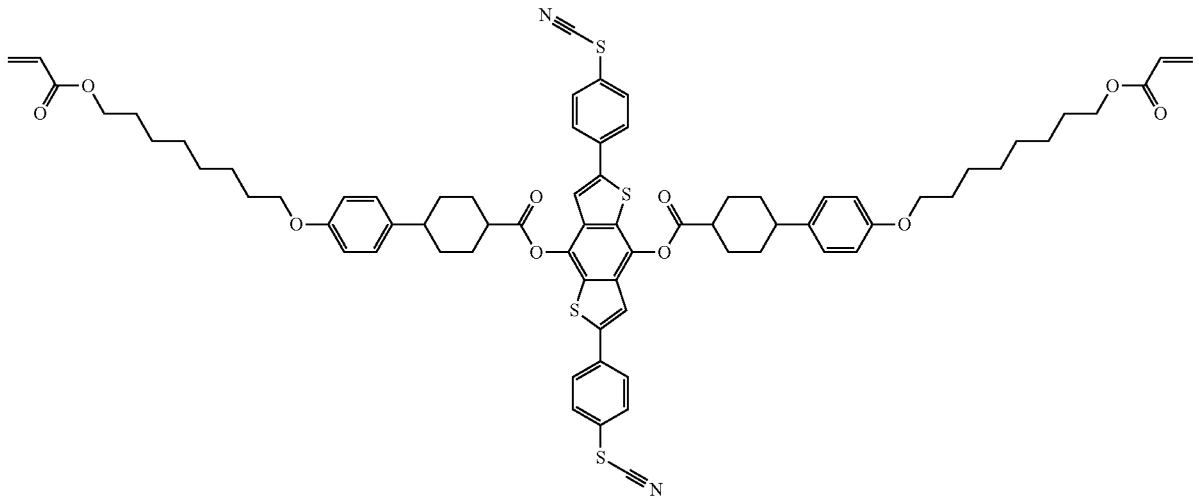
M-15
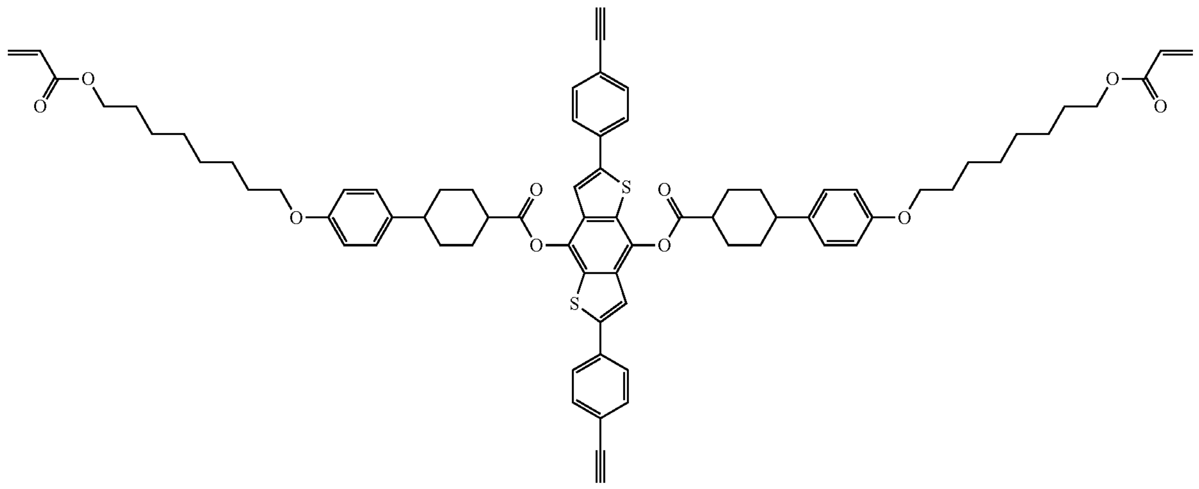
M-16
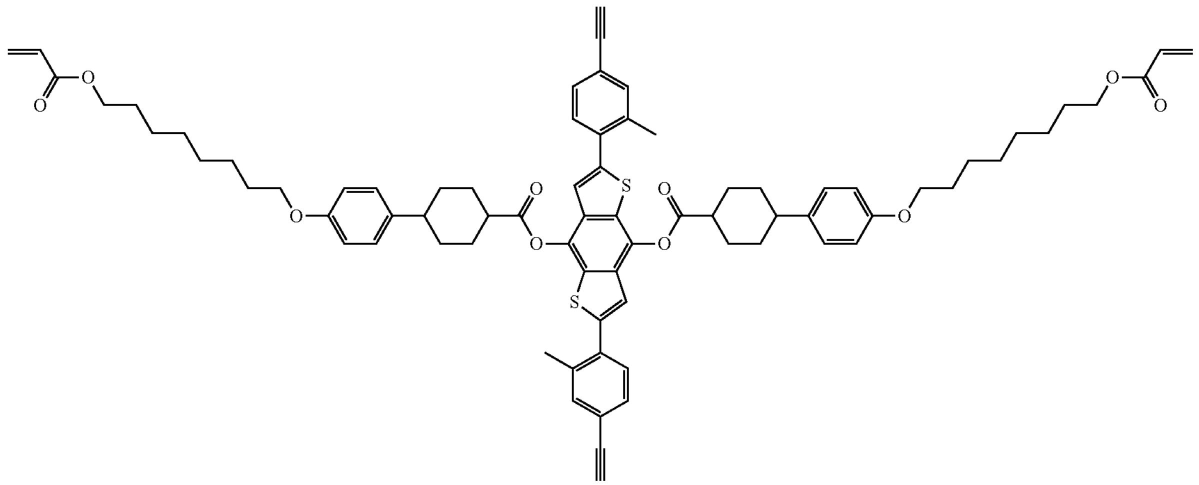

-continued
M-17
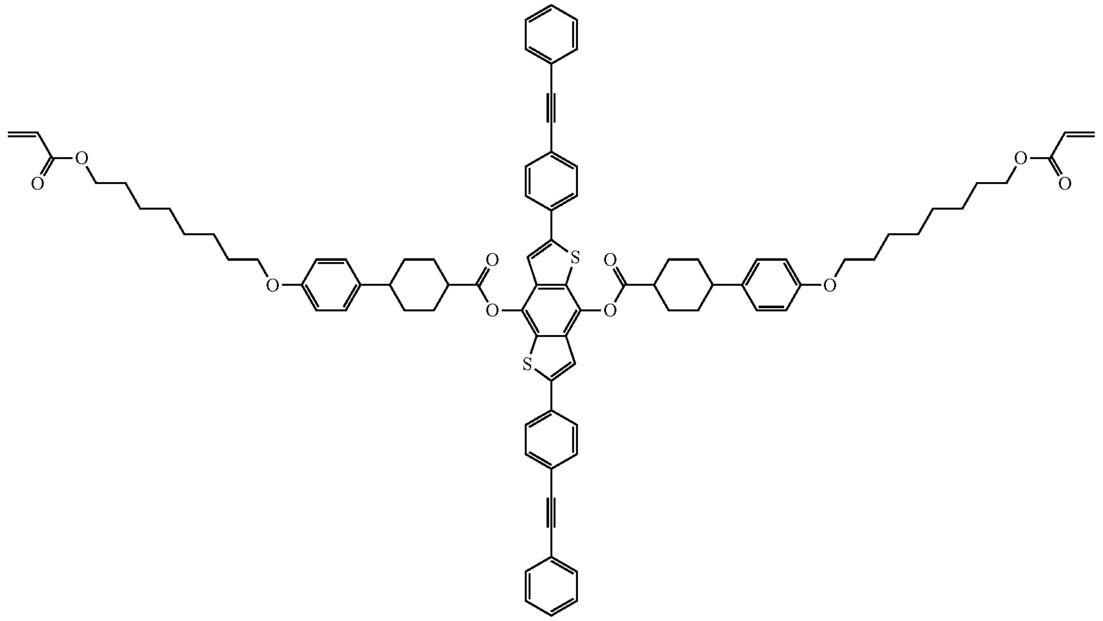
M-18
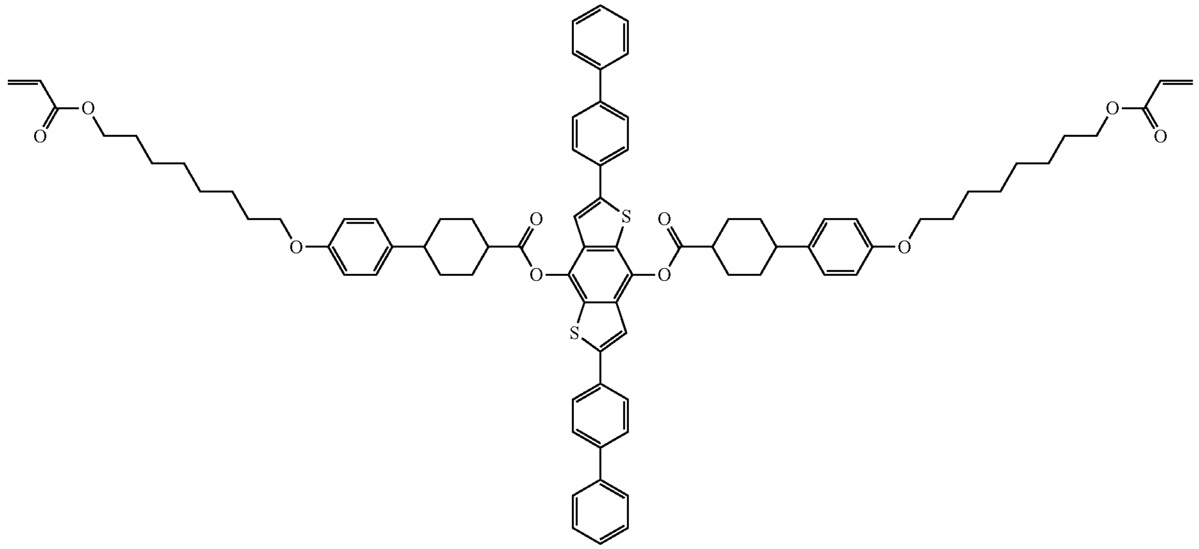

-continued
M-19
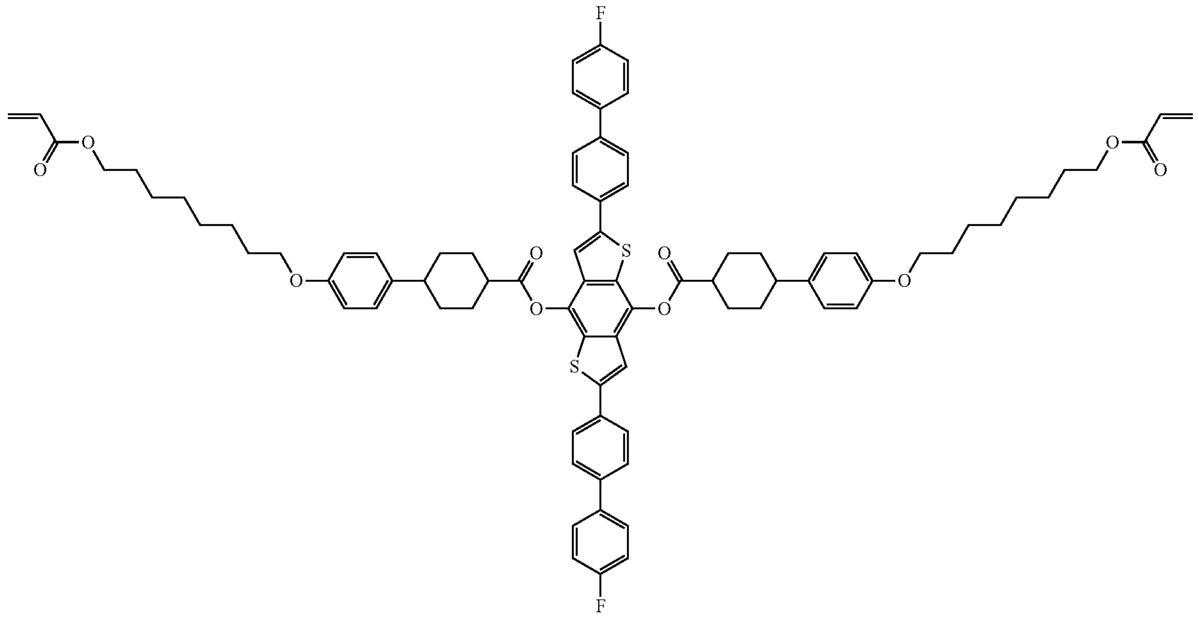
M-20
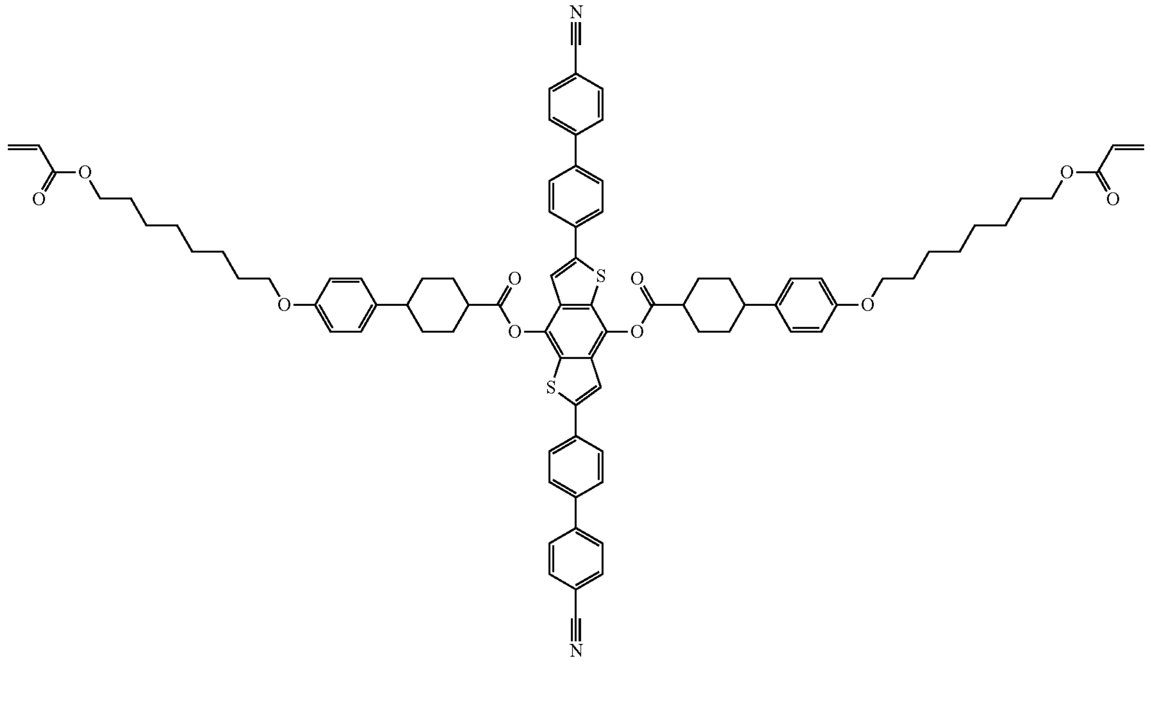

-continued
M-21
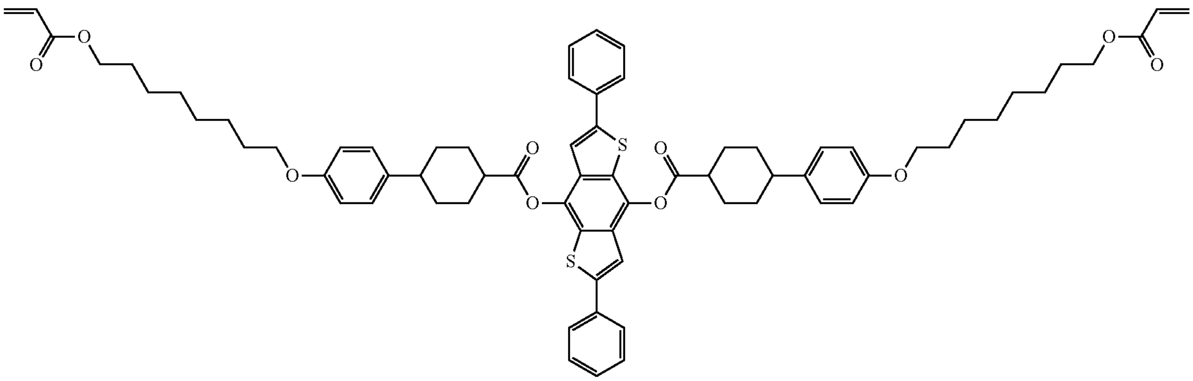
M-22
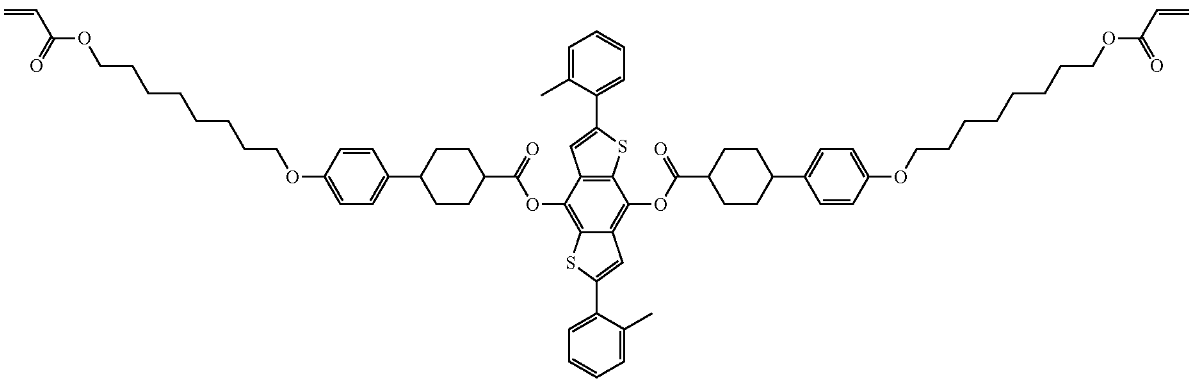
M-23
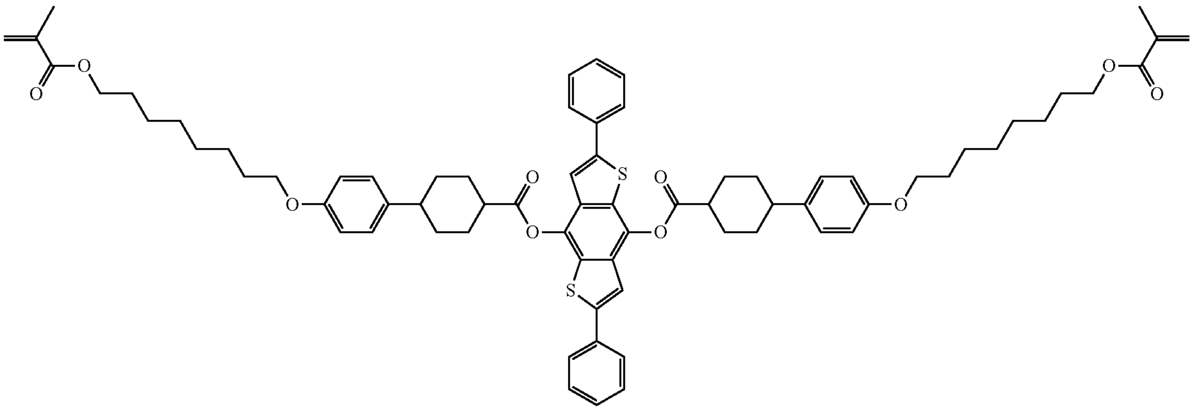

-continued
M-24
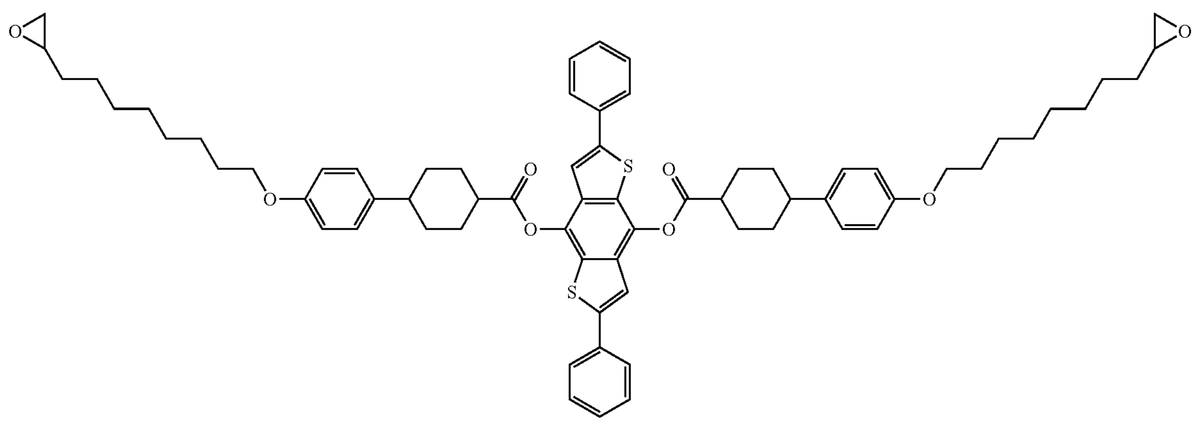
M-25
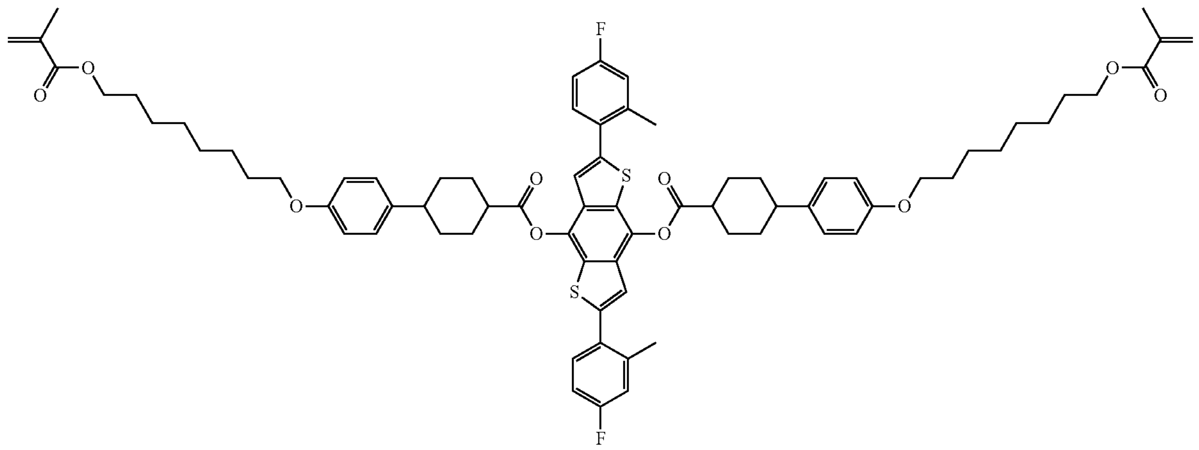
M-26
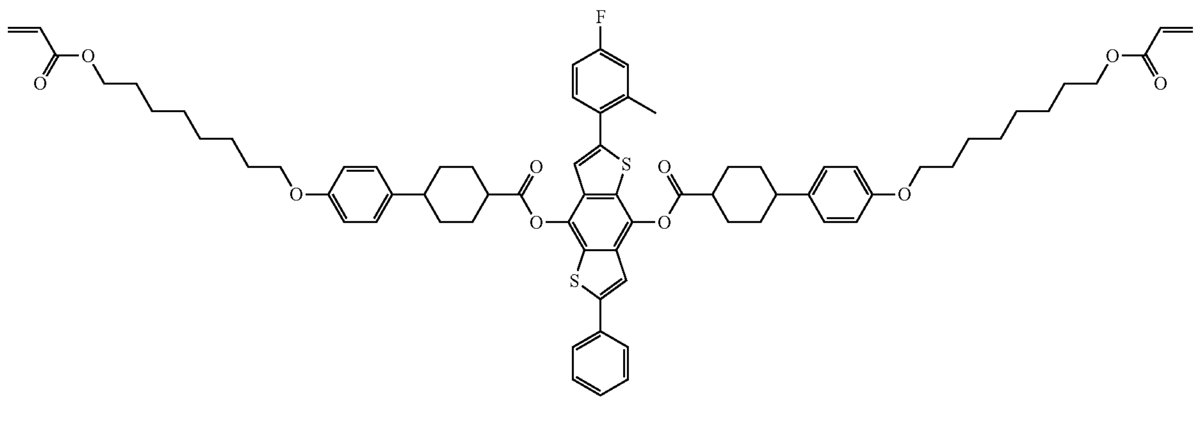

-continued
M-27
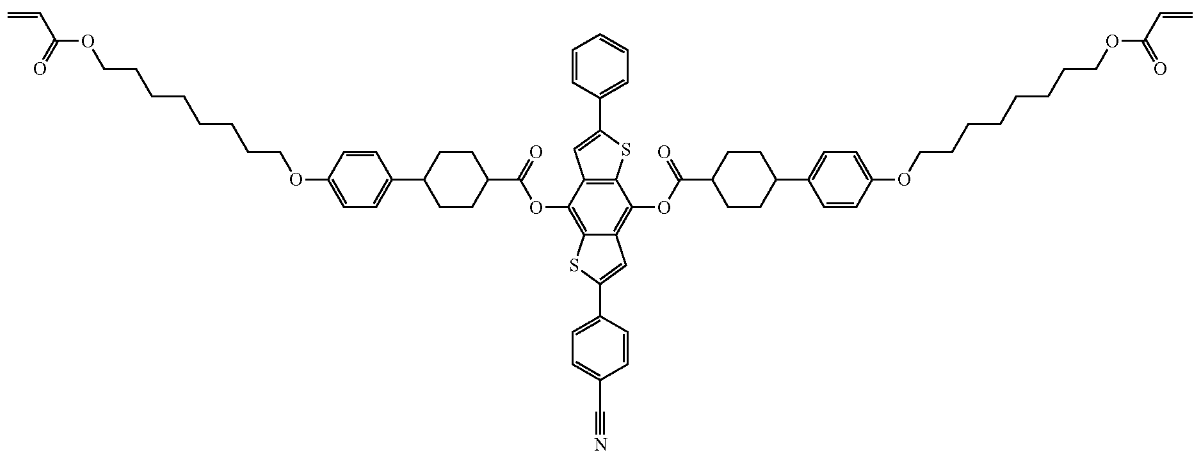
M-28
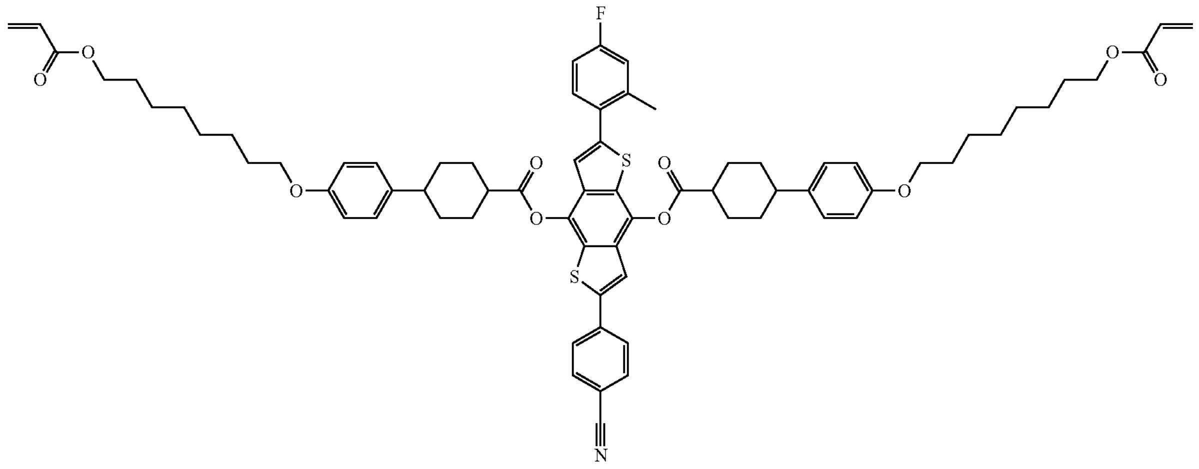
M-29
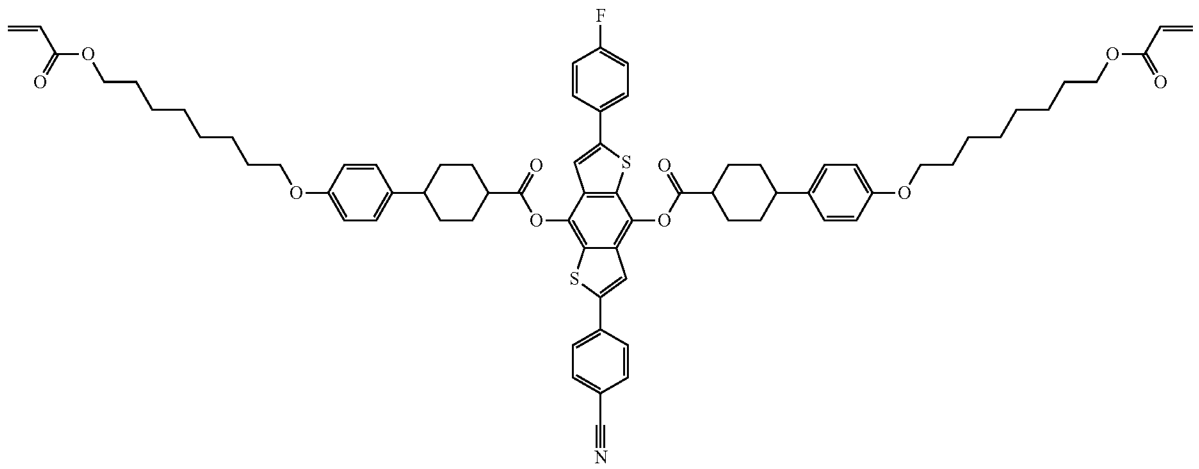

-continued
M-30
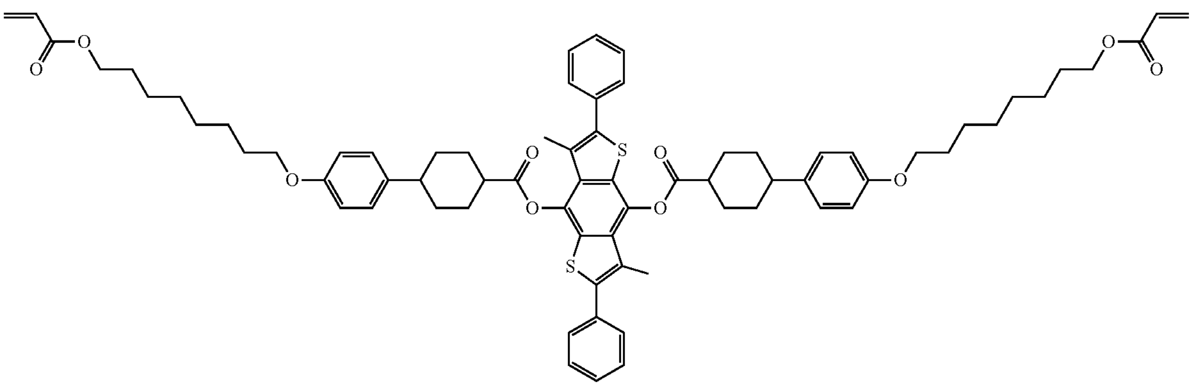
M-31
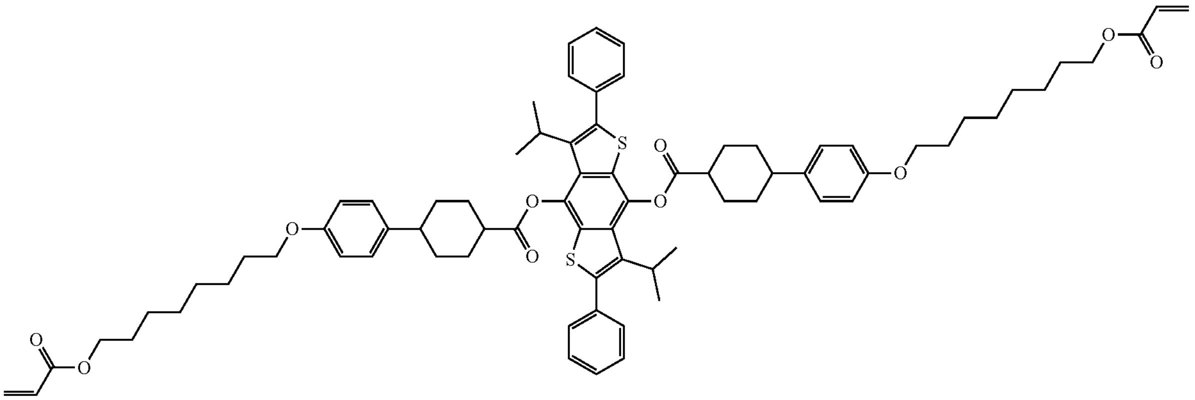
M-32
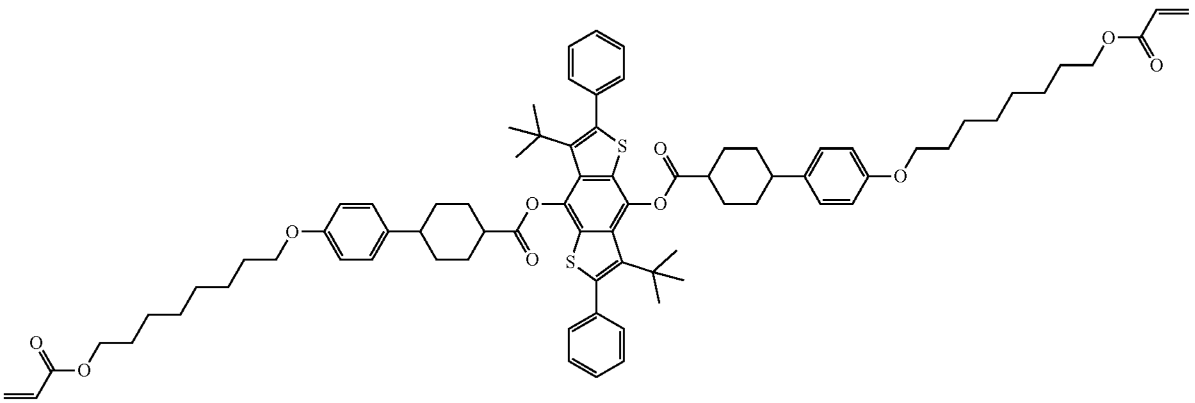

-continued
M-33
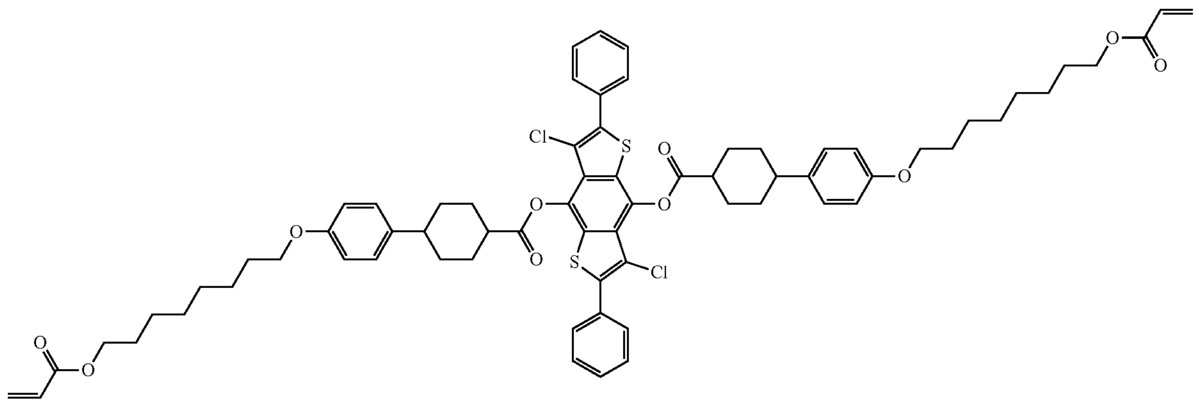
M-34
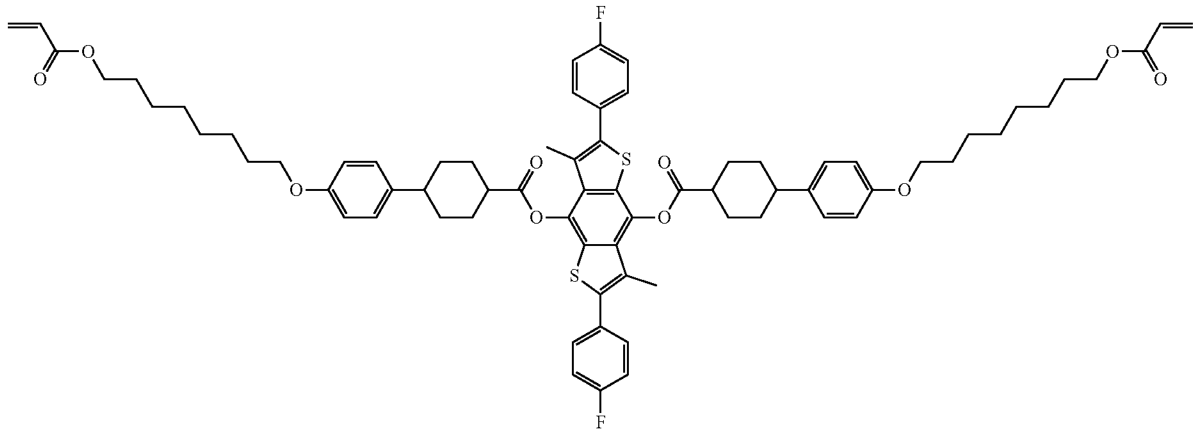
M-35
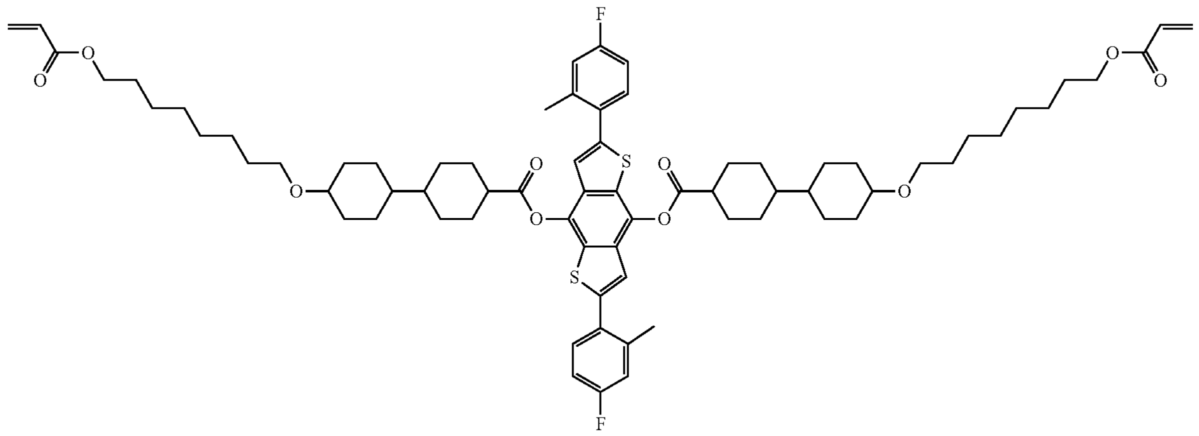

-continued
M-36
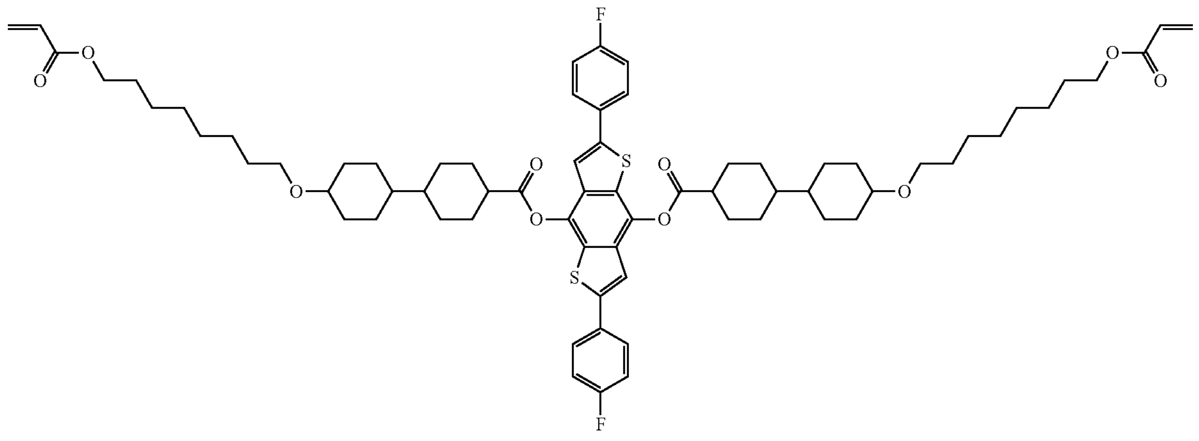
M-37
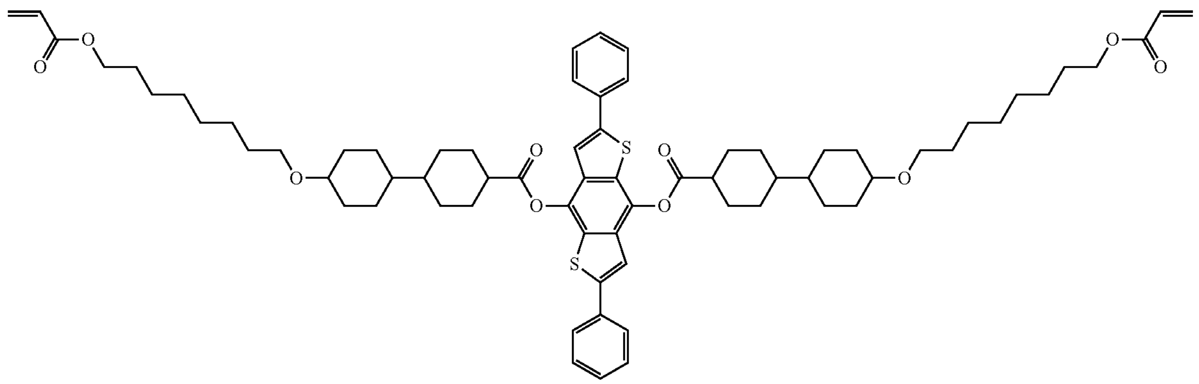
M-38
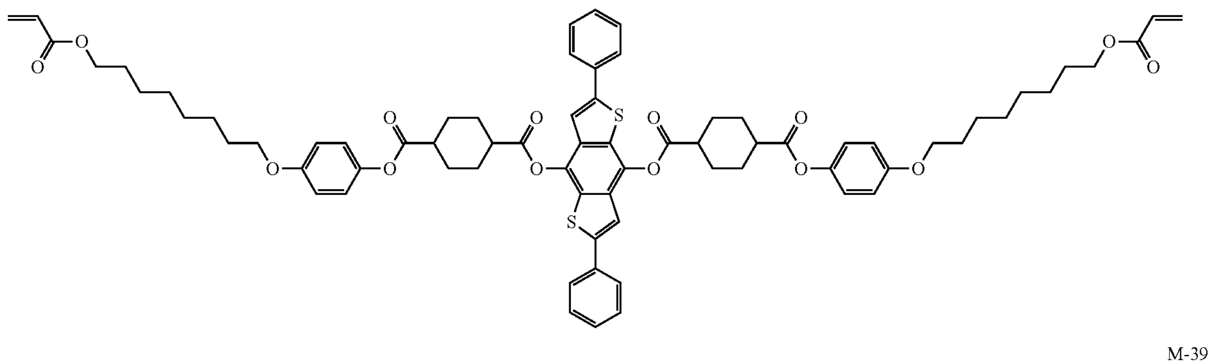
M-39
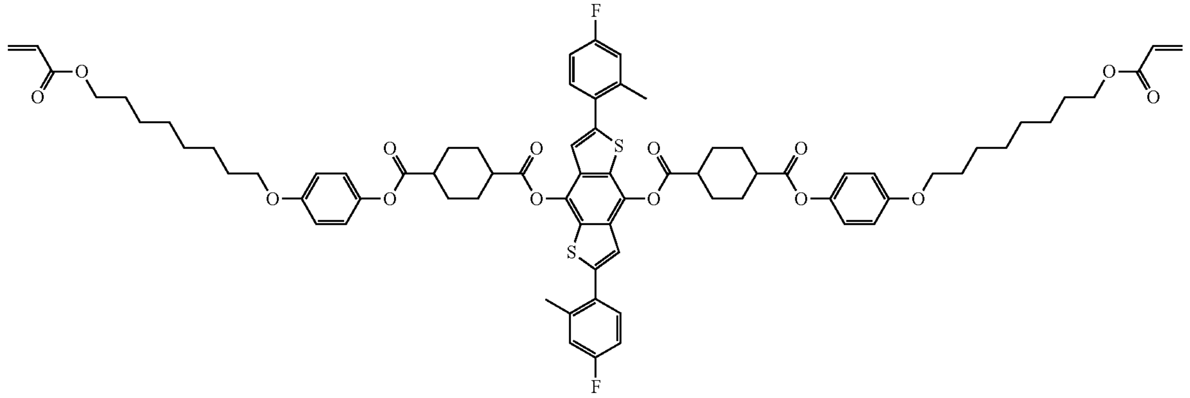

-continued
M-40
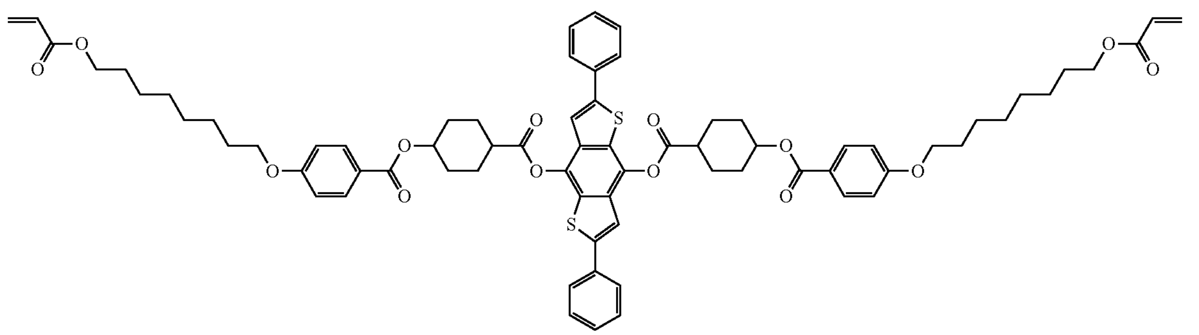
M-41
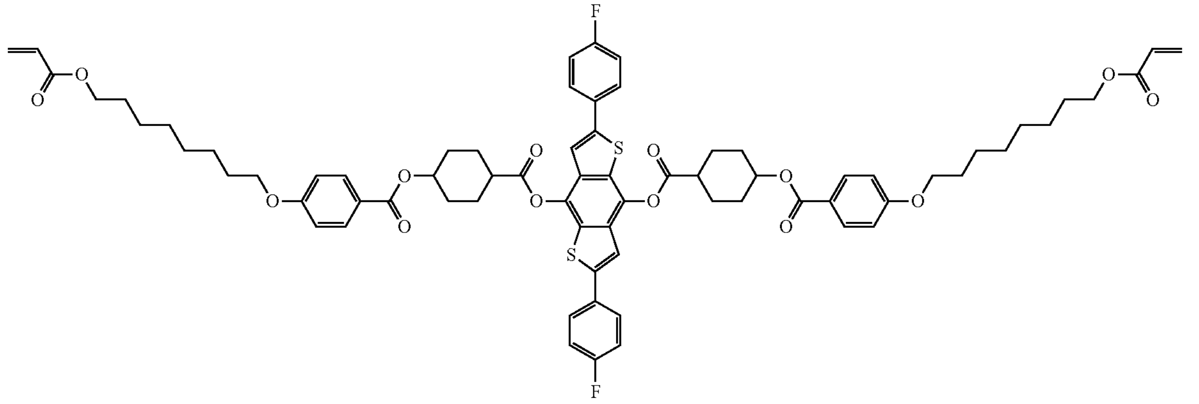
M-42
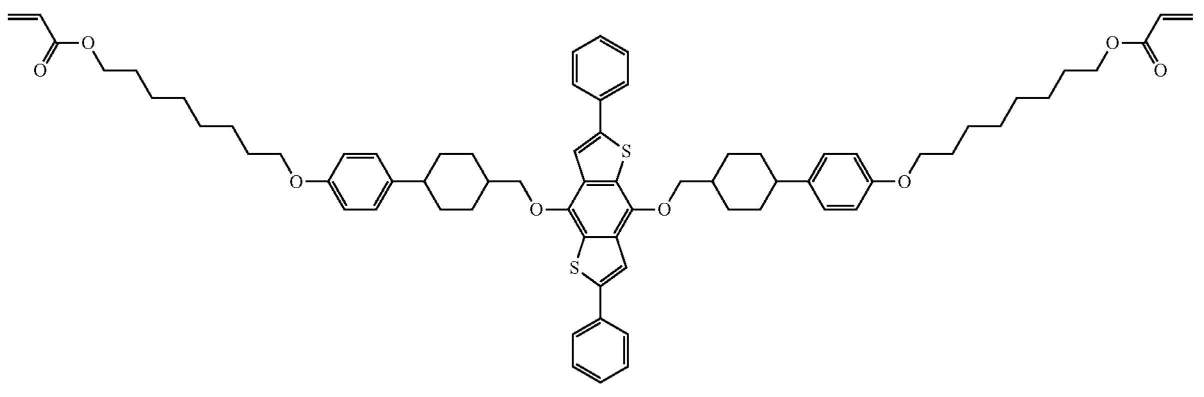
M-43
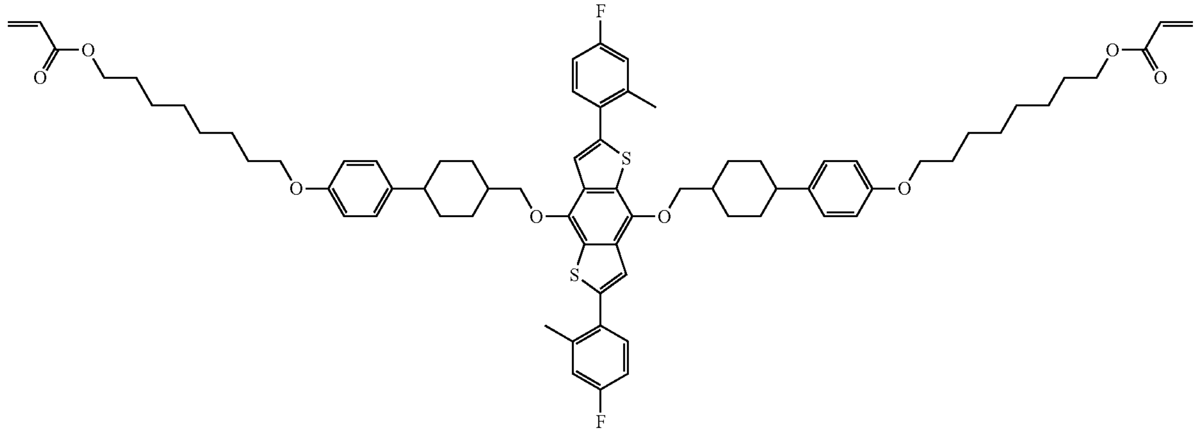

-continued
M-44
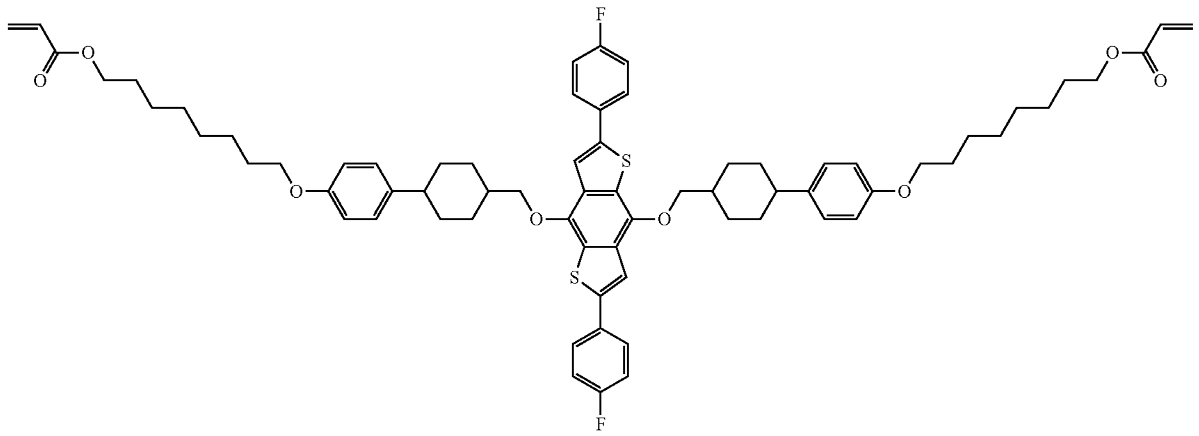
M-45
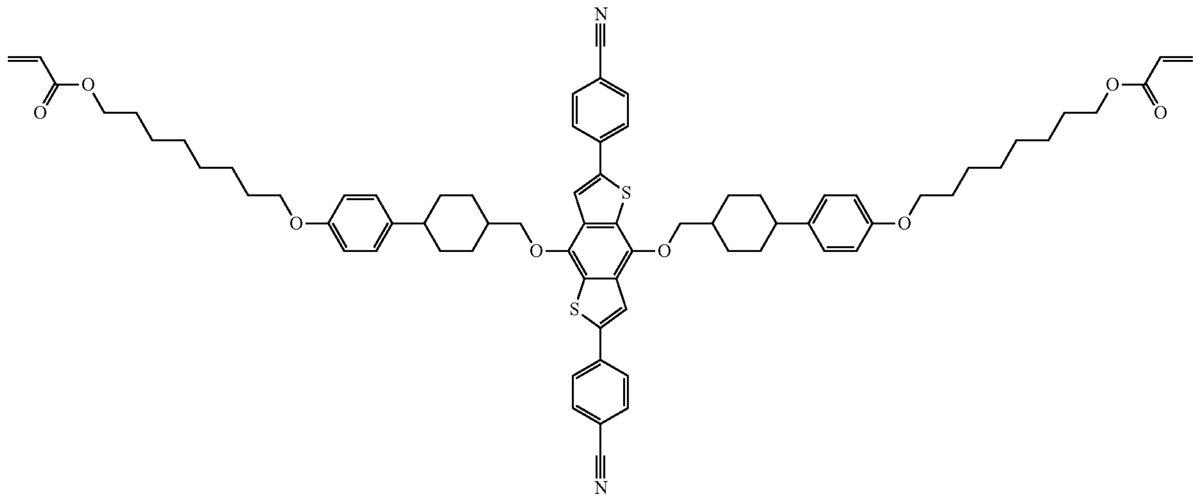
M-46
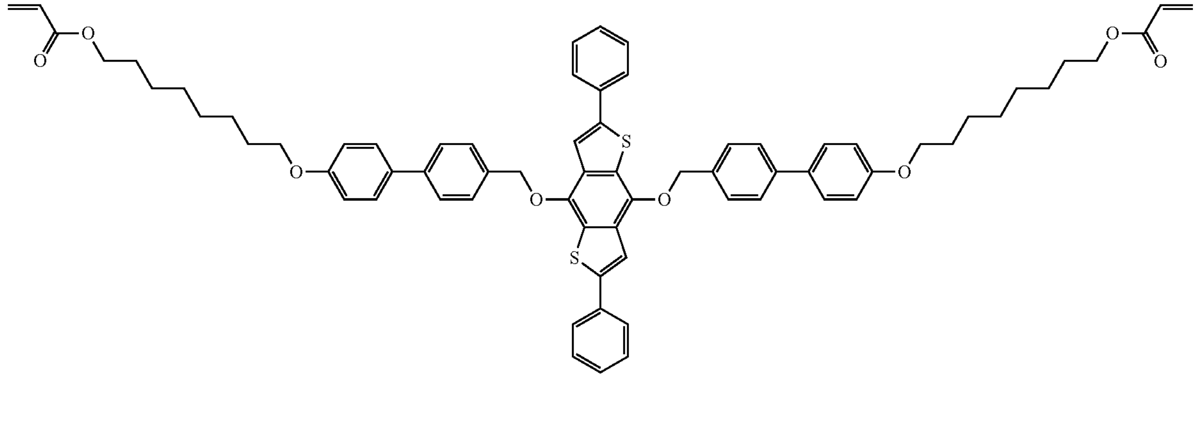

-continued
M-47
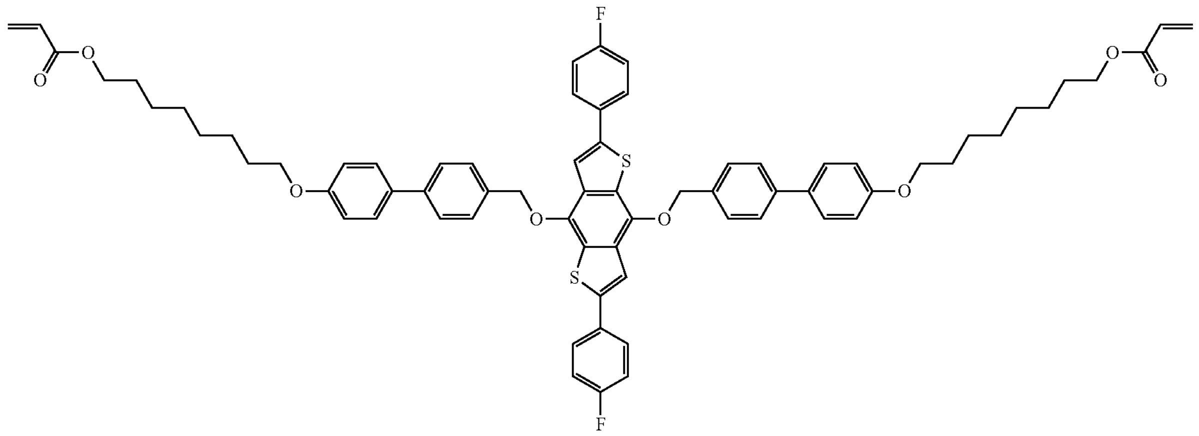
M-48
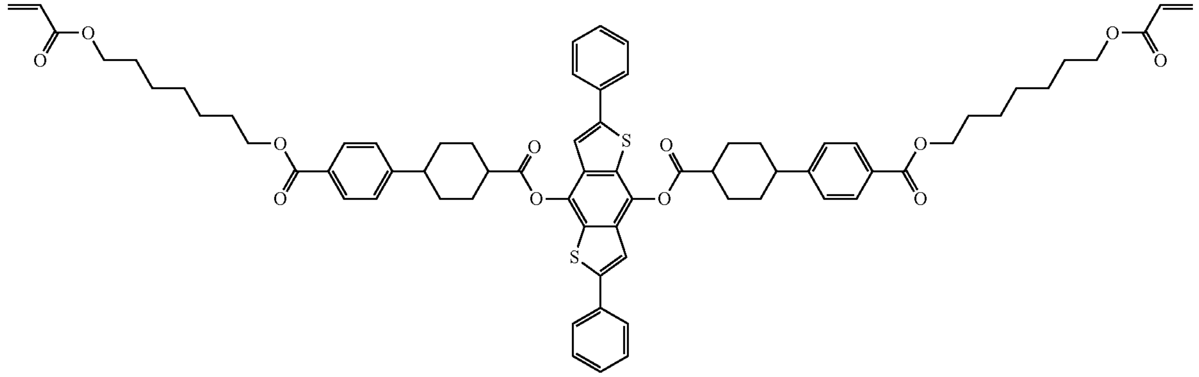
M-49
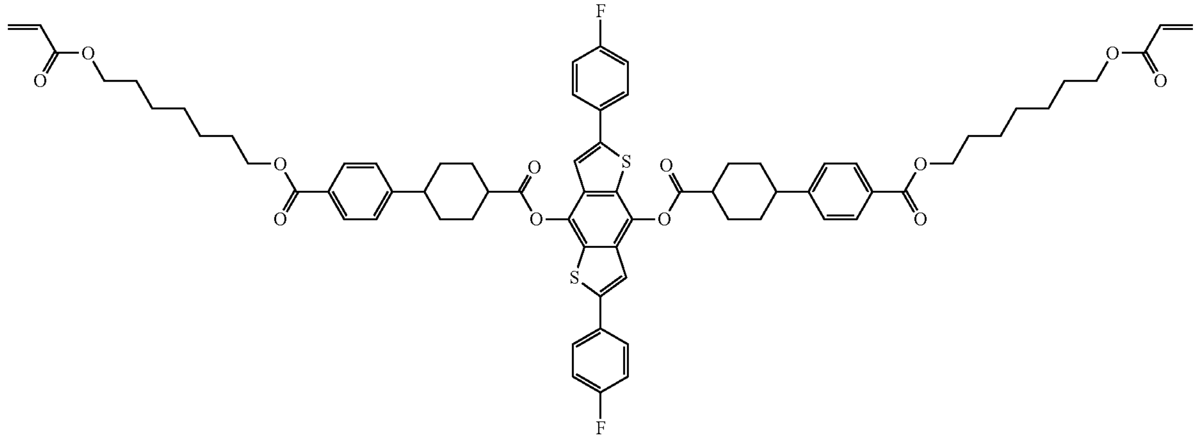

-continued
M-50
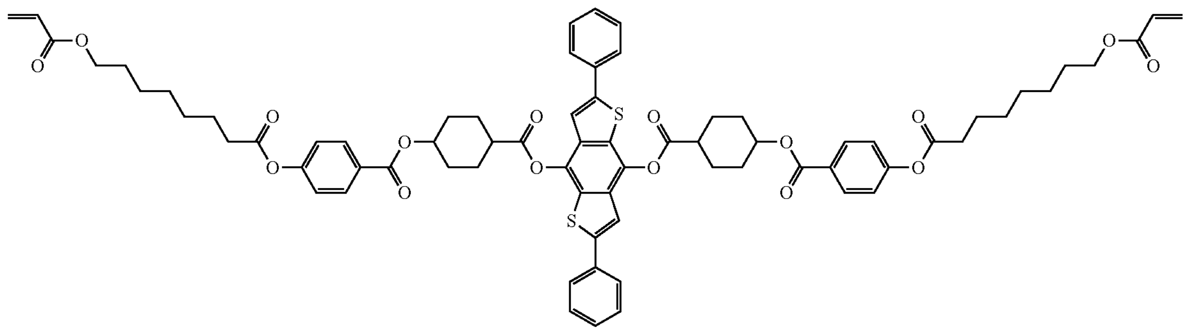
M-51
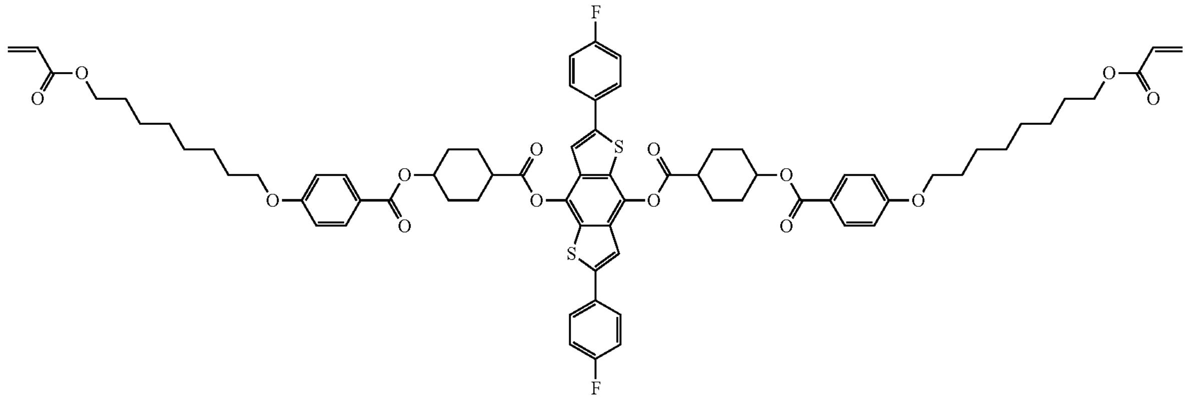
M-52
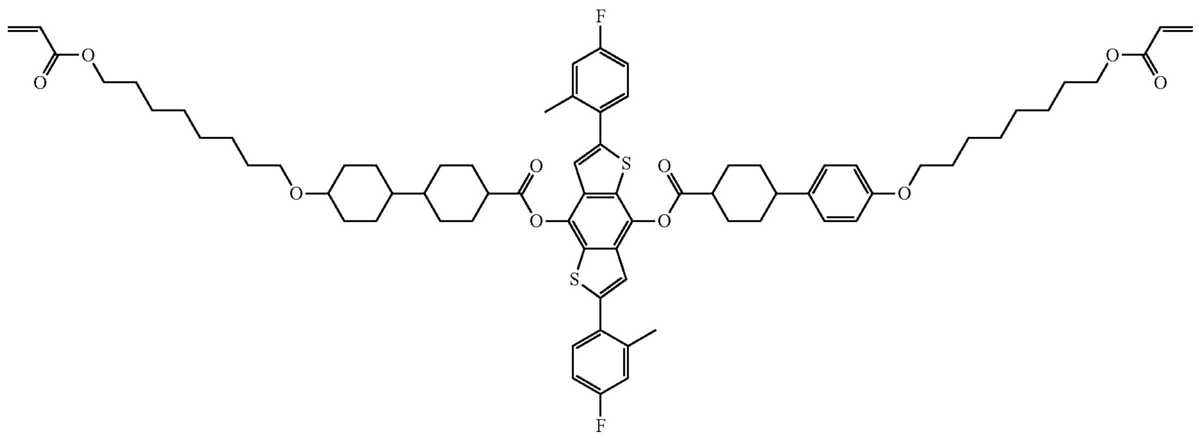

-continued
M-53
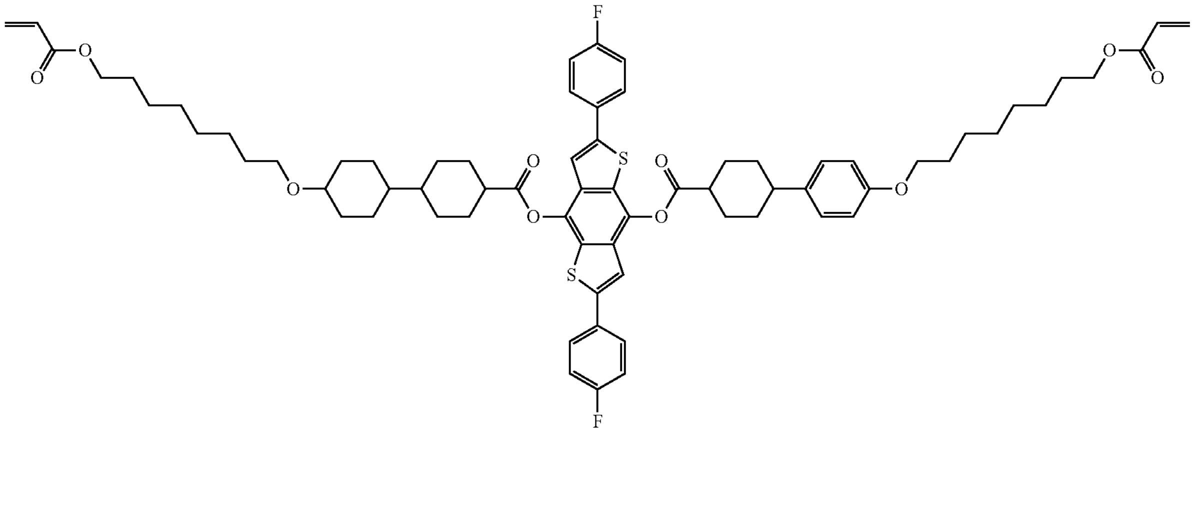
M-54
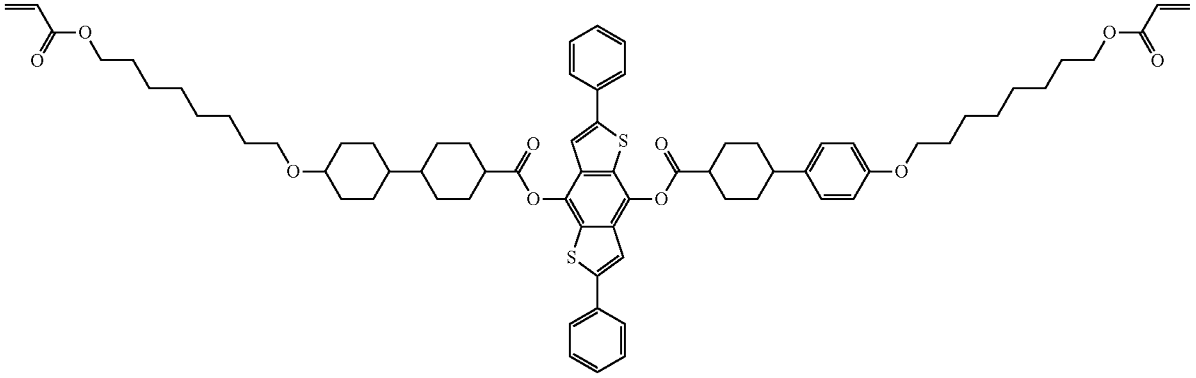
M-55
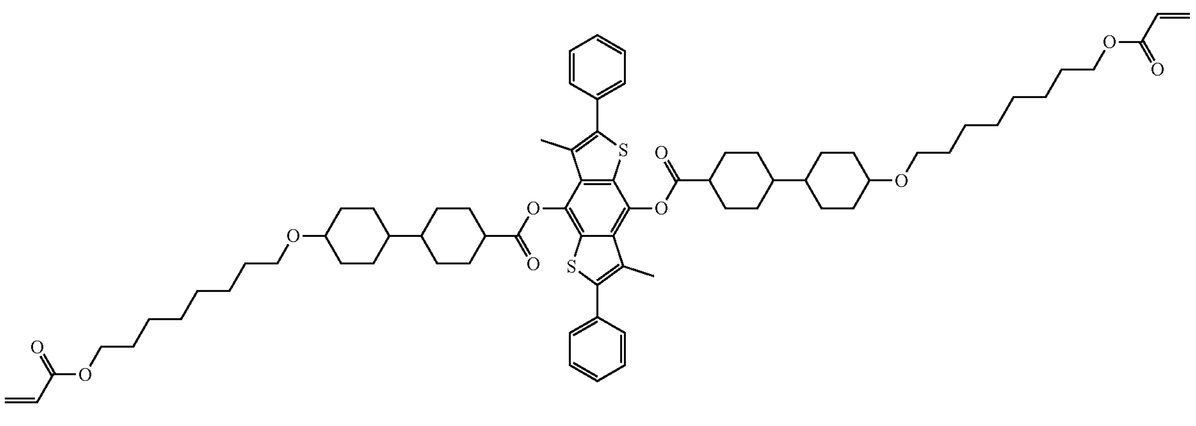

-continued
M-56
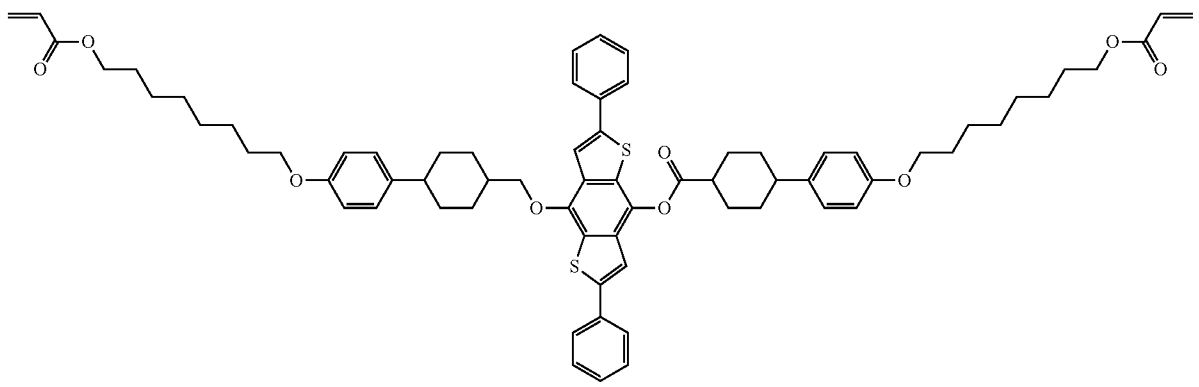
M-57
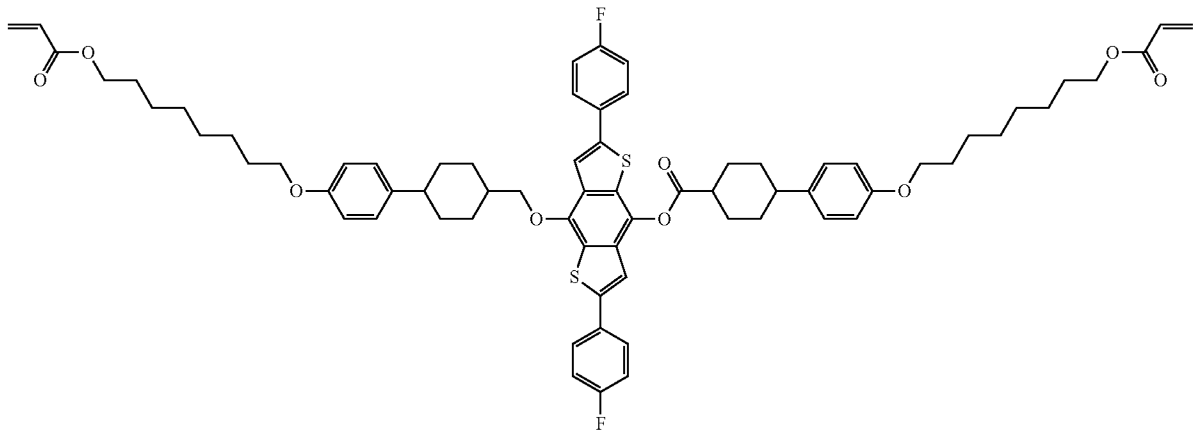
M-58
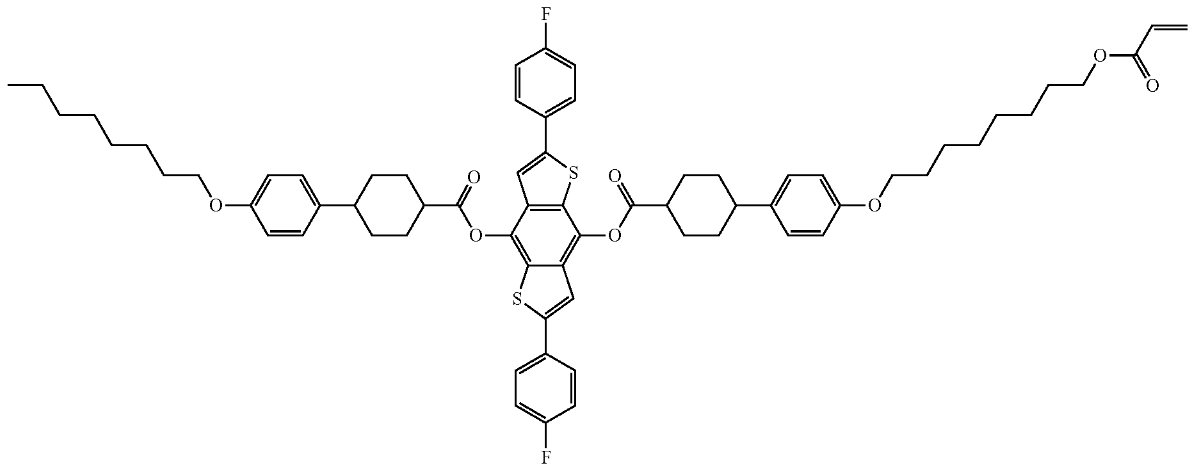

-continued

M-59

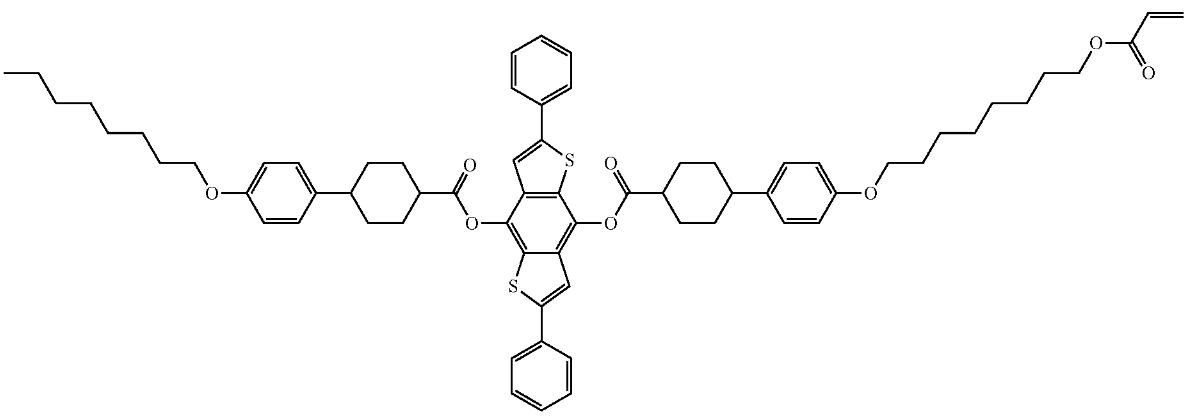

M-60

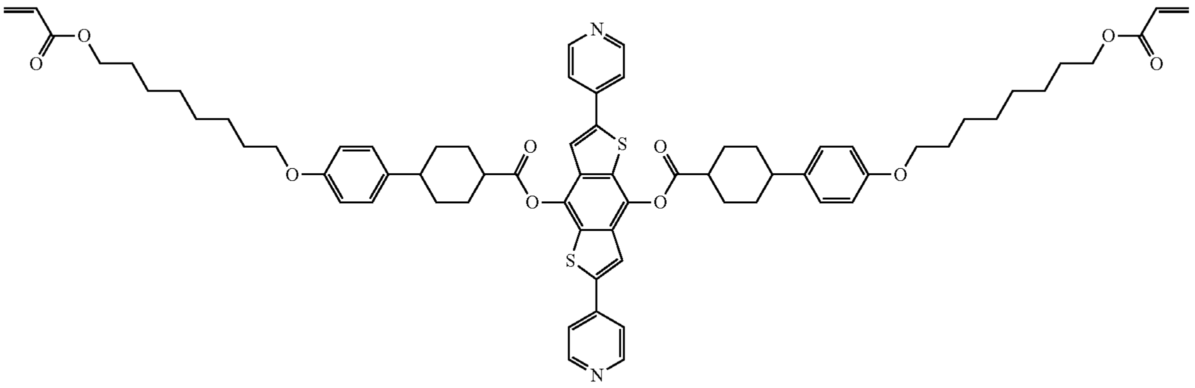

Mixture Examples

The following examples (including Comparative example C-1) are prepared in accordance with the following table:

| | Formulation (in wt %) | | | | |
|---|---|---|---|---|---|
| | C-1 | J-2 | J-3 | J-4 | J-1 |
| Darocure TPO | 1.00 | 1.00 | 1.00 | 1.00 | 1.00 |
| FluorN 561 | 0.42 | 0.42 | 0.42 | 0.42 | 0.42 |
| Irganox1076 | 0.12 | 0.12 | 0.12 | 0.12 | 0.12 |
| RM-1 | 98.46 | 93.40 | 88.46 | 83.45 | 78.46 |
| M-1 | 0.00 | 5.06 | 10.00 | 15.01 | 20.00 |
| $T_{NI}$ (° C.) | 128 | 119 | 113 | 103 | 93 |

Irganox1076 is a stabilizer, being commercially available (Ciba AG, Basel, Switzerland). Darocure TPO is a photoinitiator, being commercially available (Ciba AG, Basel, Switzerland). FluorN 561 is a surfactant being commercially available (Cytonix, USA). RM-1 is commercially available as 1,4-Bis-[4-(3-acryloyloxypropyloxy)benzoyloxy]-2-methylbenzene from e.g., Sigma-Aldrich, Germany.

Each formulation is oven heated at 70° C. until fully dissolved and filtered through a 0.2 μm pore PTFE filter and the Clearing point ($T_{NI}$) is measured by POM to the nearest whole ° C.

Each formulation is spin coated twice at 4000 rpm for 30 seconds on to a PI coated glass substrate.

All samples are annealed at 40° C. below $T_{NI}$ for 60 s, respectively.

All samples are polymerised using a DELO lamp (80 mW/cm$^2$), under nitrogen at 20° C. for 60 s.

The retardation of each slide is measured using an Ellipsometer. The thickness of each slide is measured using a surface profilometer.

The raw retardation data is fitted to a Sellmier equation distribution to remove thin film interference from the measurement. This data is then converted to birefringence using the measured thickness data for each film and the data of the films of each mixture is averaged to give a final data set. The following table summarizes the results.

| Example | C-1 | J-2 | J-3 | J-4 | J-1 |
|---|---|---|---|---|---|
| M-1/wt. % | 0.00 | 5.06 | 10.00 | 15.01 | 20.00 |
| $T_{NI}$/° C. | 128 | 119 | 113 | 103 | 93 |
| $R_{450/550}$ | 1.10857 | 1.10970 | 1.10379 | 1.10181 | 1.09823 |
| Δn of formulation @550 nm | 0.16839 | 0.16072 | 0.15237 | 0.14207 | 0.13394 |

From this data it can be observed that at the extrapolated point of 100% M-1 Δn(450 nm) is lower than Δn(550 nm), indicating negative wavelength dispersion of birefringence. In contrast, the birefringence dispersion of the reference C-1 is positive.

The invention claimed is:

1. A polymerisable LC material comprising i) a compound of formula T, $$R^{T1}\text{-}(A^{T1}\text{-}Z^{T1})_{m1}\text{-}G^{T1}\text{-}(Z^{T2}\text{-}A^{T2})_{m2}\text{-}R^{T2} \quad T$$

wherein $R^{T1}$ and $R^{T2}$ each and independently from another denote H or a hydrocarbon group having 1 to 20 carbon atoms, wherein the group may have a substituent group, and any carbon atom of the group may be substituted with a heteroatom, and at least one of $R^{T1}$ and $R^{T2}$ denotes P-SP-, P denotes a polymerizable group, Sp denotes a spacer group, $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L, L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one —$CH_2$—or two or more non-adjacent —$CH_2$—may be each independently substituted with —O—, —S—, —CO—, —COO—, —OCO—, -CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-, $Z^{T1}$ and $Z^{T2}$each and independently denotes —O—, —S—, —$OCH_2$—, —$CH_2O$—, —$CH_2CH_2$—, —CO—, —COO—, —OCO—, -CO—S—, —S—CO—, —O—CO—O—, —CO—NH—, —NH—CO—, —OCO—NH—, —NH—COO—, —NH—CO—NH—, —NH—O—, —O—NH—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO—$CH_2CH_2$—, —OCO —$CH_2CH_2$—, —$CH_2CH_2$—COO—, —$CH_2CH_2$—OCO—, —COO —$CH_2$—, —OCO —$CH_2$—, —$CH_2$—COO—, —$CH_2$—OCO—, —CH═CH—, —N═N—, —CH═N—, —N═CH—, —CH═N—N═CH—, —CF═CF—, —C≡C—, or a single bond, $G^{T1}$ denotes a group

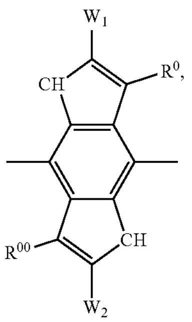

Ch each and independently denotes a chalcogen, $R^0$ and $R^{00}$ each independently represent a hydrogen atom, F, Cl, Br, I, or a linear alkyl group having 1 to 20 carbon atoms or a branched alkyl group having 3 to 20 carbon atoms, in which one —$CH_2$—or two or more non-adjacent —$CH_2$—may be each independently substituted with —O—, —S—, —CO—, —COO—, —OCO—, -CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F or Cl, m1 and m2 each independently represent an integer of 1 to 6, and $W_1$ and/or $W_2$ each independently denotes a group $-(Z^{T3}-A^{T3}-)_{m3}-A^{T4}-Y$ wherein $Z^{T3}$ denotes —O—, —S—, —$OCH_2$—, —$CH_2O$—, —$CH_2CH_2$—, —CO—, —COO—, —OCO—CO—S—, —S—CO—, —O—CO—O—, —CO—NH—, —NH—CO—, —OCO—NH—, —NH—COO—, —NH—CO—NH—, —NH—O—, —O—NH—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO —$CH_2CH_2$—, —OCO —$CH_2CH_2$—, —$CH_2CH_2$—COO—, —$CH_2CH_2$—OCO—, —COO —$CH_2$—, —OCO —$CH_2$—, —$CH_2$—COO—, —$CH_2$—OCO—, —CH═CH—, —N═N—, —CH═N—, —N═CH—, —CH═N—N═CH—, —CF═CF—, —C≡C—, or a single bond, $A^{T3}$ and $A^{T4}$ independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby each of these groups may optionally be unsubstituted or may optionally be substituted with one or more of substituent groups L, m3 denotes 0, 1, or 2, and Y denotes F, Cl, Br, I, a pentafluoro-sulfuranyl group, a nitro group, a Y cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one —$CH_2$—or two or more non-adjacent —$CH_2$—are each independently substituted with —O—, —S—, —CO—, —COO—, —OCO—, -CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and in which any hydrogen atom in the alkyl group may optionally be substituted with F, or Y may represent a group represented by P-Sp-, and ii) one or more monoreactive mesogenic compounds selected from the following formulae:
MRM1
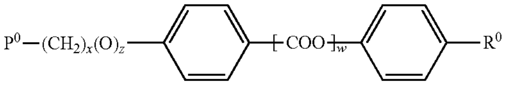
MRM2
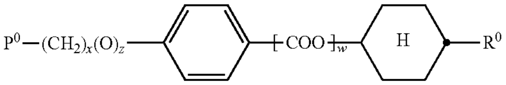
MRM3
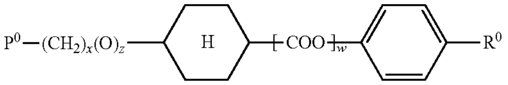
MRM4
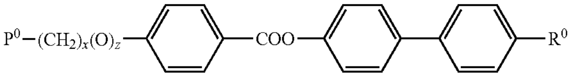
MRM5
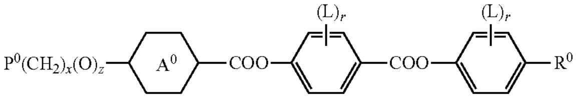
MRM6
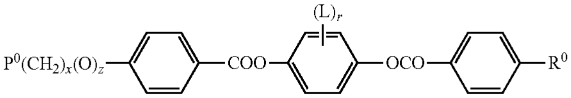
MRM7
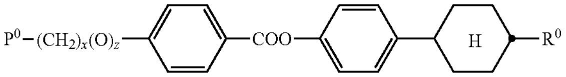
MRM8
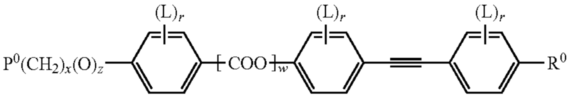
MRM9
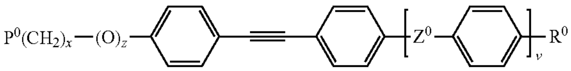
MRM10
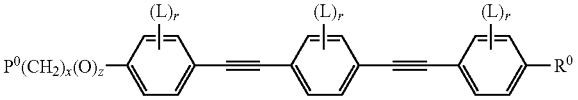
MRM11
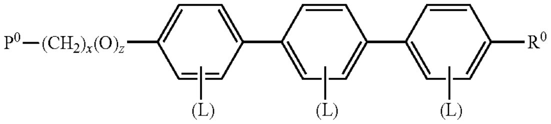
MRM12
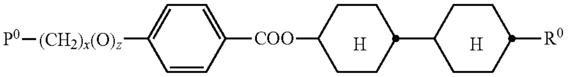
MRM13
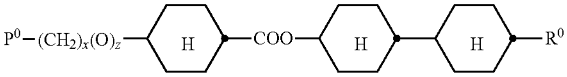
MRM14
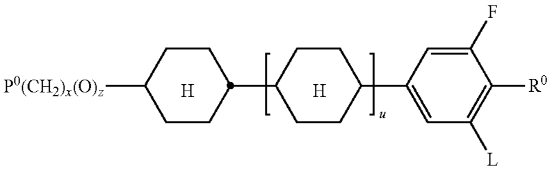
MRM15
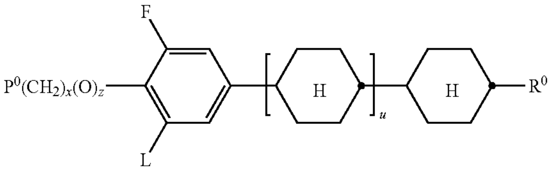
MRM16
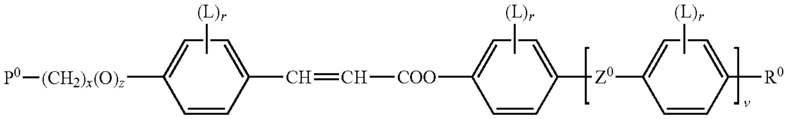
MRM17
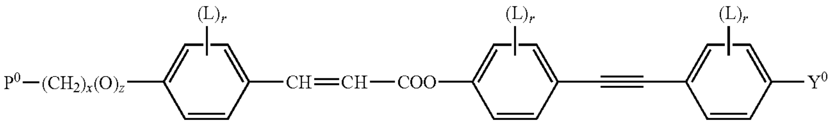
MRM18
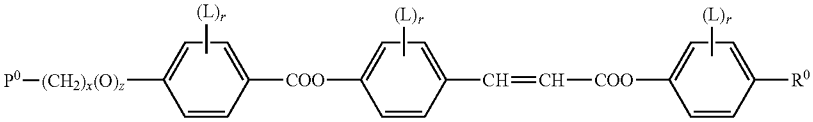

-continued

MRM19

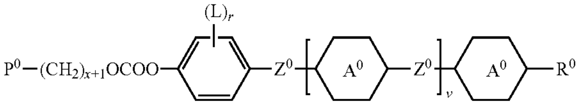

MRM20

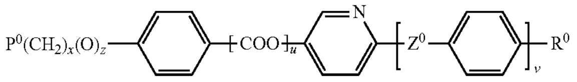

MRM21

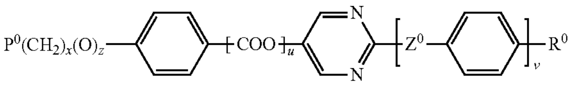

MRM22

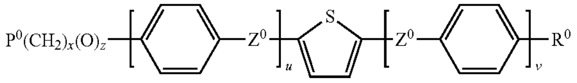

MRM23

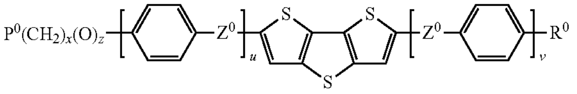

MRM24

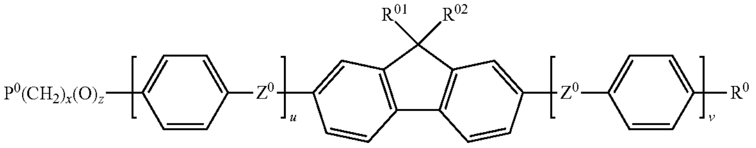

MRM25

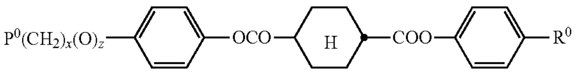

MRM26

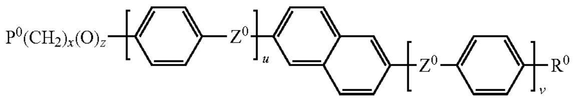

MRM27

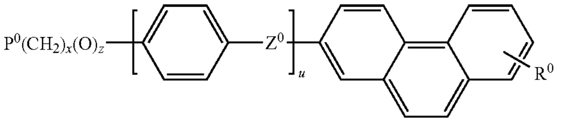

wherein $P^0$ denotes, in case of multiple occurrences independently of one another, a polymerisable group (P), L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one $—CH_2—$or two or more non-adjacent $—CH_2—$are each optionally and independently substituted with —O—, —S—, —CO—, —COO—, —OCO—, -CO—S—, —S—CO—, —O—CO-O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and in which any hydrogen atom in the alkyl group may optionally be substituted by F, or L may denote a group represented by P-Sp— r denotes 0, 1, 2, 3, or 4, x and y independently of each other, denote 0 or identical or different integers from 1 to 12, z each and independently, denotes 0 or 1, with z being 0 if the adjacent x or y is 0, $R^0$ denotes alkyl, alkoxy, thioalkyl, alkylcarbonyl, alkoxycarbonyl, alkylcarbonyloxy or alkoxycarbonyloxy with 1 or more C atoms or denotes $Y^0$, $Y^0$ denotes F, Cl, CN, $NO_2$, $OCH_3$, OCN, SCN, $SF_5$, or mono-, oligo-or polyfluorinated alkyl or alkoxy with 1 to 4 C atoms, $Z^0$ denotes —COO—, —OCO—, $—CH_2CH_2—$, $—CF_2O—$, $—OCF_2—$, —CH═CH—, —OCO—CH═CH—, —CH═CH—COO—, or a single bond, $A^0$ denotes, in case of multiple occurrences independently of one another, 1,4-phenylene that is unsubstituted or substituted with 1, 2, 3, or 4 groups L, or trans-1,4-cyclohexylene, u and v independently of each other denote 0, 1, or 2, w denotes 0 or 1, and wherein the benzene and naphthalene rings can additionally be substituted with one or more identical or different substituent groups L.

2. The polymerisable LC material according to claim 1, wherein $A^{T1}$ to $A^{T4}$ in formula T each independently and in each occurrence denote a group selected from formulae A-1 to A-11,

A-1

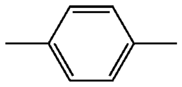

A-2

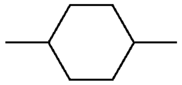

A-3

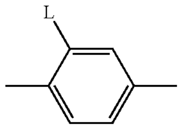

-continued

A-4

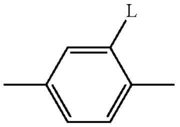

A-5

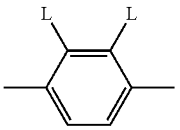

A-6

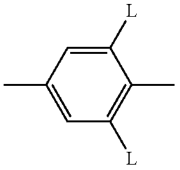

A-7

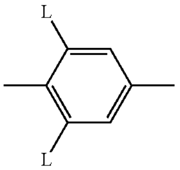

A-8

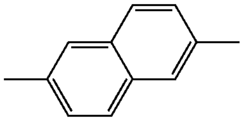

A-9

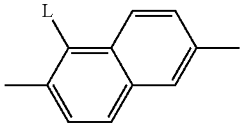

A-10

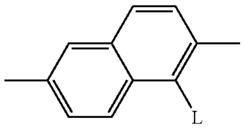

-continued

A-11

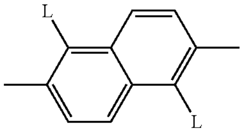

wherein,

L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one $—CH_2—$or two or more non-adjacent $—CH_2—$may be each independently substituted with —O—, —S—, —CO—, —COO—, —OCO—, -CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-.

3. The polymerisable LC material according to claim 1, wherein m1 and m2 in formula T each independently denote an integer of 1 or 2.

4. The polymerisable LC material according to claim 1, wherein Ch in formula $G^{T1}$ denotes S.

5. The polymerisable LC material according to claim 1, wherein $R^{T1}$ and $R^{T2}$ denote P-Sp-.

6. The polymerisable LC material according to claim 1, further comprising one or more multi or directive mesogenic compounds selected from the following formulae, DRMa1

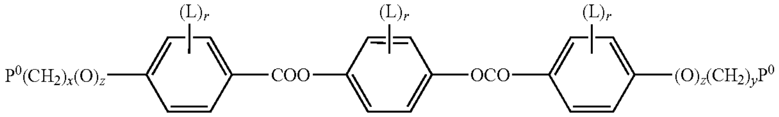

DRMa2

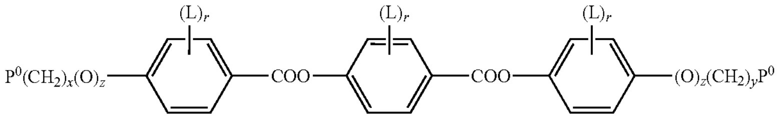

DRMa3

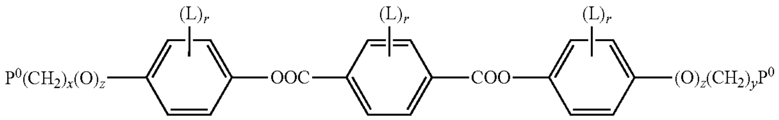

-continued

DRMa4

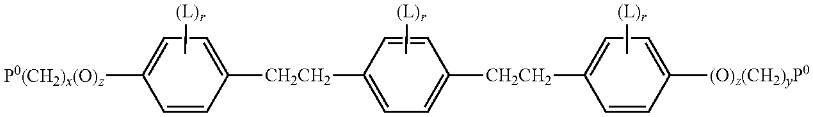

DRMa5

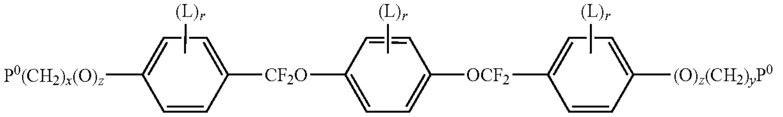

DRMa6

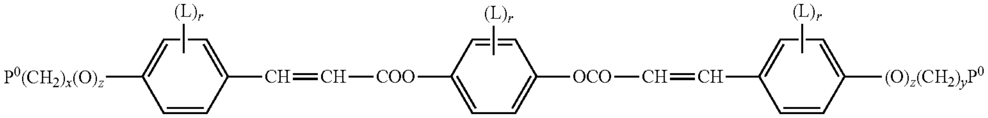

DRMa7

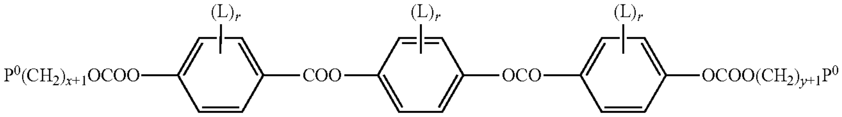

DRMb

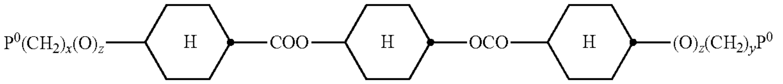

DRMc

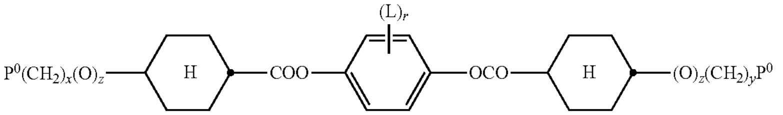

DRMd

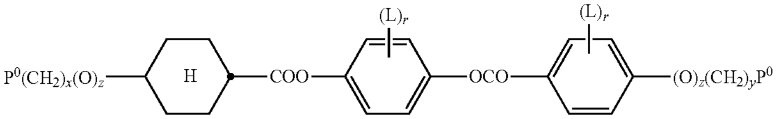

DRMe

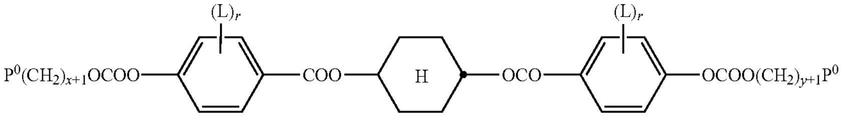

DRMf

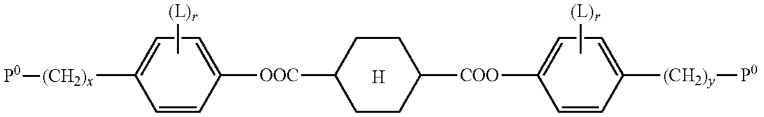

wherein, $P^0$ is, in case of multiple occurrences independently of one another a polymerisable group (P), L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one $—CH_2—$or two or more non-adjacent $—CH_2—$may be each independently substituted with —O—, —S—, —CO—, —COO—, —OCO—, -CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-, r is 0, 1, 2, 3 or 4, x and y are independently of each other 0 or identical or different integers from 1 to 12, z is each and independently, 0 or 1, with z being 0 if the adjacent x or y is 0.

7. The polymerisable LC material according to claim 1, further comprising one or more photoinitiators.

8. The polymerisable LC material according to claim 1, further comprising one or more additives selected from the group consisting of surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

9. A process for the preparation of a polymer film by providing a layer of a polymerisable LC material according to claim 1 onto a substrate, photopolymerising the polymerisable LC material, and optionally removing the polymerised LC material from the substrate and/or optionally providing it onto another substrate.

10. A polymer film obtained from the polymerisable LC material according to claim 1 by a process comprising the steps providing a layer of the polymerisable LC material onto a substrate, photopolymerising the LC material, and optionally, removing the polymerised LC material from the substrate and/or optionally providing it onto another substrate.

11. The polymer film according to claim 10, wherein the polymer exhibits positive, negative, or flat dispersion.

12. An optical, electro-optical, information storage, decorative, or security component or device comprising at least one of the polymer film according to claim 10.

13. An optical, electro-optical, information storage, decorative, or security component or device, comprising at least one of the polymerisable LC material according to claim 1.

* * * * *